(12) United States Patent
Vacon et al.

(10) Patent No.: US 11,994,899 B2
(45) Date of Patent: *May 28, 2024

(54) SYSTEM THAT GENERATES A SHARED RANDOM NUMBER

(71) Applicant: Qubit Moving and Storage, LLC, Franconia, NH (US)

(72) Inventors: Gary Vacon, East Falmouth, MA (US); Kristin A. Rauschenbach, Franconia, NH (US)

(73) Assignee: Qubit Moving and Storage, LLC, Franconia, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/165,303

(22) Filed: Feb. 6, 2023

(65) Prior Publication Data

US 2023/0185330 A1 Jun. 15, 2023

Related U.S. Application Data

(63) Continuation of application No. 17/465,235, filed on Sep. 2, 2021, now Pat. No. 11,614,771.

(Continued)

(51) Int. Cl.
*G06F 1/12* (2006.01)

(52) U.S. Cl.
CPC ...................... *G06F 1/12* (2013.01)

(58) Field of Classification Search
CPC ................ G06F 1/32; G06F 9/44; G06F 1/12
See application file for complete search history.

(56) References Cited

U.S. PATENT DOCUMENTS

| 5,418,905 A | 5/1995 | Rarity et al. |
| 6,028,935 A | 2/2000 | Rarity et al. |

(Continued)

FOREIGN PATENT DOCUMENTS

| CN | 109415201 A | 3/2019 |
| CN | 109586907 A | 4/2019 |

(Continued)

OTHER PUBLICATIONS

International Search Report and Written Opinion received for corresponding PCT Patent Application No. PCT/US2021/060655, dated Aug. 18, 2022, 9 pages.

(Continued)

*Primary Examiner* — Keshab R Pandey
(74) *Attorney, Agent, or Firm* — Rauschenbach Patent Law Group, PLLC; Kurt Rauschenbach

(57) ABSTRACT

A system that generates a shared random number includes a single photon detector configured to generate electrical signals in response to detected arrival times of a plurality of single photons as measured against a first clock and configured to detect polarizations of at least some of the detected plurality of single photons. A processor is configured to process the electrical signals generated by the detector to generate a first list representing a plurality of arrival times and corresponding polarizations of detected single photons; compare the plurality of arrival times in the generated first list with a second list of arrival times, as measured against a second clock that does not maintain a common clock time with the first clock, of single photons that include at least some of the other entangled single photons to identifying matching arrival times; and determine corresponding polarizations for the identified matching arrival times, thereby establishing a shared random number.

20 Claims, 33 Drawing Sheets

Related U.S. Application Data

(60) Provisional application No. 63/118,542, filed on Nov. 25, 2020, provisional application No. 63/186,754, filed on May 10, 2021, provisional application No. 63/218,433, filed on Jul. 5, 2021.

(56) References Cited

U.S. PATENT DOCUMENTS

| | | |
|---|---|---|
| 6,609,139 B1 | 8/2003 | Dultz et al. |
| 7,028,275 B1 | 4/2006 | Chen et al. |
| 7,072,432 B2 | 7/2006 | Belcea |
| 7,242,774 B1 | 7/2007 | Elliott et al. |
| 7,286,444 B1 | 10/2007 | Bahder et al. |
| 7,581,100 B2 | 8/2009 | Mizrah |
| 7,684,015 B2 | 3/2010 | Shih |
| 7,812,303 B2 | 10/2010 | Meyers et al. |
| 7,847,234 B2 | 12/2010 | Meyers et al. |
| 8,053,715 B2 | 11/2011 | Meyers et al. |
| 8,242,428 B2 | 8/2012 | Meyers et al. |
| 8,269,978 B2 | 9/2012 | Capron et al. |
| 8,373,107 B2 | 2/2013 | Meyers et al. |
| 8,525,149 B2 | 9/2013 | Stevenson et al. |
| 8,611,535 B2 | 12/2013 | Brodsky et al. |
| 8,890,049 B2 | 11/2014 | Yuan et al. |
| 8,983,303 B2 | 3/2015 | Meyers et al. |
| 9,064,315 B2 | 6/2015 | Meyers et al. |
| 9,131,128 B2 * | 9/2015 | Meyers .................. G06T 5/50 |
| 9,270,385 B2 * | 2/2016 | Meyers ................ H04B 10/70 |
| 9,331,843 B2 | 5/2016 | Silverman et al. |
| 9,473,301 B2 | 10/2016 | Englund et al. |
| 9,727,959 B2 | 8/2017 | Meyers et al. |
| 9,934,469 B1 | 4/2018 | Jau et al. |
| 10,541,809 B2 | 1/2020 | Godfrey et al. |
| 10,564,933 B2 | 2/2020 | Nordholt et al. |
| 10,595,102 B2 | 3/2020 | Brodsky et al. |
| 10,790,913 B2 | 9/2020 | Henningsen et al. |
| 10,992,391 B1 | 4/2021 | Meyers et al. |
| 11,193,750 B1 | 12/2021 | Fertig et al. |
| 11,251,952 B2 | 2/2022 | Lamas-Linares et al. |
| 11,268,806 B2 | 3/2022 | Fertig et al. |
| 11,290,181 B1 | 3/2022 | Meyers et al. |
| 11,367,014 B2 | 4/2022 | Vacon et al. |
| 11,411,658 B1 | 8/2022 | Vacon et al. |
| 11,431,418 B2 | 8/2022 | Rauschenbach et al. |
| 11,507,874 B2 | 11/2022 | Vacon et al. |
| 11,610,147 B2 | 3/2023 | Vacon et al. |
| 11,614,771 B2 | 3/2023 | Vacon et al. |
| 11,616,644 B2 | 3/2023 | Vacon et al. |
| 11,728,902 B1 | 8/2023 | Meyers et al. |
| 2002/0191176 A1 | 12/2002 | Saleh et al. |
| 2004/0095582 A1 | 5/2004 | Holbrook |
| 2004/0208638 A1 | 10/2004 | Jansen |
| 2004/0258421 A1 | 12/2004 | Conti et al. |
| 2005/0100351 A1 | 5/2005 | Yuan et al. |
| 2005/0135620 A1 | 6/2005 | Kastella et al. |
| 2005/0199812 A1 * | 9/2005 | Shih .................. G01S 19/23 |
| | | 250/340 |
| 2006/0115086 A1 | 6/2006 | Beausoleil et al. |
| 2007/0101410 A1 | 5/2007 | Harrison et al. |
| 2008/0059712 A1 | 3/2008 | Fedorova |
| 2008/0180222 A1 | 7/2008 | Hollister et al. |
| 2009/0147955 A1 | 6/2009 | Kim et al. |
| 2009/0194702 A1 | 8/2009 | Meyers et al. |
| 2009/0290162 A1 | 11/2009 | Erkmen et al. |
| 2009/0316910 A1 * | 12/2009 | Maeda .................. H04L 9/0891 |
| | | 380/279 |
| 2012/0051755 A1 | 3/2012 | Arahira |
| 2012/0294625 A1 | 11/2012 | Dynes et al. |
| 2013/0176573 A1 | 7/2013 | Bovino |
| 2014/0112478 A1 | 4/2014 | Arahira |
| 2015/0055961 A1 | 2/2015 | Meyers et al. |
| 2016/0028544 A1 | 1/2016 | Hyde et al. |
| 2016/0041032 A1 | 2/2016 | Matthews et al. |
| 2016/0112066 A1 | 4/2016 | Ashikhmin |
| 2016/0164615 A1 | 6/2016 | Dailey et al. |
| 2016/0191173 A1 | 6/2016 | Malaney |
| 2016/0234017 A1 | 8/2016 | Englund et al. |
| 2017/0099139 A1 | 4/2017 | Han et al. |
| 2017/0364796 A1 | 12/2017 | Wiebe et al. |
| 2018/0152295 A1 | 5/2018 | Drost et al. |
| 2018/0232649 A1 | 8/2018 | Wiebe et al. |
| 2018/0239592 A1 | 8/2018 | Nordholt et al. |
| 2019/0103962 A1 | 4/2019 | Howe et al. |
| 2019/0376820 A1 | 12/2019 | Jones et al. |
| 2020/0044749 A1 | 2/2020 | Rauschenbach et al. |
| 2020/0084033 A1 | 3/2020 | Lamas-Linares et al. |
| 2020/0183250 A1 | 6/2020 | Hall et al. |
| 2020/0233645 A1 | 7/2020 | Nordholt et al. |
| 2020/0274703 A1 | 8/2020 | Lukens et al. |
| 2020/0313879 A1 | 10/2020 | Hong et al. |
| 2020/0334101 A1 | 10/2020 | Albert et al. |
| 2020/0350990 A1 | 11/2020 | Beattie, Jr. et al. |
| 2020/0374211 A1 | 11/2020 | Griffin et al. |
| 2020/0379171 A1 | 12/2020 | Li et al. |
| 2020/0382219 A1 | 12/2020 | Innes et al. |
| 2021/0105135 A1 | 4/2021 | Figueroa et al. |
| 2021/0116639 A1 | 4/2021 | Fertig et al. |
| 2021/0124640 A1 | 4/2021 | Nickerson et al. |
| 2021/0132969 A1 | 5/2021 | Smith |
| 2021/0133614 A1 | 5/2021 | Ashrafi |
| 2021/0152346 A1 | 5/2021 | Bucklew et al. |
| 2021/0273731 A1 | 9/2021 | Zhang et al. |
| 2021/0295196 A1 | 9/2021 | Gimeno-Segovia |
| 2021/0296558 A1 | 9/2021 | Englund et al. |
| 2021/0325605 A1 | 10/2021 | Rudolph et al. |
| 2022/0019409 A1 | 1/2022 | Bharadwaj et al. |
| 2022/0043128 A1 | 2/2022 | Pacala et al. |
| 2022/0069152 A1 | 3/2022 | Tosi et al. |
| 2022/0084085 A1 | 3/2022 | Rigetti et al. |
| 2022/0085985 A1 | 3/2022 | Kaplan |
| 2022/0114471 A1 | 4/2022 | Vacon et al. |
| 2022/0214713 A1 | 7/2022 | Vacon et al. |
| 2022/0309375 A1 | 9/2022 | Vacon et al. |
| 2022/0353068 A1 | 11/2022 | Vacon et al. |
| 2023/0058994 A1 | 2/2023 | Vacon et al. |
| 2023/0177375 A1 | 6/2023 | Vacon et al. |
| 2023/0216670 A1 | 7/2023 | Vacon et al. |
| 2023/0324527 A1 | 10/2023 | Vacon et al. |
| 2023/0327778 A1 | 10/2023 | Vacon et al. |
| 2023/0327779 A1 | 10/2023 | Vacon et al. |
| 2023/0336336 A1 | 10/2023 | Vacon et al. |
| 2023/0375327 A1 | 11/2023 | Vacon et al. |

FOREIGN PATENT DOCUMENTS

| | | |
|---|---|---|
| EP | 3771137 A1 | 1/2021 |
| JP | 6060737 B2 | 1/2017 |
| JP | 6708062 B2 | 6/2020 |
| KR | 10-2021-01543664 A | 12/2021 |
| WO | 2020/140850 A1 | 7/2020 |
| WO | 2020/180672 A1 | 9/2020 |
| WO | 2020/235546 A1 | 11/2020 |
| WO | 2021/013990 A1 | 1/2021 |
| WO | 2021/171248 A1 | 9/2021 |
| WO | 2021/262322 A1 | 12/2021 |
| WO | 2022/140011 A2 | 6/2022 |
| WO | 2022/159902 A1 | 7/2022 |
| WO | 2023/196749 A1 | 10/2023 |
| WO | 2023/224656 A1 | 11/2023 |
| WO | 2023/224658 A2 | 11/2023 |
| WO | 2024/006713 A1 | 1/2024 |

OTHER PUBLICATIONS

International Preliminary Report on Patentibility received for corresponding PCT Patent Application No. PCT/US2021/060655, dated Jun. 8, 2023, 8 pages.

Karlsson et al., "Quantum teleportation using three-particle entanglement", Physical Review A, vol. 58, No. 6, Dec. 1998, pp. 4394-4400.

Treiber et al., "A fully automated entanglement-based quantum cryptography system for telecom fiber networks", New Journal of Physics, vol. 11, Apr. 30, 2009, 20 pages.

(56) References Cited

OTHER PUBLICATIONS

Pfaff et al., "Unconditional quantum teleportation between distant solid-state quantum bits", Quantum Information, vol. 345, No. 6196, Aug. 1, 2014, pp. 532-535.
Rizzi et al., "White Rabbit Clock Synchronization: Ultimate Limits on Close-In Phase Noise and Short-Term Stability Due to FPGA Implementation", IEEE Transactions on Ultrasonics, Ferroelectrics, and Frequency Control, vol. 65, No. 3, Sep. 2018, pp. 1726-1737.
Mkacher et al., "Calibrating NTP", IEEE, 2019, 6 pages.
Chapman et al., "Hyperentangled Time-bin and Polarization Quantum Key Distribution", arXiv:1908.09018v3, 2020, 39 pages.
Mandel, L., "Proposal for almost noise-free optical communication under conditions of high background", J. Opt. Soc. Am. B, vol. 1, No. 1, Mar. 1984, pp. 108-110.
Ursin et al., "Quantum teleportation across the Danube", Nature, vol. 430, Aug. 19, 2004, pp. 849.
Ilo-Okeke et al., "Remote quantum clock synchronization without synchronized clocks", Npj Quantum Information, 2018, 5 pages.
Resch et al., "Distributing entanglement and single photons through an intra-city, free-space quantum channel", Optics Express, vol. 13, No. 1, Jan. 10, 2005, pp. 202-209.
Jennewein et al., "Quantum Cryptography with Entangled Photons", Physical Review Letters, vol. 84, No. 20, May 15, 2000, pp. 4729-4732.
Using coincidence correlation for studying quantum optic systems, Piqoquant GMBH, Jun. 1, 2018, 6 pages.
Time in distributed systems: clocks and ordering of events, Indian Institute of Technology Kharagpur, Department of computer Science and Engineering, 38 pages.
Time in distributed systems, University of Cambridge, Cambridge, UK, 20 pages.
Giovannetti et al., "Limits to clock synchronization induced by completely dephasing communication channels", Physical Review A, Jun. 17, 2002, vol. 65, 062319-1-062319-6.
Bennett et al., "Quantum cryptography: public key distribution and coin tossing," Theoretical Computer Science Theoretical Aspects of Quantum Cryptography, 2014, vol. 560, Part 1, pp. 7-11.
Kiesel et al., "Experimental Analysis of a Four-Qubit Photon Cluster State", Physical Review Letters, vol. 95, 210502, Nov. 18, 2005, pp. 1-4.
Aull et al., "Geiger-Mode Avalanche Pholodiodes for Three-Dimensional Imaging", Lincoln Laboratory Journal, vol. 13, No. 2, 2002, pp. 335-350.
Avalanche Pholodiodes: A User's Guide, PerkinElmer, 2003, 8 pages.
Oh, J., et al., "Coincidence Rates for Photon Pairs in WDM Environment", Journal of Lightwave Technology, vol. 29, No. 3, Feb. 1, 2011, pp. 324-329.
Grieve et al., "Correcting for accidental correlations in saturated avalanche photodiodes", Optics Express, vol. 24, No. 4, Feb. 22, 2016, pp. 3592-3600.
Guo et al., "Tesling the Bell inequality on frequency-bin entangled photon pairs using lime-resolved detection", Optica, vol. 4, No. 4, Apr. 2017, pp. 388-392.
Lee et al., "Temporal Multiplexing of Heralded Single Photon Sources Using Optical Fiber Delays", Korea Institute of Science and Technology Information-Korea Research Institute of Standards and Science, 2020, 3 pages.
Shi et al., "Breakdown flash at telecom wavelengths in InGaAs avalanche photodiodes", Optics Express, vol. 25, No. 24, Nov. 27, 2017, pp. 30388-30394.
Wengerowskya et al., Entanglement distribution over a 96-km-long submarine optical fiber, PNAS, vol. 116, No. 14, Apr. 2, 2019, pp. 684-6688.
Bhandari et al., "Low-Cost Coincidence-Counting Electronics for Quantum Optics", Department of Physics, 2007, 2 pages.
Gentry et al., "Quantum-correlated photon pairs generated in a commercial 45 nm complementary metal-Oxide semiconductor microelectronic chip", Optica, vol. 2, No. 12, Dec. 2015, pp. 1065-1071.

Rarity et al., "Single-photon counting for the 1300-1600-nm range by use of Peltier-cooled and passively quenched nGaAs avalanche photodiodes", Applied Optics, vol. 39, No. 36, Dec. 20, 2000, pp. 6746-6753.
Park et al., "High-performance reconfigurable coincidence counting unit based on a field programmable gate array", applied optics, vol. 54, No. 15, May 20, 2015, pp. 4727-4731.
Boso et al., "Low-cost and compact single-photon counter based on a CMOS SPAD smart pixel", IEEE Photonics technology Letters, vol. 27, No. 23, Dec. 1, 2015, 4 pages.
Unternahrer et al., "Coincidence Detection of Spatially Correlated Photon Pairs with a Novel Type of Monolithic time-Resolving Detector Array", IEEE, 2017, 1 page.
Unternahrer et al., "Coincidence detection of spatially correlated photon pairs with a monolithic time-resolving detector array", Optics Express, vol. 24, No. 15, Dec. 12, 2016, pp. 28829-28841.
Hong et al., "Measurement of Subpicosecond Time Intervals between Two Photons by Interference," Physical Review Letters, vol. 59, No. 18, 2044, Nov. 2, 1987, pp. 1-3.
Shapiro et al., "On-demand single-photon generation using a modular array of parametric down converters with electro-optic polarization controls," Opt. Lett., vol. 32, 2007, 2698-2700.
Wang, et al., "On-Demand Semiconductor Source of Entangled Photons Which Simultaneously Has High Fidelity, Efficiency, and Indistinguishability", Physical Review Letters, vol. 122, 113602, 2019, 6 pages.
Muller, et al., "On-demand generation of indistinguishable polarization-entangled photon pairs," URL: https://arxiv.org/ftp/arxiv/papers/1308/1308.4257.pdf, Aug. 21, 2013, 5 pages.
Clemmen, et al., "All-optically tunable buffer for single photons", Optics Letters, vol. 43, No. 9, Apr. 27, 2018, pp. 2138-2141.
Heshami et al., "Quantum memories: Emerging Applications and Recent Advances," Journal of modern optics, vol. 63, No. 20, 2016, pp. 2005-2028.
Cho, et al., "Highly efficient optical quantum memory with long coherence time in cold atoms", Optica, vol. 3, No. 1, Jan. 15, 2016, pp. 100-107.
Nunn et al., "Enhancing multiphoton rates with quantum memories", Centre for Quantum Technologies, Sep. 9, 2018, 5 pages.
Hamel et al., "Direct generation of three-photon polarization entanglement", Institute for Quantum Computing and Department of Physics & Astronomy, Apr. 28, 2014, 9 pages.
Mattle et al., "Dense Coding in Experimental Quantum Communication", Physical Review Letters, Jun. 17, 1996, vol. 76, No. 25, pp. 4656-4659.
Chen et al., "Heralded Quantum Random Access Memory in a Scalable Photonic Integrated Circuit Platform", Optical Society of America, 2021, 2 pages.
Ball et al., "Quantum firmware and the quantum computing stack", Physics Today, Mar. 2021, vol. 74, No. 3, pp. 28-34.
Kaczmarek et al., "A Noiseless Quantum Optical Memory at Room Temperature", Frontiers in Optics, 2017, 2 pages.
Li et al., "Quantum Supremacy Circuit Simulation on Sunway TaihuLight", URL:https://arxiv.org/pdf/1804.04797.pdf Aug. 13, 2018, pp. 1-11.
Zhang et al., "Examples on quantum search algorithm with optimized depth", Dec. 11, 2019, pp. 1-7.
Kanamori et al., "Three-party Quantum Authenticated Key Distribution with Partially Trusted Third Party", IEEE Global Telecommunications Conference, IEEE, 2008, 5 pages.
Weihs et al., "Violation of Bell's inequality under strict Einstein locality conditions", Physical Review Letters, vol. 81, No. 23, Dec. 7, 1998, pp. 5039-5043.
Smith et al., "Quantifying Coherence and Entanglement via Simple Measurements", arXiv:1707.09928v1, Jul. 31, 2017, 9 pages.
Ding et al., "The Cross-Correlation of Binary Sequences With Optimal Autocorrelation", IEEE Transactions On Information Theory, 2010, vol. 56, No. 4, Apr. 2010, pp. 1694-1701.
Shrivastav et al., "Globally Synchronized Time via Datacenter Networks", IEEE/ACM Transactions On Networking, Aug. 2019, vol. 27, No. 4, Aug. 2019, pp. 1401-1416.

(56) References Cited

OTHER PUBLICATIONS

Peloso et al., "Daylight operation of a free space, entanglement-based quantum key distribution system", New Journal of Physics 11, 2009, 13 pages.
Brunner et al., "Detection loophole in asymmetric Bell experiments", PRL 98, 220403, 2007, pp. 220403-1-220403-4.
Meyer-Scott et al., "Single-photon sources: Approaching the ideal through multiplexing", Review of Scientific Instruments, 2020, vol. 91, No. 4, 2020, pp. 041101-1-041101-18.
Saleh et al., "Towards spontaneous parametric down conversion from monolayer MoS2", Scientific Reports, vol. 8, No. 3862, 2018, 7 pages.
Fanto et al., "Multipli-entangled photons from a spontaneous parametric down-conversion source", Quantum Information and Computation, vol. 8057, 2011, pp. 805705-1-805705-12.
Ilic, Nikolina, "The Ekert Protocol", Journal of Physics, 334, Jul. 22, 2007, 4 pages.
Haider et al., "Entangling Independent Photons by Time Measurement", Nature Physics, vol. 3, Oct. 2007, pp. 692-695.
Zhuang et al., "Entanglement-Enhanced Lidars for Simultaneous Range and Velocity Measurements." Physical Review A, vol. 96, No. 4, Oct. 2017, pp. 040304-1-040304-6.
Guccione et al., "Connecting heterogeneous quantum networks by hybrid entanglement swapping", Sci. Adv., vol. 6, No. 22, 2020, pp. 1-6.
Gisin, Nicolas, "Entanglement 25 Years after Quantum Teleportation: Testing Joint Measurements in Quantum Networks", Entropy, vol. 21, 2019, pp. 1-12.
Anderson, Brian P., "Field Guide to Quantum Mechanics", SPIE Field Guides, vol. FG44, 2019, 152 pages.
Arrazola et al., "Quantum Fingerprinting with Coherent States and a Constant Mean No. of Photons", Physical Review A 89, 2014, pp. 062305-1-062305-6.
Kwiat et al., "New High-Intensity Source of Polarization-Entangled Photon Pairs", Physical Review Letters, vol. 75, No. 24, Dec. 11, 1995, pp. 4337-4341.
Zhao et al., "Experimental Demonstration of Five-photon Entanglement and Open-destination Teleportation", Nature, vol. 430, Jul. 2004, 19 pages.
Morrison et al., "High dimensional frequency-bin entanglement from domain engineered parametric downconversion", FM1N.1, CLEO, 2021, 2 pages.
Kashi et al., "Enabling Scalability of Photonic Frequency-Domain Quantum Processing", FM1N.4, CLEO 2021, 2 pages.
Chang et al., "Quantification of High-dimensional Energy-time Entanglement in a Biphoton Frequency Comb", FM3M.6, CLEO 2021, 2 pages.
Sloan et al., "Two photon emission from superluminal and accelerating index changes", FM3N.4, CLEO 2021, 2 pages.
Kviatkovsky et al., "Microscopy with undetected photons in the mid-infrared", FTh2O.5, CLEO 2021, 2 pages.
Goswami, Abhirup, "Analysis of a Deterministic Entangled Photon Pair Source using Single Photons", Sep. 2016, 79 pages.
Haroche, Serge, "Entanglement, Decoherence And The Quantum/Classical Boundary", Physics Today, vol. 51, Jul. 1998, pp. 36-42.
Brunner et al., "Bell nonlocality", Reviews of Modern Physics, vol. 86, 2014, pp. 419-478.
Merkouche et al., "Multiple pulse-mode Bell states heralded via entanglement swapping", JM4E.6, CLEO 2021, 2 pages.
Lee, Catherine, "High-Dimensional Quantum Communication Deployed Fiber", Feb. 2018, 143 pages.
Hu et al., "Beating the channel capacity limit for superdense coding with entangled ququarts", Science Advances, vol. 4, Jul. 20, 2018, pp. 1-5.
Luo et al., "High-Reliability Sub-Nanosecond Network Time Synchronization Method Enabled by Double-Frequency Distributed Time Synchronization", Journal of Optical Communications and Networking, vol. 11, No. 1, Jan. 2019, pp. A40-A51.
Xie et al., "A High-Precision 2.5-ps RMS Time Synchronization for Multiple High-Speed Transceivers in FPGA", IEEE Transactions On Nuclear Science, vol. 66, No. 7, Jul. 2019, pp. 1070-1075.
Goswami et al., "Indefinite causal order in a quantum switch", Physical Review Letters, vol. 121, 2018, pp. 090503-1-090503-5.
Galvez, Enrique J., "Correlated-Photon Experiments Laboratory Manual", Colgate University, 2008, 27 pages.
Chen et al., "Joint Time and Frequency Dissemination Network Over Delay-Stabilized Fiber Optic Links", IEEE Photonics Journal, vol. 7, No. 3, Jun. 2015, 10 pages.
Sulimany et al., "All-Fiber Source and Sorter for Multimode Correlated Photons", JTh3A.17, CLEO 2021, 2 pages.
Chen et al., Experimental demonstration of conjugate-Franson interferometry, Research Laboratory of Electronics, Massachusetts Institute of Technology, Cambridge, MA 02139, USA, May 3, 2021, pp. 1-7.
Chen et al., Supplemental Material for Experimental Demonstration of Conjugate-Franson Interferometry, Research Laboratory of Electronics, Massachusetts Institute of Technology, Cambridge, MA 02139, May 3, 2021, pp. 1-4.
Tittel et al., Long-distance Bell-type tests using energy-time entangled photons, University of Geneva, Group of Applied Physics, 20, Rue de I'Ecole de Med'ecine, CH-1211 Geneva 4, Switzerland, Nov. 4, 2018, pp. 1-22.
Suprano et al., "Detection techniques for Orbital Angular Momentum states", JTh3A.59, CLEO 2021, 2 pages.
Placke et al., "Engineering AlGaAs-on-insulator towards quantum optical applications", JTu3A.20, CLEO 2021, 2 pages.
Kavuri et al., "Quantum state tomography at the Tsirelson bound", JTu3A.45, CLEO 2021, 2 pages.
Devetak et al., "Distillation of secret key and entanglement from quantum states", Proceedings of the Royal Society A, vol. 461, 2004, pp. 207-235.
Rangarajan et al., "Optimizing type-I polarization-entangled photons", Optics Express, vol. 17, No. 21, Oct. 12, 2009, pp. 18920-18933.
Strekalov et al., "Postselection-free energy-time entanglement", Physical Review A, Third Series, vol. 54, No. 1, Jul. 1996, pp. R1-R4.
Kaneda et al., "Heralded single-photon source utilizing highly nondegenerate, spectrally factorable spontaneous parametric downconversion", Optics Express, vol. 24, No. 10, May 16, 2016, pp. 10733-10747.
Zielnicki, Kevin, "Pure Sources And Efficient Detectors For Optical Quantum Information Processing", 2014, 104 pages.
Lesovik et al., "Arrow of time and its reversal on the IBM quantum computer", Scientific Reports, 2019, vol. 9, No. 4396, 2019, 8 pages.
Ursin et al. "Entanglement-based quantum communication over 144 km", Nature Physics, vol. 3, Jul. 2007, pp. 481-486.
Giovannetti et al., "Quantum-enhanced positioning and clock synchronization", Nature, vol. 412, Jul. 26, 2001, 16 pages.
Hong et al., "Optical communication channel based on coincident photon pairs", Applied Optics, vol. 24, No. 22, Nov. 15, 1985, pp. 3877-3882.
Matsukevich et al., "Bell Inequality Violation with Two Remote Atomic Qubits", Physical Review Letters, vol. 100, Apr. 18, 2008, pp. 150404-1-150404-4.
Kong et al., "Implementation of Multiparty quantum clock synchronization", arXiv:1708.06050v2, 2017, 6 pages.
Venkatasubramanian, Nalini, "Time in distributed Systems", 66 pages.
Kim et al., "Delayed "Choice" Quantum Eraser", Physical Review Letters, vol. 84, No. 1, Jan. 3, 2000, 5 pages.
Butner et al., "Nanosecond-scale Event Synchronization over Local-area Networks", Proceedings of the 27th Annual IEEE Conference on Local Computer Networks, 2021, 9 pages.
Wittje, Roland, "Noise: From nuisance to research subject", Physics Today 73, Feb. 2020, pp. 8 pages.
Quan et al., "Nonlocal temporal correlation identification of entangled photon pairs for quantum clock synchronization", 10 pages.
Boughn, Stephen, "Making Sense of Bell's Theorem and Quantum Nonlocality", Found Physics, 2017, 18 pages.

(56) References Cited

OTHER PUBLICATIONS

D'Ambrosio et al., "Complete experimental toolbox for alignment-free quantum communication", Nature communications, vol. 3, 2012, 8 pages.

Altepeter et al., "Phase-compensated ultra-bright source of entangled photons", Optics Express, vol. 13, No. 22, Oct. 31, 2005, pp. 8951-8959.

Martin et al., "Quantifying Photonic High-Dimensional Entanglement", vol. 118, issue 11, Mar. 17, 2017, pp. 110501-1-110501-5.

Das et al., "Robust quantum network architectures and topologies for entanglement distribution", Physical Review A 97, 2018, pp. 012335-1-012335-12.

Ekert, Artur K., "Quantum Cryptography Based on Bell's Theorem", Physical Review Letters, vol. 67, No. 6, Aug. 5, 1991, pp. 661-663.

Bennett et al., "Teleporting an Unknown Quantum State via Dual Classical and Einstein-Podolsky-Rosen Channels", Physical Review Letters, vol. 70, No. 13, Mar. 29, 1993, pp. 1895-1899.

Bennett et al., "Entanglement-Assisted Classical Capacity of Noisy Quantum Channels", Physical Review Letters, vol. 83, No. 15, Oct. 11, 1999, pp. 3081-3084.

Lloyd et al., "Long Distance, Unconditional Teleportation of Atomic States via Complete Bell State Measurements", Physical Review Letters, vol. 87, No. 16, Oct. 15, 2001, pp. 167903-1-167903-4.

Jozsa et al., "Quantum Clock Synchronization Based on Shared Prior Entanglement", Physical Review Letters, vol. 85, No. 9, Aug. 28, 2000, pp. 2010-2013.

Bennett et al., "Purification of Noisy Entanglement and Faithful Teleportation via Noisy Channels", vol. 76, No. 5, Jan. 29, 1996, pp. 722-725.

Shi et al., "Privacy-preserving Quantum Sealed-bid Auction Based on Grover's Search Algorithm", Scientific Reports, vol. 9, 2019, pp. 1-10.

Demirel et al., "Correlations for computation and computation for correlations", Nature Partner Journals, vol. 7, 2021, pp. 1-8.

Gogo et al., "Comparing quantum and classical correlations in a quantum eraser", Physical Review A, vol. 71, 2005, pp. 052103-1-052103-6.

Agam et al., "Shot Noise In Chaotic Systems: "Classical" to Quantum Crossover", Physical Review Letters, vol. 85, No. 15, Oct. 9, 2000, pp. 3153-3156.

Stipcevic, Mario, "Quantum random number generators and their applications in cryptography", Proc. of SPIE, vol. 8375, 2012, pp. 837504-1-837504-15.

Quan et al., "Demonstration of quantum synchronization based on second-order quantum coherence of entangled photons", Scientific Reports, vol. 6, 2016, pp. 1-8.

Bedington et al., "Progress in satellite quantum key distribution", Quantum Information, vol. 3, 2017, pp. 1-13.

Nolleke et al., "Efficient Teleportation Between Remote Single-Atom Quantum Memories", Physical Review Letters, vol. 110, Apr. 5, 2013, pp. 140403-1-140403-5.

Jung et al., "Remote Laser-Microwave Synchronization Over Kilometer-Scale Fiber Link With Few-Femtosecond Drift" Journal of Lightwave Technology, vol. 32, No. 20, Oct. 15, 2014, pp. 3742-3748.

Pant et al., Routing entanglement in the quantum internet, arXiv:1708.07142v2, Sep. 22, 2017, 13 pages.

Leung et al., "Deterministic bidirectional communication and remote entanglement generation between superconducting qubits", npj Quantum Information, vol. 5, 2019, 5 pages.

Kemparaj et al., "Secure precision time protocol in packet switched networks", IEEE, 2019, 6 pages.

Shih, Yanhua, "The physics of ghost imaging", Optical Society of America, 32 pages.

Mahmood et al., "Delay and Jitter Characterization for Software-Based Clock Synchronization Over WLAN Using PTP", IEEE Transactions on Industrial Informatics, vol. 10, No. 2, 2014, May 2014, pp. 1198-1206.

Paesani et al., "Generation and sampling of quantum states of light in a silicon chip", Nature Physics, 2018, 27 pages.

Joly et al., "Fibre-based pressure-controlled sources for quantum optics", STh1A.5, CLEO 2021, 2 pages.

Simon et al., "High-capacity quantum key distribution via hyperentangled degrees of freedom", New Journal of Physics, vol. 16, Jun. 24, 2014, 21 pages.

Shen et al., "Classically Entangled Vectorial Structured Light towards Multiple Degrees of Freedom and Higher Dimensions", STh1B.1, CLEO 2021, 2 pages.

Seijo et al., "Enhanced Timestamping Method for Sub-Nanosecond Time Synchronization in IEEE 802.11 over WLAN Standard Conditions", IEEE Transactions on Industrial Informatics, vol. 16, No. 9, Sep. 2020, pp. 5792-5805.

Liu et al., "General scheme for superdense coding between multiparties", Physical Review A, vol. 65, 2002, pp. 022304-1-022304-4.

Achatz et al., "High-dimensional EPR entanglement from a SPDC source at telecom wavelength", arXiv: Quantum Physics, 2021, pp. 1-7.

Bauerle et al. "Coherent control of single electrons: a review of current progress", Rep. Prog. Phys., vol. 81, 056503, Apr. 5, 2018, 33 pages.

Erkmen et al., "Ghost imaging; from quantum to classical to computational", Advances in Optics and Photonics, vol. 2, 2010, pp. 405-450.

International Search Report and Written Opinion received for corresponding PCT Application No. PCT/US2023/069109, dated Oct. 6, 2023, 11 pages.

Jin et al., "Long-range distribution of high-quality time-bin entangled photons for quantum communication", Journal of the Korean Physical Society, vol. 80, Dec. 2021, pp. 203-213.

Shapiro et al., "Classical Imaging with Undetected Photons" Scientific Reports, vol. 5, No. 10329, 2015, pp. 1-8.

* cited by examiner

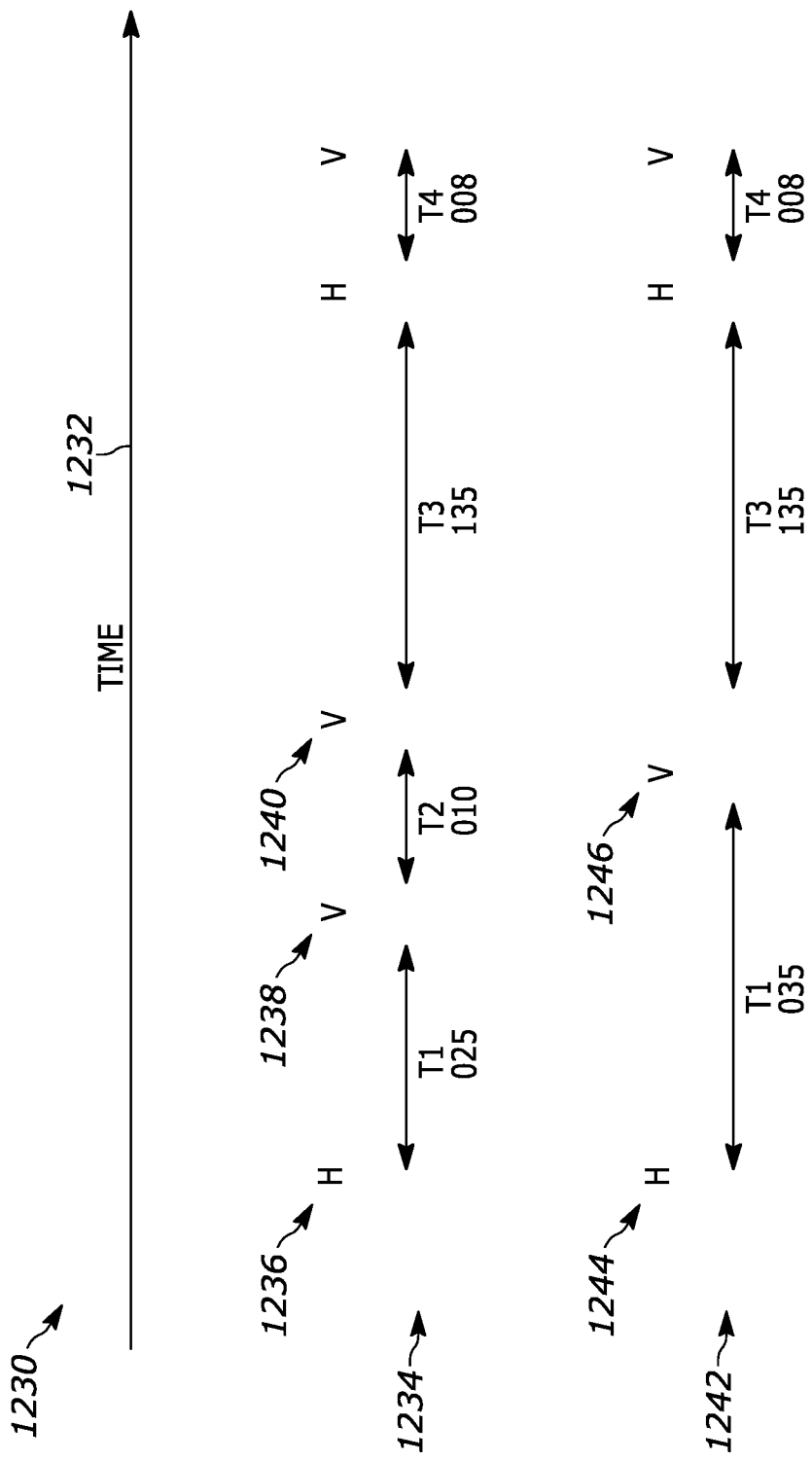

SYSTEM THAT GENERATES A SHARED RANDOM NUMBER

CROSS-REFERENCE TO RELATED APPLICATION

The present application is a continuation of U.S. patent application Ser. No. 17/465,235 entitled "Method for Synchronizing and Locking Clocks", filed on Sep. 2, 2021, which is a non-provisional application of U.S. Provisional Patent Application No. 63/118,542, entitled "System and Method for Sharing Quantum Entanglement", filed on Nov. 25, 2020, which is also is a non-provisional application of U.S. Provisional Patent Application No. 63/186,754, entitled "System and Method for Sharing Quantum Entanglement", filed on May 10, 2021, and which is also is a non-provisional application of U.S. Provisional Patent Application No. 63/218,433, entitled "System and Method for Sharing Quantum Entanglement", filed on Jul. 5, 2021. The entire contents of U.S. Non-Provisional application Ser. No. 17/465,235 and U.S. Provisional Patent Application Nos. 63/118,542, 63/186,754, and 63/218,433 are herein incorporated by reference.

The section headings used herein are for organizational purposes only and should not to be construed as limiting the subject matter described in the present application in any way.

INTRODUCTION

Entanglement is a valuable quantum resource that allows information to be shared between different users with properties that are not possible with classical sharing schemes. Methods and systems that support and improve the distribution and use of entangled quantum resources for various applications are and will be useful in advancing art.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale; emphasis instead generally being placed upon illustrating principles of the teaching. The drawings are not intended to limit the scope of the Applicant's teaching in any way.

FIG. 12B illustrates the embodiment of state combs for the system and method of shared entanglement of FIG. 12A with noise of the present teaching.

DESCRIPTION OF VARIOUS EMBODIMENTS

Figure 1:
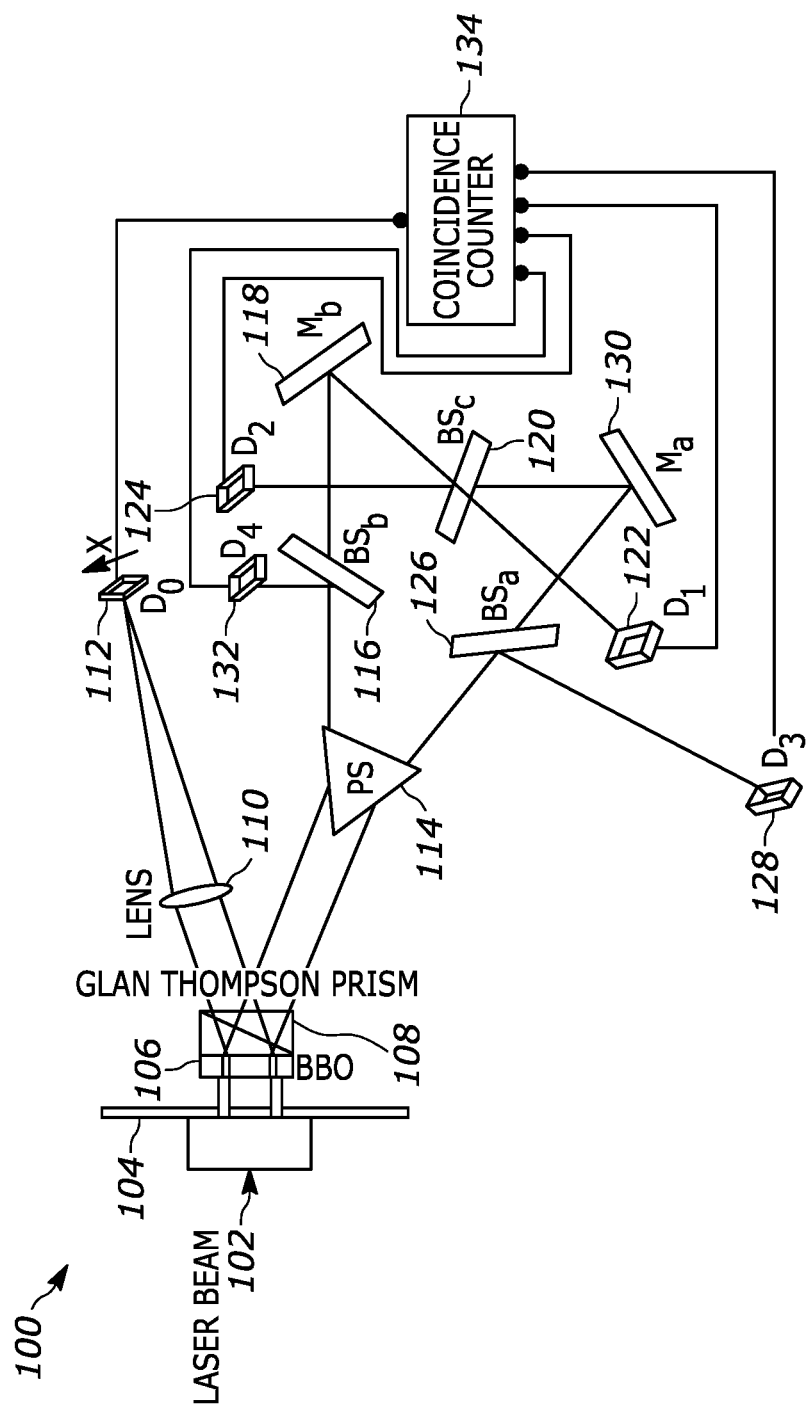
FIG. 1 illustrates a known delayed choice quantum eraser system.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments as long as the teaching remains operable.

Entanglement is a powerful resource that can be used in a variety of quantum and/or classical systems. Entanglement refers to a quantum system that shares quantum state information such that measurements of the system, even if performed at different times and/or places yields measured quantum states that are perfectly correlated. Entangled quantum systems have been shown to be powerful for many applications including, for example, quantum key distribution, sensing and measurement, quantum computing, and various classical and/or quantum communication systems. Entangled quantum systems are also integral to numerous scientific applications, including teaching laboratory exercises, astronomical observation, molecular science and chemistry, numerous physics applications.

While it is clear that many powerful applications leverage entanglement as a resource, demonstrations to date of these applications are relatively limited in scope. This is at least in part because methods and systems to properly control and manage distributed systems that share entanglement are not well developed. Complex synchronization schemes are commonly used, and many of these require specialized quantum and/or classical communication channels to function. Systems and methods are needed for applications that rely on distributed systems that share entangled resources to reap the benefits of the shared quantum state information in new and existing communication and processing modalities.

Embodiments of the quantum entanglement sharing system and method of the present teaching are described in connection with example applications to help illustrate key principles. It should be understood that the entanglement sharing system and method of the present teaching is general and can be applied to a variety of applications, including quantum applications, classical applications, and hybrids of these two modalities and are not limited to specific examples and embodiments described herein. The shared state combs and associated steps of methods that rely on shared state information that underlie the entanglement sharing are general and can apply to numerous different quantum-entangled shared quantum state platforms, including various example photonic platforms described herein, but also other physical systems.

A system includes an entangled quantum state source that generates first and second entangled quantum states. Some systems generate more than two entangled quantum states. It should be understood, that systems and method of the present teaching are not limited to the use of any specific number of entangled quantum states. The entangled quantum state source can be any type of entangled quantum state source such as, for example, an entangled photon source, an entangled atom source, an entangled ion source, an entangled electron source, or superconducting entangled quantum state source. One particular example is that the entangled quantum state source can be a spontaneous parametric down conversion entangled photon source.

It should be understood that the entangled quantum state source of the present teaching can provide entangled quantum states in any number of bases with any number of state dimensions for each basis. Examples of entanglement bases are polarization, wavelength, space, and time. The state dimension can be considered as the number of possible measurement outcomes of a particular basis. One skilled in the art will appreciate that there are an almost unlimited number of different bases and state dimensions. In various embodiments of the present teaching, one or more basis can be used to establish coincidence, or find entangled pairs, and additional bases used singularly, or in combination, can also be used to improve the fidelity (e.g., probability of error, speed or latency, etc.) of establishing the coincidence. In various embodiments of the present teaching, the use of bases, or combinations of basis, with larger state dimensions helps to establish coincidence with lower error, lower latency, and/or to impart more information by measuring fewer photons.

The various entanglement bases can be used to identify different information. For example, a first portion of the plurality of entanglement bases can be used to identify entanglement and a second portion of the plurality of entanglement bases can be used to identify entangled state information. Furthermore, the number of entanglement bases can be selected to achieve a desired performance metric of the system. The performance metric can be, for example, an error rate of the identification of entangled quantum state information, a rate of the identification of entangled quantum state information, and a ratio of a rate of the identification of entangled quantum state information to an error rate of the identification of entangled quantum state information. The number of entanglement bases can also be selected to achieve a desired system noise immunity. One example of entangled state information is a shared random number. Another example of entangled state information is a shared time stamp. Another example is a shared arrival time difference between two photons.

Different state dimensions within a basis can, for example, be used to identify different information. For example, a first portion of a plurality of state dimensions can be used to identify entanglement and a second portion of the plurality of state dimensions can be used to identify entangled state information. Also, the number of state dimensions for each entanglement basis can be chosen to achieve a desired performance goal. Furthermore, the entanglement basis can be chosen to have a state dimension value that achieves a desired performance metric.

A first receiver probes the first quantum state and generates an electrical signal, probes the second quantum state and generates an electrical signal, and processes the electrical signals to generate a first ordered list of measurement events related to at least one of the first and second quantum states. A second receiver probes the first quantum state and generates an electrical signal, probes the second quantum state and generates an electrical signal, and processes the electrical signals to generate a second ordered list of measurement events related to at least one of the first and second quantum states at an output. In some embodiments, only portions of the electrical signals generated are processed. The first and second receivers can be the same receiver or they can be different receivers. The first and second receivers can be located at the same or at different physical locations.

The first and second receivers can generate additional ordered lists of measurement events related to quantum states generated by the quantum state generator. Some of these ordered list of measurement events can be private, while other of these ordered lists of measurement events can be made public in some way. One or more of the ordered lists can be used to generate a shared secret. One or more of the ordered lists can be used to synchronize clocks.

A processor compares the first and second ordered list of measurement events to identify entanglement pairs of the first and second entangled states. At least one of the first and second receivers can include the processor. The processor can be one or any number of processors that are in some type of communication. Multiple processors can be connected in any number of ways. For example, the processors can be electrically or optically connected via any kind of network. The network can be a synchronous network, an asynchronous network, a switched network, or any combination thereof. The network can be a chip-based network, a circuit board network, or can be a computer-back-plane network. The network can be connected to the internet and/or other public or private networks. The network can include at least one of a fiber optic link, a free space link, or a wireless link. The timing performance of the network can be variable. Also, the processor can be in one fixed physical location or it can be distributed between any number of different physical locations. The processor can be in a fixed position or moving.

The processor is configured to compare the first and second ordered list of measurement events in one or more of various ways. For example, the processor can be configured to correlate and/or compare the first and second ordered list of measurement events in one or more of numerous ways to identify similarities and/or to identify the existence of a mutual relationship between the first and second ordered list of measurement events in order to identify entangled quantum state information comprising existence of entanglement pairs of the first and second entangled states.

The first and second ordered list of measurement events can include a list of measurement events that are ordered as a function of any number of a plurality of entanglement bases, such as, for example, wavelength, time, polarization, or spatial position bases. The first and second measurement events can be one or more of numerous types of measurement events including, for example, measurement times, differences between measurement times, spatial position measurements, wavelength measurements, polarization measurements, and/or any combination of these and other kinds of measurements. The measurement events can be discrete quantum measurement events. The discrete measurement events can be derived from continuous quantum bases. Thus, in many embodiments, the list of measurement events is ordered as a function of at least one of time, spatial position, wavelength, and/or polarization.

A multi-dimensional entangled quantum state receiver according to the present teaching can include a first quantum state splitter element that receives single photons and that passes single photons with a first quantum state. A second quantum state splitter optically coupled to the first quantum state splitter element receives single photons and passes single photons with a second quantum state. A single photon detector generates an electrical signal in response to a detected single photon. A processor processes the electrical signal generated by the single photon detector and generates a list comprising a sequence of arrivals of single photons based on the processed electrical signal.

Some configurations pass single photons with a third and a fourth quantum state and include a second single photon detector that detects passed single photons. The processor or a second processor generate a second list comprising a sequence of arrivals of single photons. The first quantum state and the third quantum state can be orthogonal quantum states in some implementations. Also the second quantum state and the third quantum state can be the same quantum state.

A method for determining quantum entangled state information according to the present teaching includes generating a plurality of first photons and generating a plurality of second photons, wherein the first and the second photons have entangled quantum states. The plurality of first and the plurality of second photons are entangled in at least one basis that can include polarization, wavelength, space, and/or time. A first ordered list of events is generated in response to measuring at least one of a first and second quantum state of at least some of the plurality of first photons. A second ordered list of events is generated in response to measuring at least one of the first and second quantum state of at least some of the plurality of second photons. In various methods, the first and second ordered list of events can include an ordered list of arrival times of single photons, differences between arrival times of single photons, an ordered list of polarization measurements, an ordered list of wavelengths, or an ordered list of spatial position measurements.

The measuring at least one of the first and second quantum state of at least some of the plurality of first photons can be performed at a physically different location than the measuring of at least one of the first and second quantum state of at least some of the plurality of second photons. The first and second ordered list of events are then compared to identify entangled quantum state information from the entangled quantum states.

In some methods, a plurality of third photons is generated, wherein the first, second, and the third photons have entangled quantum states and then a third ordered list of events is generated in response to measuring at least one of the first and second quantum state of at least some of the plurality of third photons. At least two of the first, second, and third ordered list of events are then compared to identify entangled quantum state information from the entangled quantum states.

A method for generating a shared secret according to the present teaching includes measuring a first plurality of quantum states and generating a first list comprising values related to the measured first plurality of quantum states. A second plurality of quantum states, where at least some of the second plurality of quantum states are correlated with at least some of the first plurality of quantum states is measured. A second list based on the measured second plurality of quantum states is then generated. The first and second lists can be lists of, for example, arrival times, differences between arrival times, time bins, polarizations, wavelengths, spatial positions and any combination thereof. The generated first list and generated second list are compared to find related elements. The comparing can include a correlation or one of numerous types of pattern matching. The comparing can also include sending at least part of one of the first and second list over a network. This method can include generating timestamps and adding the timestamps to at least one of the first and second list. A shared secret is then generated in response to at least two values of the related elements.

In some methods, a third list that includes part of the first list is also generated. In these methods, the generated third list and the generated second list are compared to find related elements. The comparing the generated third list and the generated second list can include transmitting the third list over a network. A shared secret is then generated based on at least two values of the second list that are associated with the related elements.

A method of determining quantum entanglement according to the present teaching includes generating an electrical signal in response to detecting a plurality of single photons. The generated electrical signal is then processed to generate a list representing a plurality of arrival times and polarizations of detected single photons. Some of these methods also include converting the list representing a plurality of arrival times and polarizations of detected single photons into a list comprising time bins. The processing the electrical signal to generate the list representing the plurality of arrival times and polarization of detected single photons comprises determining a time between detector hits for at least one polarization state and recording the time as a number. The generated list is then compared with a second list to determine at least one shared entangled quantum state. The comparison can, for example, be a correlation, and/or finding matches or some kind of relationship between the generated list and the second list at different relative positions of elements in the generated list and the second list.

More specifically, the present teaching includes methods of determining a common reference time between a first and second independent clock, synchronizing a first and a second clock, and locking a first and second clock. A method for synchronizing and locking clocks identifies entangled pairs of photons by comparing a first and second list of measured state values of single photons, wherein the first list is compiled by photon arrival times measured using a first clock and the second list is compiled by photon arrival times measured using a second clock. Entangled pairs of photons are identified by a match of the measured state values of single photons in their respective lists. Elapsed times of the first and second clocks are determined by taking the difference between arrival times of respective identified entangled pairs of photons measured using their respective clocks. A rate of one of the first and second clocks is changed based on a difference between the elapsed times, thereby synchronizing the first and second clocks. Clocks are locked by repeating.

A method of determining a common reference time between a first and second independent clock according to the present teaching includes generating a plurality of first photons and a plurality of second photons, where respective ones of the plurality of first photons and the plurality of second photons are entangled in a first basis, which is time, and entangled in a second basis comprising a first and second state. The generating the plurality of first photons can be performed simultaneously with the generating the plurality of second photons. It should be understood that other methods according to the present teaching are not limited to having the first or second basis be time. It should also be understood that this and other methods of the present teaching are not limited to a second basis comprising only a first and second state. In particular, the second basis can have any number of states.

A first list is constructed of a measured plurality of state values of the plurality of first photons ordered by their respective arrival times as measured by a first clock. A second list is constructed of a measured plurality of state values of the plurality of second photons ordered by their respective arrival times measured by a second clock. The plurality of state values can be a plurality of polarization values, a plurality of wavelength values, a plurality of orbital angular momentum values, or a plurality of spatial positions.

A subset of second basis state values of the first ordered list is compared to a plurality of subsets of second basis state values of the second ordered list. A matching subset characterized by having at least one state value and its corresponding position that matches at least one state value and its corresponding position in the subset of the first ordered list within the plurality of subsets of the second ordered list is identified. An arrival time associated with one of the state values in a particular position of the matched subset of the second ordered list is identified as an initial reference time for the second clock. An arrival time associated with one of the state values in the subset of the first ordered list that has the particular position of the matched subset of the second ordered list in the subset of the first ordered list is identified as an initial reference time for the first clock. The initial reference time for the first clock and the initial reference time for the second clock establish a common time reference between the first and second clocks.

At least one of the first and second clocks can be adjusted so that their current time is based on the common time reference. Also, at least one of the first and second clocks can be adjusted so that the first and second clocks are synchronized. The first and second clocks can run at different rates. At least one of the first or second clocks can be a free running clock. Also, the first and second clocks can have different absolute times. Also, at least one of the first or second clocks can be derived from a time based from one of a global positioning system (GPS), Network Time Protocol (NTP), Building Integrated Timing Supply (BITS), or Coordinated Universal Time (UTC). The clocks can be physically positioned in different nodes. At least one of the particular positions of the subset of second basis state values of the first ordered list can be communicated between nodes associated with the first and the second independent clocks.

Some methods determine a number of state values in the subset of the first ordered list that lowers a probability of error in identifying the matching subset within the plurality of subsets of the second ordered list. In some methods, the probability of error can depend on a value of a state dimension of the second basis.

In various embodiments, the method can be repeated to establish a second common time reference between the first and second clocks and then to find a difference between the first common reference time and the second common reference time to determine a time offset, and then to adjust at least one of the first or second clock based on the time offset to establish a common clock rate for the first and second clocks. These steps can then be repeated a plurality of times to maintain a common clock rate between the first and second clocks, thereby establishing a locking condition between the first and second clock.

A method of synchronizing a first and a second clock includes identifying entangled pairs of photons by comparing a first and second list of measured state values of single photons, where the first list is compiled by photon arrival times measured using a first clock and the second list is compiled by photon arrival times measured using a second clock, and where entangled pairs are identified by a match of the measured state values of single photons in the first and second list. Some methods generate the entangled pairs of photons so they can be detected at both a first node associated with the first clock and at a second node associated with the second clock. The state values can include at least one of polarization values, wavelength values, orbital angular momentum values, or spatial positions. An elapsed time of the first clock is determined by taking a difference between an arrival time of a first identified entangled pair measured using the first clock and an arrival time of a second identified entangled pair measured using the first clock. An elapsed time of the second clock is determined by taking a difference between an arrival time of the first identified entangled pair measured using the second clock and an arrival time of the second identified entangled pair measured using the second clock. A rate of one of the first and second clocks is adjusted based on a difference between the elapsed time of the first clock and the elapsed time of the second clock in order to synchronize the first and second clocks. The method can be repeated after a new time to synchronize the first and second clocks at the new time. The method can be repeated a plurality of times in order to lock the first and the second clocks. The method can also share the elapsed time of the first clock and the elapsed time of the second clock between a first node associated with the first clock and a second node associated with the second clock.

A method of locking a first and a second clock includes identifying entangled pairs of photons by comparing a first and a second list of measured state values of single photons, where the first list is compiled by photon arrival times measured using a first clock and the second list is compiled by photon arrival times measured using a second clock, and where entangled pairs of photons are identified by a match of the measured state values of single photons in the first and second list. A plurality of elapsed times between identified entangled pairs of photons in the first list is determined. A plurality of elapsed times between identified entangled pairs of photons in the second list that correspond to identified entangled pairs of the determined plurality of elapsed times between identified entangled pairs of photons in the first list is then determined. One of the first and second clocks are then adjusted a plurality of times, where each of the adjustments are based on one of the determined plurality of elapsed times of the first and second lists. The first or second clocks can be adjusted to an absolute time, a relative time, a phase, or a rate.

FIG. 1 illustrates a known delayed choice quantum eraser system 100. See, for example, Kim, Yoon-Ho, R. Yu, S. P. Kulik, Y. H. Shih, and Marlan Scully, "A delayed "choice" quantum eraser," Physical Review Letters, 84 (1): 1-5, 2000. A laser beam 102 is incident on a double slit 104. Light from each slit is incident on a nonlinear crystal 106, for example a Beta Barium Borate (BBO) crystal. The crystal generates entangled pairs of photons that emerge in two directions. These four beams and then pass through a Glan-Thompson prism 108. The upper two beams are focused by a lens 110 onto a single photon detector 112.

The lower two beams pass through an optical prism 114 that passes the lower beam from the first slit of the double slit 104 to a beam splitter 116. The first output of the splitter 116 is sent to a mirror 118 and then to another splitter 120. One output of the splitter 120 passes to a single photon detector 122. The second output of splitter 120 passes to a single photon detector 124. The lower beam from the second slit of the double slit 104 is passed to a beam splitter 126. On output of the splitter 126 passes to a single photon detector 128. The second output of splitter 126 passes to a mirror 130 and to the splitter 120 that passes the beam from mirror 130 to the single photon detector 124. The second output of the splitter 116 is sent to a single photon detector 132.

The single photon detectors 112, 122, 124, 128, 132 are able to distinguish individual photons by detecting the photon energy in the beams that impinges on the detector 112, 122, 124, 128, 132. An electrical signal representing a single photon count is provided at an output of the detectors 112, 122, 124, 128, 132 in a time window in which the single photon impinges. The outputs from all the single photon detectors 112, 122, 124, 128, 132 are provided to inputs of a coincidence counter 134, which registers the counts from all the detectors 112, 122, 124, 128, 132 and aligns the widows to determine when "coincident" counts are realized amongst the different detectors 112, 122, 124, 128, 132. We note that the coincidence counter 134 relies on measurement from both pairs of the entangled photons, and therefore is not suitable for use with entanglement sharing configurations that distribute entangled pairs over substantial distances or when it is impractical to connect all the detectors employed to characterize the entangled photons using a single, co-located device such as a processor.

As understood by those skilled in the art, the coincidence counter 134 electronics can compensate for the respective relative path lengths from the BBO crystal 106 that generates the entangled pairs to the various detectors 112, 122, 124, 128, 132, and also any electrical path length differences within and between the detectors 112, 122, 124, 128, 132 and the counter 134 so that detections associated with entangled pairs are determined as coincidences. In the configuration shown in FIG. 1, the detector 112 is used to find a particular one of a given entangled pair, and the detections from the other detectors 122, 124, 128, 132 are processed to find coincidences with the other of a given entangled pair by the counter.

In this system 100, photon detections at detector 112 of a photon that is an entangled pair with a photon that is detected at detector 122 or detector 124, show interference patterns because path information is unknown. Photon detections at detector 112 of a photon that is one of an entangled pair with a photon that is detected at detector 128 or detector 132, do not show interference patterns because path information is exposed. A ramification of the delayed set up is that the choice of whether to observe interference, or not observe interference, which is based on the which-path information of the idler, is not made until a time delay after the position of the photon from an entangled pair had already been measured by detector 112.

It is tempting to view this experiment as proving non-causality. However, whether the results are or are not subject to this interpretation, they illustrate important aspects regarding the use of measured outcomes for practical systems that use entanglement and it will be understood that the present teaching is not limited by any particular interpretation. Experiments based on the quantum eraser system 100 are popular in physics laboratories to teach students about quantum properties and various interpretations of quantum behavior. One feature of the present teaching is that it provides a low cost and high-speed detection and analysis for these and other quantum eraser system demonstrations.

One feature of the present teaching is the recognition that the important outcomes of entangled systems rely on measured states only. It is only necessary to know that measuring an entangled photon "collapses" a shared state. We note that the term collapse is commonly referred in the art, but regardless of the terminology, measurement of a quantum entangled state indicates the quantum state of its entangled pair. This is regardless of whether a measurement of one part of the system is interpreted as "causing" the correlation or not. That is, a key aspect is that both measurements of an entangled state are perfectly correlated.

Numerous entanglement experiments use time coincidence counters to verify entanglement and prove the Bell inequality. These experiments rely on time coincidence, for entanglement generated by spontaneous parametric down conversion as a valid determinant of entanglement. However, coincidence counters can be difficult to use in practice. For example, even the length of the wire between the detector and the counter can skew timing. The future success of transition of quantum systems to practice demands systems and methods that can allow the use of quantum "coincidence" detection schemes in real life systems. Systems and methods are needed that can scale and provide coincidence determination in real systems that are separated spatially, including over vast geographical distances. Systems and methods are needed that use existing classical networks to do the "classical part" of realizing these systems without building an overlay network with precise latency guarantees. The system and method of sharing measurement combs of the present teaching addresses these challenges.

One feature of the present teaching is that it supports the use of so-called "high brightness" single-photon sources to generate quantum entangled photon pairs that are shared. Some of these high-brightness sources create large numbers of quantum entangled pairs using Spontaneous Parametric Down Conversion (SPDC). These systems are optically pumped crystals with a laser source. The crystals emit photons that are entangled in one or more basis which may include polarization, frequency (color), space, and/or time. Thus, the state of the photon emitted in this multi-dimensional quantum state can be measured and represented as having a time, a position, a frequency and/or a polarization. In various embodiments, numerous subsets of the possible states are generated, measured, formulated as a comb and/or shared as a comb.

A comb is a list of values of selected measured states. Said another way, a comb is an ordered list of measurement events. In some embodiments, a comb is a list of measured states in the order they arrive at a measurement node and/or a particular detector or group of detectors in the measurement node. In some embodiments, a comb is a list of measured states in an order they are measured. In some embodiments a comb is a list of measured states and/or the time of arrival. In some embodiments, a comb is an ordered list of measured events from different spatial positions. In other embodiments, a comb is an ordered list of measured events from different polarizations. In other embodiments, a comb is an ordered list of measured events from different colors. In yet other embodiments, a comb is a combination of measured events that may include any combination of the above and any other type measured events.

The comb time can be measured from various bases in various embodiments. In some embodiments, the come time is measured using a local clock. In some embodiments, the local clock is synchronized in a relative and/or absolute basis to a non-local clock using systems and methods known by those skilled in the art. In some embodiments, the clocks are free running clocks that are synchronized using shared entanglement via methods described herein. In some embodiments, a comb includes more than one value per measured state. The value can be, for example, polarization, arrival time, frequency/color and/or spatial position. This is the case, for example, if an entangled state is a hyper-entangled state, where a single photon of a pair or set is entangled in more than one way (dimension or basis). In some embodiments, different members of a comb have different values. That is, a comb can include more than one type of entangled state where the more than one types are not entangled with each other. This could be the case, for example, if quantum states from two different sources generating entangled states were multiplexed. This could be done, for example, to increase the rate of entangled pairs being generated.

In SPDC sources, the time entanglement occurs as photons created by this process are "born" at the same moment in time with absolute precision ($\Delta t=0$), although the actual birth time is a random process and unknown and thus satisfies the superposition requirement for being quantum entangled.

The frequency, which can also be referred to in the art as color or wavelength, entanglement occurs due to the conservation of energy. For photons, $E=h\nu$ where h is Planck's constant and v is the frequency. The energy in the laser pump photons (frequency/color) determines what frequencies are available to the entangled photons that are generated by the process. However, any given pair of generated photons can be in any allowed combination and thus the particular color is unknown at the source, satisfying the conditions for being quantum entangled. As one example, for frequency entanglement, if VL is the frequency of the pump and Vi is the frequency of the idler photon, and Vs is the frequency of the signal photon, then: $E=hVL=hVi+hVs$, or $E/h=VL=Vi+Vs$.

Polarization entanglement can be realized by using two crystals back-to-back with a length that is less than a coherence length of the pump source. Each crystal is configured to generate a particular polarization state of the output based on an input polarization of the pump. However, it is unknown at the output of the back-to-back crystals which crystal generated the pair, and thus what polarization state of a given pair is unknown at the source, satisfying the conditions for pairs being quantum entangled in polarization.

Spatial entanglement is realized by relying on conservation of momentum. In general, there can be multiple spatial directions along which pairs are provided that is based on the birefringent properties of the crystal. In these configurations, a particular one of two, or one of a continuous spatial region (e.g. a cone-shaped region) of a position of a particular pair is unknown at exit to the crystal. This then satisfies the conditions for pairs being quantum entangled in space. The spatial entanglement could be, for example, one of two positions, but it could also be entangled in more dimensions and up to a continuous set of dimensions.

A feature of the temporal and spatial dimensions, therefore, is that the amount of information of a particular measurement can be substantially higher than the amount of information in a basis of entanglement that is a "one of two" possibilities basis. Generally, depending on a particular basis type of the entanglement, the measurement can represent an outcome that is one of two, sometimes referred to as a qubit configuration, one of three, one of four, etc. up to a full continuum of values. It should be understood that the information within a continuum of values is only limited by the resolution of the measurement apparatus. We refer herein to the extent or number of possible measurement outcomes of a particular basis as the "state dimension" of the basis. It should be understood that the term "state dimension" is different from the term "dimension", which is also used herein as applied to entanglement. In the art the term "dimension" is sometimes another word for the term "basis". The usage is clear from the context of the discussion of the present teaching. One skilled in the art will appreciate that the quantum literature uses these various terms interchangeably.

Continuous values as part of an entanglement measurement are practically limited by the measurement resolution available for measuring that dimension. Entanglement dimensions (basis types) that provide a continuous set of values (continuous state dimension) are sometimes referred to as a continuous variable configuration. As described herein, both countable and continuous entangled dimensions are amenable to using the system and method of measurement comb sharing of the present teaching. Each type of dimension (basis) provides various and sometimes different benefits, e.g. noise and/or background immunity, within a particular embodiment of a system and method of entanglement sharing that uses state combs of the present teaching.

Figure 2A:
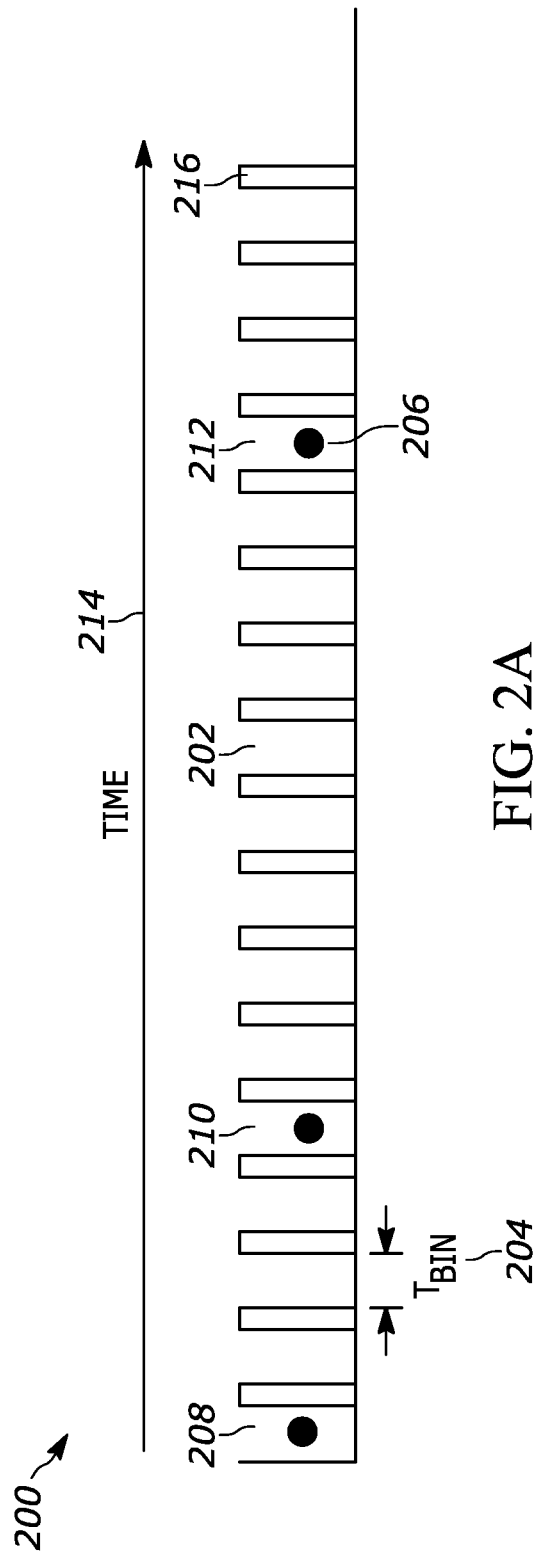
FIG. 2A illustrates an embodiment of a time-based state comb for a shared entanglement method and system of the present teaching.

FIG. 2A illustrates an embodiment of a time-based state comb 200 for a shared entanglement method and system of the present teaching. A time-based state comb 200 is defined by bins 202 having a bin length 204, $t_{bin}$, where samples are inserted. The bins 202 progress along a continuous local time axis 214. A measurement of a single photon is placed in a time bin, forming a "sample" 206 that corresponds to the time along the axis when it was sampled in a bin. In the comb 200 of FIG. 2A, there is a sample in the first bin 208, the fifth bin 210 and the fourteenth bin 212, of the series of bins that run along the time axis 214.

In some embodiments, the bins 202 are separated by a bin separation time 216. This separation time 216 can be short or long compared to a bin length, $t_{bin}$, 204. The bin separation time 216 may be a period where no measurement can be made, for example a blanking time in a detector. Thus, the bin separation time 216 may result from limitations of the speed of the detector and/or measurement apparatus. The bin separation time 216 may also just be a period where no measurement is chosen to be made. The bin separation time 216 may be chosen to provide a desired time pattern of the comb 200. In some embodiments, the bin separation time 216 is substantially less than, e.g. <<1% of, the bin time 204.

An important feature of the present teaching is the realization that while some embodiments of a comb 200 of the present teaching demand stringent requirements on bin length 204 duration and/or bin separation time 216 duration, other embodiments are less dependent on the particular values of bin length 204 and bin separation time 216, as long as these parameters 204, 216 are well defined.

One feature of the present teaching is that cross correlation of combs generated through detection of pairs of entangled photons allows the sharing of the entangled quantum states in a way that is robust against noise and/or errors in the measurement. In an ideal case, correlating two combs of entangled pairs would yield a count of the number of pairs at the alignment condition and a count of zero at every other position. In practice, noise counts will errantly align, and so positions other than pair alignment will have non-zero counts. Combs may be configured to try to maximize the likelihood that when two combs are aligned, we have identified the correlated thus alignment of entangled photons. Comb processing benefits from the statistics of the pair creation versus the noise. Uncorrelated events that occur at the same time have probabilities that multiply. The entangled pair generation is guided by a probability of generation, which is in SPDC systems nominally proportional to pump energy. The noise photons occur in pairs with a probability of a single photon squared. This means the noise is naturally suppressed as compared to the signal of the correlated pairs during the process of adding the two combs at the alignment position.

Figure 2B:
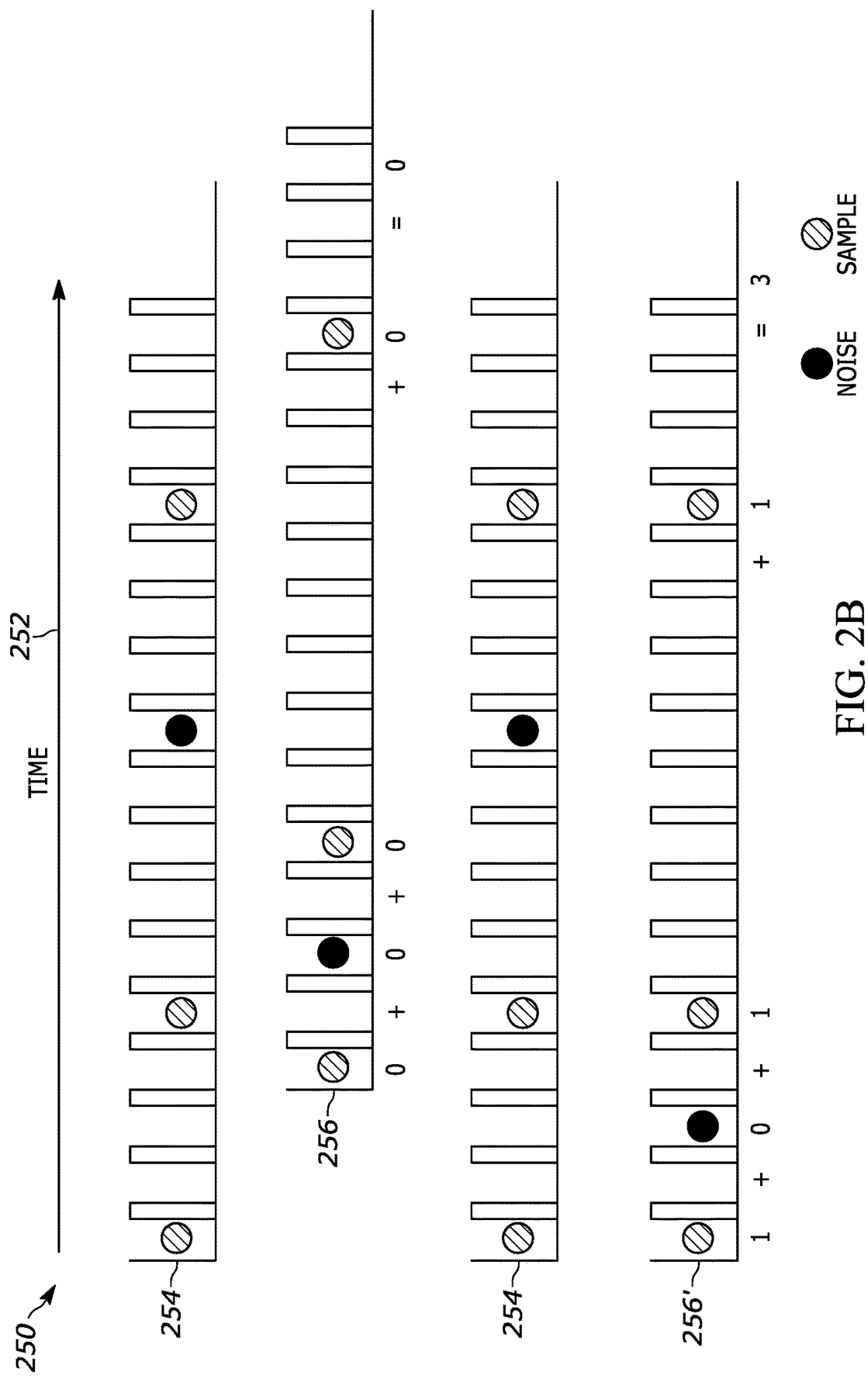
FIG. 2B illustrates an embodiment of time-based state combs for entanglement sharing being correlated of the present teaching.

FIG. 2B illustrates an embodiment of time-based state combs 250 for entanglement sharing being correlated of the present teaching. A time axis 252 represents local time at one measurement site that is receiving a stream of single photons having one of the pair of generated entangled pairs. In this case, the measurement site is the site associated with the comb 254. Similar to the comb described in connection with FIG. 2A, a measurement of a single photon is placed in a time bin, forming a "sample" dot that corresponds to the time along the axis when the photon was sampled. In comb 254 representing measurements of a stream of one of the pair of entangled photons, there is a sample in the first bin, the fifth bin, the tenth bin and the fourteenth bin. The samples in the first, fifth and fourteenth bins are actual photon measurements and the tenth bin is a noise measurement.

In a comb 256 representing measurements of a stream of the photons of the other of the pair of entangled photons, there is a sample in the first bin, the third bin and the fourteenth bin. The samples in the first, fifth and fourteenth bins are actual entangled photon measurements and the third bin is a noise measurement. The time bins of two combs 254, 256 are slid by each other one-time bin at a time. At each discrete position, for example the point where time bins of equal size align, a count of the number of correlated measurements, for example, bins with the same sample state, is made. This step and compare by adding up correlated measurements can be performed using an algorithm. The algorithm looks for the position with a maximum number of correlated measurements. At a first point in the correlation, shown by combs 254, 256, there are no matched states, and the correlation value is zero.

If a noise event is measured on one comb and not the other, it is not counted. Because this represents a position where the measurement of pairs is not aligned, the only matches would be if two noise photons overlapped, or a noise event in one comb happened to match a detected pair photon. The time bins are matched for maximum cross-correlation when the count is maximized. This method of matching combs will be understood by those skilled in the art as the equivalent of a cross correlation function for vectors that consist of just 2 states, 1 and zero. For the example shown in FIG. 2B, that occurs where the three samples line up. The maximum correlation occurs with the position shown in comb 254 and comb 256. The value is three matches. There are no contributions from noise photons in this example. The number of calculations, or in this case, different relative comb positions that must be added, is equal to the number of time bins of a particular measurement comb.

As described herein, time bins 202 of a time-base state comb 200 may contain a variety of different kinds of state measurement values, including one or more values per photon (bin). For example, bins may contain markers that indicate simply that a photon was detected (sometimes referred to as an event), or they may include the actual measured value of one or more states of that detected photon (e.g., wavelength or polarization). If a measured value is available, a correlation is only counted if the measured value matches. This gives the correlation more specificity, and more noise immunity. This method will be understood by those skilled in the art as a variation on a cross correlation function, where rather than multiplying values and summing, we are only counting perfect matches. For example, if the states were 1, 2, 3, 4, 5 and two states matched with the value of 3, rather than multiplying 3×3 then as adding 9 to the total, this method would add 1 to the total.

It is possible to provide a closed-form assessment of the noise limits in some embodiments of the combs of the present teaching. For example, for a case of combs resulting from detections of pairs of entangled photons, we can define: 1) the P(Entangle Pair Generation)=P(EPG) as the probability in a single time window an entangled source will give birth to an entangled pair; 2) the P(Noise Detector 1)=P(ND1) as the probability in a single time window a noise photon will be detected at a first detector; and 3) the Prob(Noise Detector 2)=Prob(ND2) as the probability in a single time window a noise photon will be detected at a second detector.

The cross correlation is represented by a function:

$$C(k)=\Sigma_{k=-\infty}^{\infty} d1(m)d2(m-k).$$

For this function, k=offset (that is, the amount the comb is slid forward or backward in time), d1(m) is an array of sampled values at the first detector, and d2(m−k) is an array of offset (by k) sampled values at the second detector. The +/−∞ in this case is theoretical. In practical cases, you can stop calculating C(k) when you have exhausted the sample set. Approaches for practical cross correlation and matching systems and methods are described in more detail later.

A match is found when a maximum is located for C(k) over all values of k. When the maximum is found, the combs are correlated when offset by k. The elements that match form a random set that is perfectly correlated with another random set.

We refer to good bits as those originated at the entangled source. Good bits are entangled pairs that align in the same time window at the first and second detectors with a k offset after a correlation match (C(k) maximum) is established. Good bits arrive with a probability, P(EPG). Bad bits originate from uncorrelated noise sources. Bad bits are uncorrelated pairs that align in the same time window at the first and second detector with a k offset after a correlation match (C(k) maximum) is established. Since noise sources at both detectors are independent random variables, the probability of bad bits is given by P (ND1)*P (ND2). That is the probability of a simultaneous noise event at both detectors. A good match is defined as a maximum for C(k) caused by a preponderance of good bits. A bad match is defined as a maximum for C(k) caused by a preponderance of Bad Bits.

The threshold required for a match should is determined by the point where C(k) is maximized when k is such that the number of bits, good or bad, align. If the alignment occurs because there are more bad bits than good bits, it is an erroneous match. That is, the value of k is not an alignment of good bits. A good match requires the number of good bits be greater than the number of bad bits. When bins are processed via C(k), if either bin has a zero in it, it will not contribute to C(k). If both bins have a one in them, they will contribute to C(k) a value of 1 which will be accumulated with other bins that have a one in them. C(k) can assume a large value either from contributions from noise or entanglement.

Good matches and bad matches can be expressed in terms of probabilities. The probability of a single good bit in a time window is P(EPG). The probability of a single bad bit in a time window is P(ND1)*P (ND2), so with a comb length of n bits the average number of good bits in the comb is n*P(EPG). The average number of bad bits in the comb is n*P(ND1)*P(ND2). For the comb to provide a good match the good bits must be greater than bad bits, or: n*P(EPG) >n*P(ND1)*P(ND2). Thus, it is likely that a comb can be cross-correlated if P(EPG)>P(ND1)*P(ND2).

The probability of the first bit being bad is P(ND1)*P (ND2). The probability of the second bit being bad is P(ND1)*P(ND2). The probability of b bits being bad is n*Prob(ND1)Prob(ND2) where n is the comb length. Similarly, the probability of g bits being good is n*P(EPG) where n is the comb length. For the cross correlation to work, g>b and this is given by the expression:

$$P(g>b) = \frac{\text{expection value of } g}{\text{expectation value of } b + \text{expectation value of } g}.$$

Substituting in n times probabilities to calculate expectation values leads to:

$$P(g>b) = \frac{nP(EPG)}{nP(ND1)P(ND2) + nP(EPG)}.$$

Factoring out the n produces the closed form equation for a probability of a successful correlation as:

$$P(\text{Successful Cross Correlation}) = \frac{P(EPG)}{P(ND1)P(ND2) + P(EPG)}.$$

Or, if the noise to at the first and second detectors are equivalent:

$$P(\text{Successful Cross Correlation}) = \frac{P(EPG)}{P(\text{noise})^2 + P(EPG)}.$$

Thus, the rate of entangled pair creation divided by the rate of noise-pair detections plus good entangled pairs determines the probability of successful correlation. For example, at relatively high noise levels of even 1/10 time windows, P(Bad Bits) would be 1/100 time windows. Thus, the combs of the present teaching are nominally quite robust to this kind of noise.

Figure 2C:
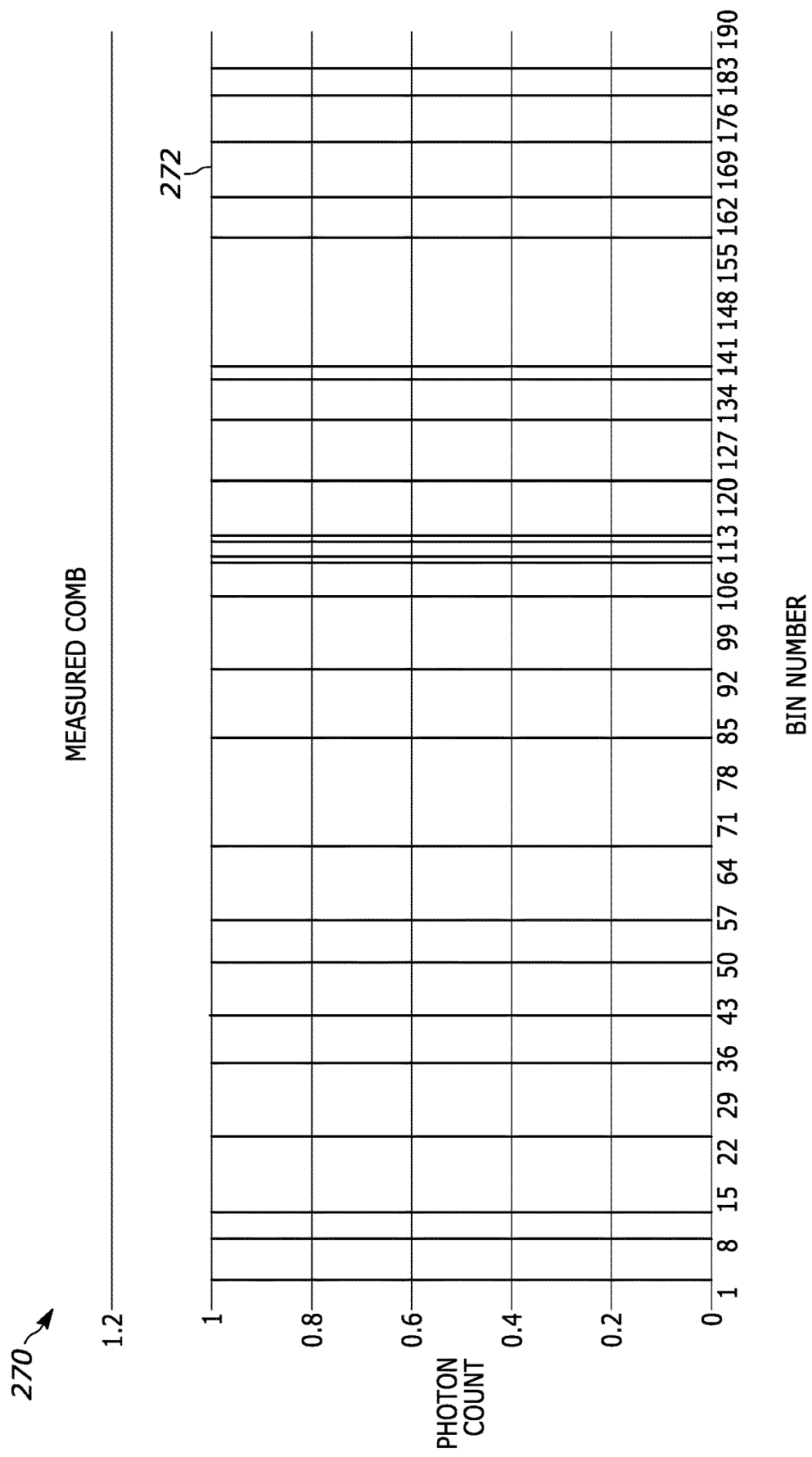
FIG. 2C illustrates a measured comb from a stream of photons from one output of an embodiment of a Spontaneous Parametric Down Conversion (SPDC) entangled source and receiver of the present teaching.
Figure 2D:
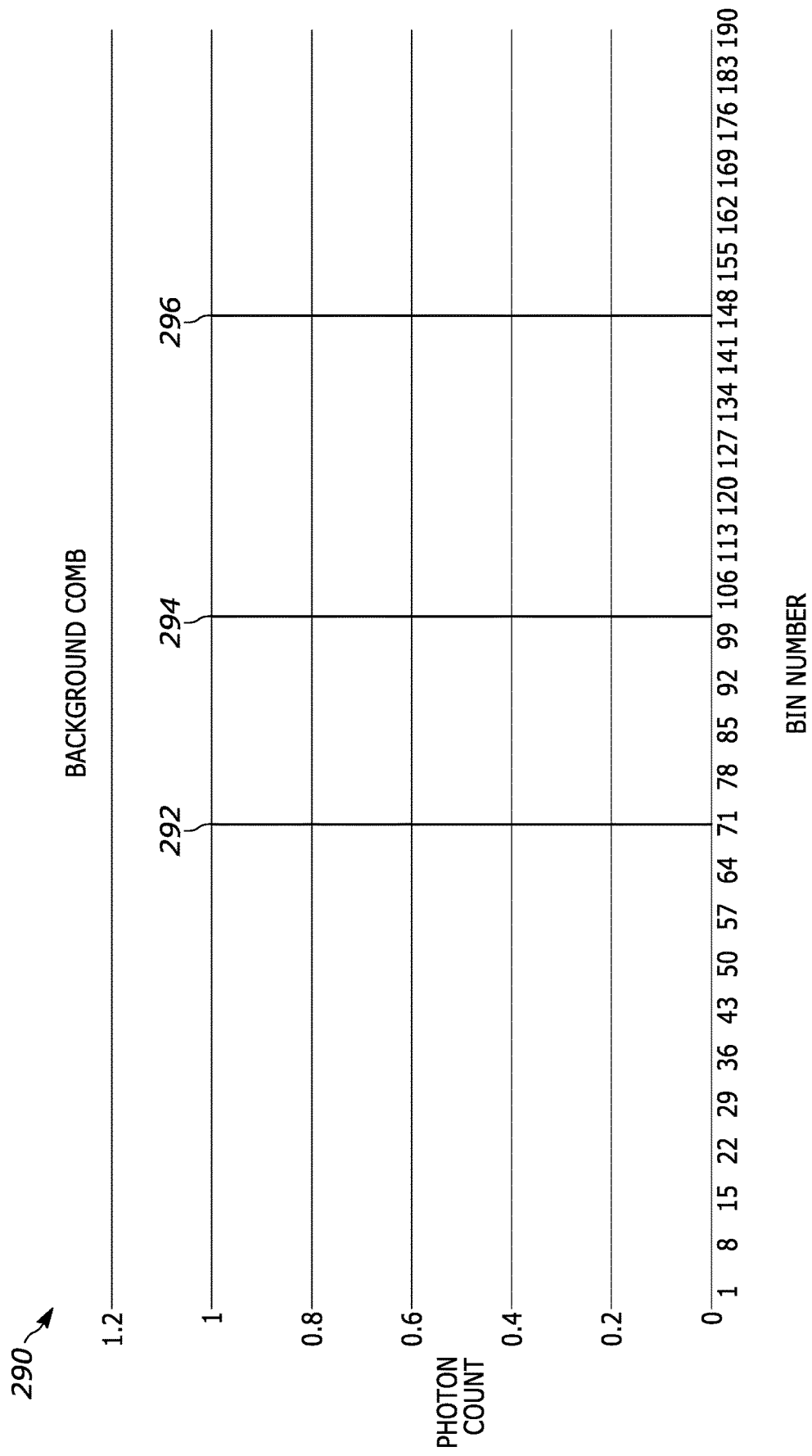
FIG. 2D illustrates measured background from the embodiment of an SPDC entangled source and receiver with the output blocked of the present teaching.

In general, noise levels are related to the ability to isolate photons that are entangled from photons in a background. FIG. 2C illustrates a measured comb 270 from a stream of photons from one output of an embodiment of an SPDC entangled source and receiver of the present teaching. This measured comb 270 shows photon counts in 1-ms bins. There are twenty-five measured single photons in one hundred and ninety bins, so the photon rate is nominally one hundred and thirty-two photons per second. There are more empty bins 272 than photon counts. FIG. 2D illustrates measured background 290 from the embodiment of an SPDC entangled source with the output blocked of the present teaching. There are three photon events 292, 294, 296 measured in the 190 bins. Thus, the background rate is nominally sixteen photons per second. This experimental data illustrates that it is possible to achieve substantially more good bits (pairs) as compared to bad bits (background photons). In this case the ratio of good bits to bad bits is about seventy-five.

Quantum measurement combs generally are ordered lists of discrete quantum measurement events. They are discretized by the quantum nature of the measurement. These measured events may or may not be mixed with noise events. The variety of types of combs is related to the number of basis types for quantum measurement of a particular photon source. Photons can carry a large variety of quantum state values (quantum information), and so are a good example of a quantum physical system to illustrate the power of quantum measurement combs for sharing entanglement. However, it is important to understand that the present teaching is not limited only to photonic quantum physical systems, as the sharing of measurement combs can be generally applied to entangled quantum systems in any system platform including, but not limited to, atoms, ions, superconductors, and numerous other electronic physical forms.

For some example comb types for photonic quantum entangled systems include:
1) time bin combs—comprising, for example, a list of discrete single photon measurement events, placed into time bins corresponding to when they occurred; 2) measured time combined event combs, for example, comprising a list of discrete events with a measure of the time between events; 3) event combs, for example, comprising a list of the states associated with discrete measurement events, listed in the order they occurred. A real time clock measurement can be added to any time comb. It indicates the local clock time at the detector for any or all specific measurement(s) in the comb.

One feature of the present teaching is that the quantum measurement combs can be used to improve and simplify the use of entanglement resources in a variety of applications, including, for example, 1) simplifying classic quantum experiments including the quantum eraser, ghost imaging, and Elitzur-Vaidman bomb-tester, for example for use in, teaching labs; 2) sharing secrets such as crypto keys; 3) performing deterministic communication with no classical data exchange of the information in the message; 4) measuring distance and/or locating objects 5) synchronizing clocks; and/or 6) detecting eavesdroppers. One feature of the present teaching is that it can be used with systems that include various quantum entangled storage systems. The cache can be useful for storing and/or delaying one or both of the photons of an entangled pair. This can be useful for timing, aligning and/or ordering photons for analyzing and/ or detecting operations.

Figure 3A:
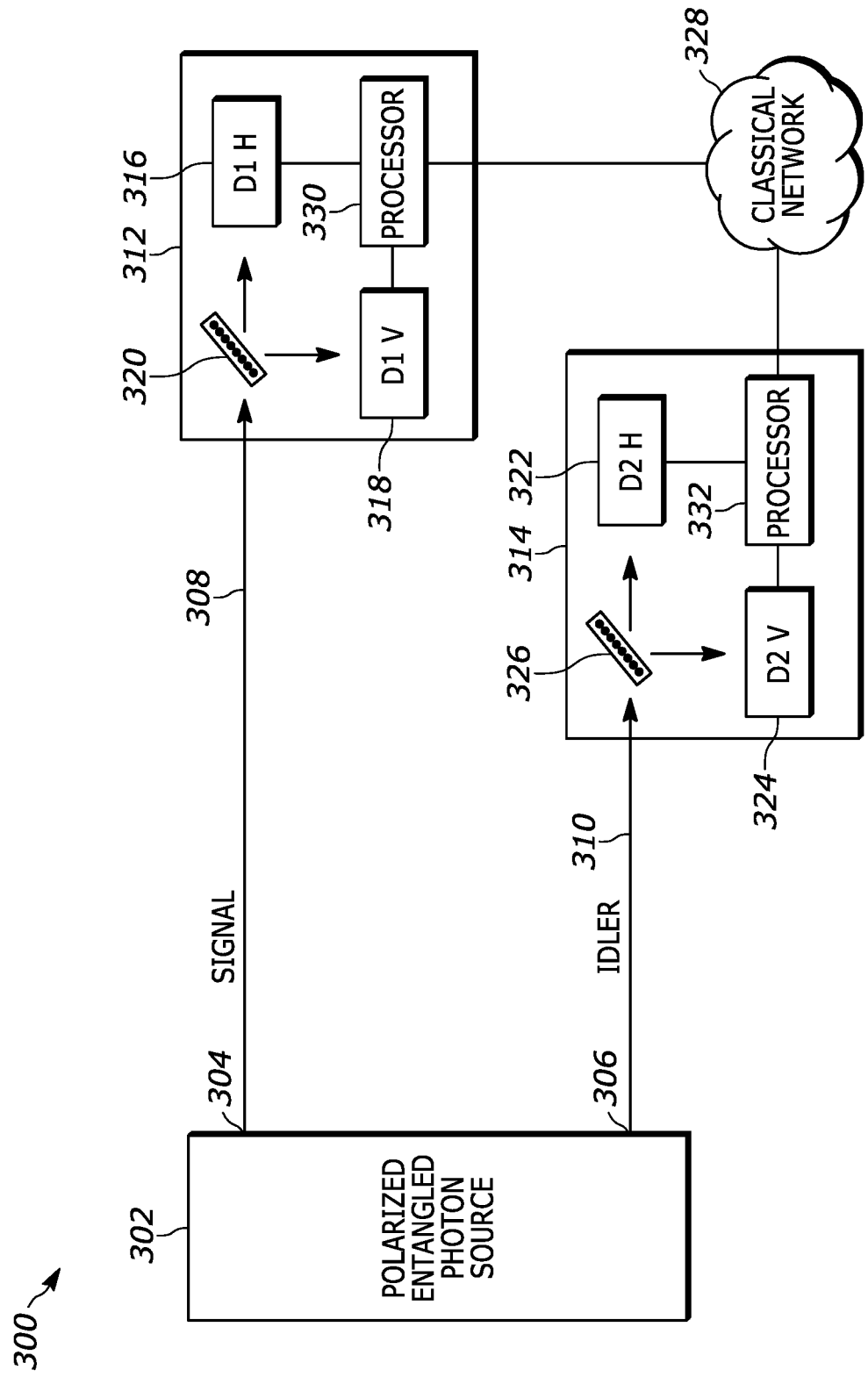
FIG. 3A illustrates an embodiment of a system for generating a shared state comb in time and polarization of the present teaching.

FIG. 3A illustrates an embodiment of a system 300 for generating a shared measurement comb in time and polarization of the present teaching. A polarization entangled source 302 produces entangled pairs that emerge from a pair of ports 304, 306. The first port 304 is illustrated as producing a signal photon, and the second port 306 is illustrated as producing an idler photon to aid in the description, but is not so limited. In general, one of a pair of entangled photons will appear at the first port 304, and the other will appear at the second port 306. In some embodiments, the source 302 generates a photon at the first port 304 that is entangled in time and polarization with a photon that emerges at the second port 302. Thus, when a photon that emerges from the first port 304 is measured to determine its polarization and time of arrival, those two values will be correlated with the values of a measurement of polarization and time of arrival of the paired, entangled, photon that emerges from the second port 306.

We denote here the two polarization states as H and V as understood by those skilled in the art as being orthogonal dimensions of polarization. While H is associated with a horizontal dimension and V is associated with a vertical dimension, these are arbitrary designations. Values of polarization are random variables that emerge from the source ports 304, 306. The measured values of the random variables are perfectly correlated from pairs. In the case of polarization for many embodiments, measurement of a value H for one photon in a pair produces a value V for the other measured pair. However, the polarity of the correlation is arbitrary, and depends upon particulars of a measurement configuration. The key is that measured values can be correlated to find a match. If only the polarization (or any two-state-dimension basis) is being used to find a match, it is clear that more than one or even two of the measured values are needed to establish the match. This is described in more detail below, such as in connection with the description of FIG. 16.

It should be understood that a time of arrival of any given photon at a detector is determined by a path length from the source 302 to a detector and that this value of path length may change over time, both intentionally and non-intentionally. It should also be understood that it is a time between arrivals of photons from two different sets of entangled pairs that is the entangled resource. That is, a time between two successive single photon counts at detectors that are measuring two sets of pairs of time-entangled photons will measure the same time between events that represent detection of a single photon. The actual time may be the same as measured against a common clock, but is more likely to be quite different. One feature of the present teaching is that methods and systems according to the present teaching eliminate the need to maintain a common clock to process the correlated states of entangled pairs.

In some specific embodiments that do not limit the scope of the invention, the entangled photon source 302 is a crystal pumped by a laser that generates time and polarization entangled photons via spontaneous parametric down conversion. One of the entangled pairs is labeled signal and emerges from port 304, and the other is labeled idler and emerges from port 306. The time of photon generation is random; however, it is understood that the idler and signal photons are always generated at precisely the same time. Also, the polarization of the photons is random. However, the idler and signal photons when measured, will always be correlated but will have the same or the opposite polarization depending on the specific crystal used and also the configuration of the detector. The photons are routed over optical paths 308, 310 to two receivers 312, 314. The optical paths 308, 310 can be free space paths or any kind of guided paths, such as a fiber optic links or integrated optical waveguides. It should be understood that the numerous applications of the methods and apparatus of the present teaching will require optical paths that are very short for use in, for example, integrated components and/or mini-free-space optical bench systems, relatively short for use in, for example, a data or computing center, as well as relatively long for use in, for example, applications requiring a long-distance terrestrial, undersea link and/or satellite link. In other words, depending on the application, the optical paths 308, 310 can be on order of microns to on order of many thousands of kilometers.

The first receiver 312 includes a first single photon detector 316 and a second single photon detector 318. The detectors 316, 318 have inputs that are positioned in the optical paths of the outputs of a polarization beam splitter 320. The polarization beam splitter 320 is oriented to pass H-polarized photons to the input of the first detector 316 and to pass V-polarized photons to the input of the second detector 318.

The second receiver 314 includes a first single photon detector 322 and a second single photon detector 324. The detectors 322, 324 have inputs that are positioned in the optical paths of the outputs of a polarization beam splitter 326. The polarization beam splitter 326 is oriented to pass H-polarized photons to the first detector 322 and to pass V-polarized photons to the second detector 324.

The two receivers 312, 314 are also connected via a classical network 328. In various embodiments, the classical network 328 can be any of a variety of known networks. For example, the networks can be fiber optic networks, wireless networks, satellite networks, free space optical networks and/or combinations of these networks. A key feature is that it is not necessary that the networks have any particular performance characteristics, such as latency guarantees, timing and/or synchronization requirements, packet loss performance and other known network performance metrics.

Thus, the networks can be best effort, connectionless networks or they can be connected networks. The networks can also include, for examples, networks configured for data exfiltration applications. The networks can also include freely available and/or best effort kinds of networks such as the Internet and various shared wireless networks. The networks can be large networks or small networks. In addition, the networks can include chip-based communication networks and computer backplane networks, data center networks, local area networks (LANS), metro-networks and/or wide area networks (WANS). In addition, the networks can have variable timing performance. In particular, the networks can include synchronous networks, asynchronous network, switched networks and/or the Internet. One feature of the present system and method for sharing measurement combs is that performance of the scheme is not necessarily dependent on a performance of the classical network 328. One feature of the present teaching is that the latency of the classical network 328 in many embodiments is not material to system performance. This is a substantial advantage of the present teaching over known entanglement sharing configurations that use, for example, a trigger system and coincidence counter for which timing and latency are key parameters in exposing the entangled correlation behavior of the quantum system.

In many embodiments of the system of the present teaching, the receivers 312, 314 have information on timing of every photon arrival. This information can be through a combination of arrivals detected in the detectors 316, 318 or detectors 322, 324 in a given receiver 312, 314, as well as the polarization of each arrival. For example, the detectors can be configured to generate an electrical signal in response to receiving a single photon in a first state of polarization at a particular time. This allows the measurement of both the time of arrival and the polarization state. Some or all of this information may be included in the comb generated by the processor 330, 332 and shared. That is, the processors 330, 332 can process the electrical signals from each detector, that include information regarding arrival time of a photon and a polarization state for each measured photon, in a way that uses some or all of the measured state information as needed by a particular comb for a particular application. Combs may include, for example a list of times of arrival (timing comb) and no polarization state information, and/or a comb may be generated to include polarization values and time of arrival. A sequential list of polarizations may also be generated using the single photon events captured by the detectors 316, 318, 322, 324.

The system 300 of FIG. 3A can be used for applications that share a random secret. In this application, signal photons arrive at the D1 receiver 312. After passing through or being reflected by the polarization beam splitter 320, they are detected by either detector D1H 316 or detector D1V 318 based on their polarization. The time of detection and the polarization are recorded in a timing comb generated in processor 330 as described herein. Idler photons arrive at the D2 receiver 314. D2's polarization beam splitter 326 is oriented for the same basis as D1's beam splitter 320. When the idler photons strike the polarization beam splitter, they are routed to either detector D2H 322 or detector D2V 324 based on their polarization. The time of detection of and the polarization are recorded in a second timing comb generated in processor 332 as described herein.

Processor 330 in D1 receiver 312 shares its timing comb over a classical channel provided by the classical network 328 with just a mark indicating windows where a detection occurred and not the polarization measured for the photon that is sampled at the mark. Processor 332 in D2 receiver 314 then slides its generated comb in time through the comb generated by processor 330 and counts the number of correlated detector hits. When the number of correlated detector hits is maximized, processor 332 in receiver D2 314 uses its measured polarizations in those bins as the correlated data which becomes the shared secret.

This process of sliding combs to generate a maximum may be referred to herein as a quantum cross-correlation. By sliding the combs in the processor 332 to achieve maximum correlation, the time-of-flight from the entangled source to each of the receivers is zeroed out and immaterial to the outcome. It is understood by those skilled in the art that either receiver 312, 314 can perform the process of sliding combs to determine a maximum. As understood by those skilled in the art, if a fixed path length offset is established between the two nodes, then the time position, or relative offset, determined by the finding of the maximum in the auto-correlation tracks any changes in the relative path length. Thus, the combs of the present teaching can be used to determine relative positions, or relative changes in path length from source 302 to receiver 312, 314 in the system 300.

The particular configuration of the receivers 312, 314 that include a polarizing directing element 320, 326 is just one specific example. The receivers may be constructed more generally so long as each detector generates an electrical signal at an output in response to receiving a single photon in a particular state of an entangled system's possible states.

Information in the electrical signal generated by each detector includes the arrival time of the single photon. This is true whether the arrival time is an entangled resource and therefore non-deterministic, or the single photon arrivals are deterministic. Because each detector's measurement of a photon includes arrival time and an additional state value of the detected photon, the processor can produce a sequence of measured states based on the order of arrivals and this sequence does not include the arrival time intervals. Thus, a comb sequence can be generated by a processor whether or not a particular time interval of photon arrivals is also included, as required by a particular application. As described herein, different comb sequences (i.e. different ordered lists of measurement events) that contain different measured variables are kept private, or local to a node, and other sequences are made public or shared with other particular nodes and can be used for correlation or matching with other combs. The particular quantum measurement information included in comb sequences kept private or made public or shared can also change over time and/or change depending on the particular application.

Figure 3B:
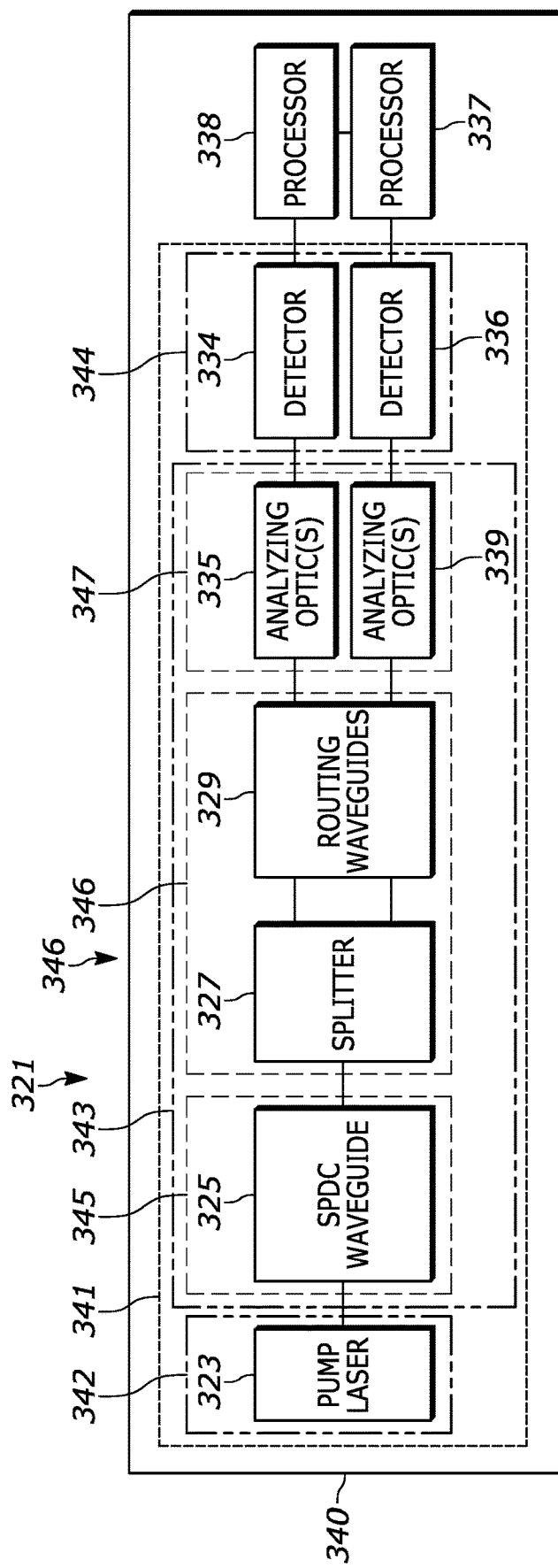
FIG. 3B illustrates an embodiment of a system for generating a shared state comb in time and polarization using integrated optics of the present teaching.

FIG. 3B illustrates an embodiment of a system 321 for generating a shared state comb in time and polarization using integrated optics of the present teaching. The system 321 illustrated in FIG. 3B illustrates how some or all of the components of a system 321 can share a common substrate 340, or a variety of combinations of substrates, 340, 341, 342, 343, 344, 345, 346, 347 as is clear to those skilled in the art. One feature of embodiments of the system 321 that utilize integrated optics is that they support the use of an SPDC that is configured as a waveguide 325. For example, the waveguide 325 may be a periodically polled lithium niobite (PPLN) or periodically polled potassium titanyl phosphate (PPKTP). The analyzing optics 335, 339 can be, for example, integrated gratings, such as Bragg gratings, to separate wavelengths. The analyzing optics 335, 339 can be, for example, integrated polarizing elements, such as dielectric-metal overlay polarizers, to analyze polarization. The detectors 334, 336 can be, for example, silicon single photon detectors, various known nanowire detectors, etc. The pump laser 323 can be, for example, a semiconductor diode laser, diode-pumped solid state laser, etc. The substrates 341, 342, 343, 344, 345, 346, 347 can be, for example, separately or together, lithium niobite, silicon, silicon-on-insulator (SOI), III-V semiconductor substrates.

As one example of the integrated system 321, the processors 337, 338, pump laser 323, SPDC 325, optical splitter 327, waveguides 329, analyzing optics 335, 339, and detectors 334, 335 are positioned on a same substrate 340. The substrate 340 may be, for example, a printed circuit board, silicon or other electronics substrate. In some embodiments, the pump laser 323, SPDC waveguide 325, optical splitter 327, routing waveguides 329, analyzing optics 335, 339, and detectors 334, 335 are positioned on a same substrate 341. The substrate 341 may be a photonic integrated circuit substrate that supports hybrid integration. This allows active elements, such as the laser 323 and detector 344 to be integrated with the passive elements, SPDC waveguide 325, optical splitter 327, routing waveguides 329, and analyzing optics 335, 339.

Figure 3C:
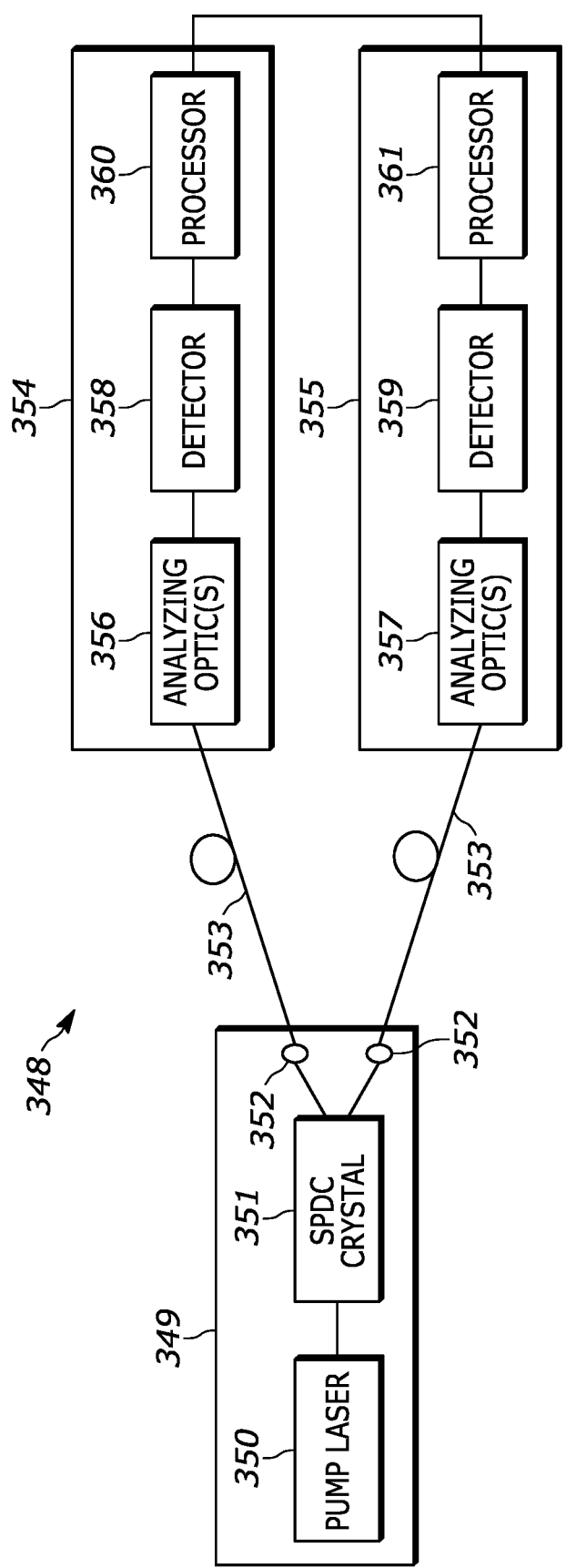
FIG. 3C illustrates an embodiment of a system for generating a shared state comb in time and polarization using fiber transmission of the present teaching.

FIG. 3C illustrates an embodiment of a system 348 for generating a shared state comb in time and polarization using fiber transmission of the present teaching. A source enclosure 349 contains a pump laser 350 and an SPDC crystal 351 configured to produce entangle pairs in optical beams that emerge from the crystal in two directions. There are two receive enclosures 354, 355 that contain analyzing optics 356, 357, single photon resolution detectors 358, 359, and processors 360, 361. The source enclosure 349 is connected to receive enclosure 354 by an optical fiber 353 and the source enclosure 349 is connected to receive enclosure 355 by an optical fiber 353. The processors 360, 361 are also connected by any of a variety of know communication means to share combs.

The optical beams generated by the crystal 351 are each coupled to a respective optical fiber 353 using coupling optics 352. The coupling optics 352 can be, for example, aspheric lenses, cylindrical lenses, GRIN lenses, or other known coupling optics devices. In some embodiments, the coupling optics 352 are configured to transform a portion of an arc-shaped optical beam emerging from the crystal 351 into a shape and divergence suitable for coupling into the respective fiber 353. The optical fiber 353 can be, for example, single mode fiber, multimode fiber, few mode fiber, large area fiber, etc. The analyzing optics 356, 357 may be free space and/or integrated optical implementations that can include polarizing elements, polarization splitters, optical spectral filters, optical wavelength demultiplexers. The detectors 358, 359 can be single element detectors or multiple element detectors.

A feature of the system 348 is that the optical beams comprising entangled pairs generated by the crystal 351 do not need to be within a line of sight of the receiver enclosures 354, 355. The fibers 353 can be of various lengths, including short (e.g. <10 meter) lengths, for example for data center or other short-range applications. The fibers 353 can be a length suitable for campus area or metro area connections between the source enclosure 349 and receive enclosures 354, 355. The fibers 353 can be a length suitable for wider area connections.

While the system 348 is described with reference to various examples of free space and/or integrated optical elements, it is understood that a variety of kinds of elements can be used.

Figure 3D:
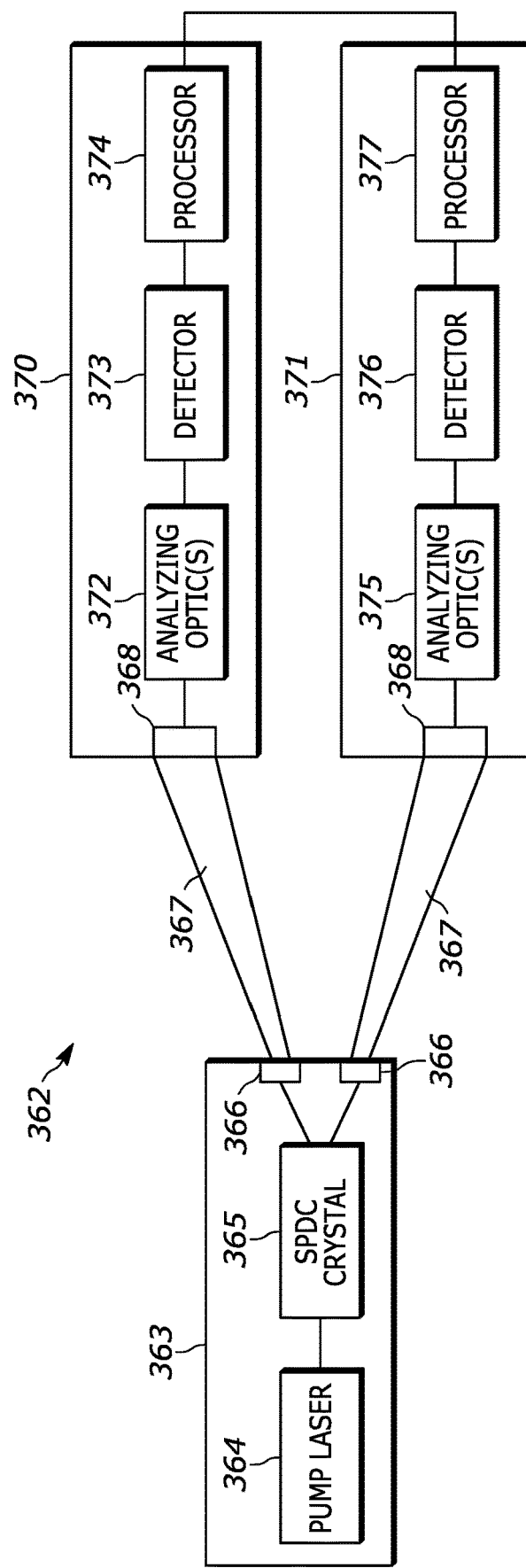
FIG. 3D illustrates an embodiment of a system for generating a shared state comb in time and polarization using free space transmission of the present teaching.

FIG. 3D illustrates an embodiment of a system 362 for generating a shared state comb in time and polarization using free space transmission of the present teaching. A source enclosure 363 contains a pump laser 364 and an SPDC crystal 365 configured to produce entangle pairs in optical beams that emerge from the crystal in two directions. There are two receive enclosures 370, 371 that contain analyzing optics 372, 375, single photon detectors 373, 376, and processors 374, 377. The processors 374, 377 are connected by any of a variety of know communication means so that they can share combs.

The optical beams generated by the crystal 365 are each provided to a free space optical transmit antenna 366. The free space optical antenna 366 can be, for example, various lenses and/or mirror or other optical elements that serve to project the optical beams in a desired direction with a desired shape and divergence. In some embodiments, the free space optical antenna 366 are configured to transform a portion of an arc-shaped optical beam emerging from the crystal 365 into a diffraction limited optical beam 367 that is directed at a respective receive enclosure 370, 371. The two beams 367 may have similar beam characteristics, or they may be different depending on the application. The receive enclosures 370, 317 collect the light in the respective optical beam 367 using optical receive antennas 368 that transform the collected beam into beams that are compatible with free space and/or fiber and/or integrated optical transmission through the optical elements in the analyzing optics 372, 375 in the receiver 370, 371. The analyzing optics 372, 375 may be free space and/or integrated optical implementations that can include polarizing elements, polarization splitters, optical spectral filters, optical wavelength demultiplexers. The detectors 373, 376 can be single element detectors or multiple element detectors.

Depending on the configurations of the optical transmit antennas 366 and the optical receive antennas 368, a variety of distances and positions of the transmit enclosure 363 and receive enclosures 370, 371 can be realized. This includes short (e.g. <1 meter) to long (e.g. 100's of kilometer) distances. While the system 362 is described with reference to various examples of free space and/or integrated optical elements, it is understood that a variety of kinds of elements can be used.

Figure 3E:
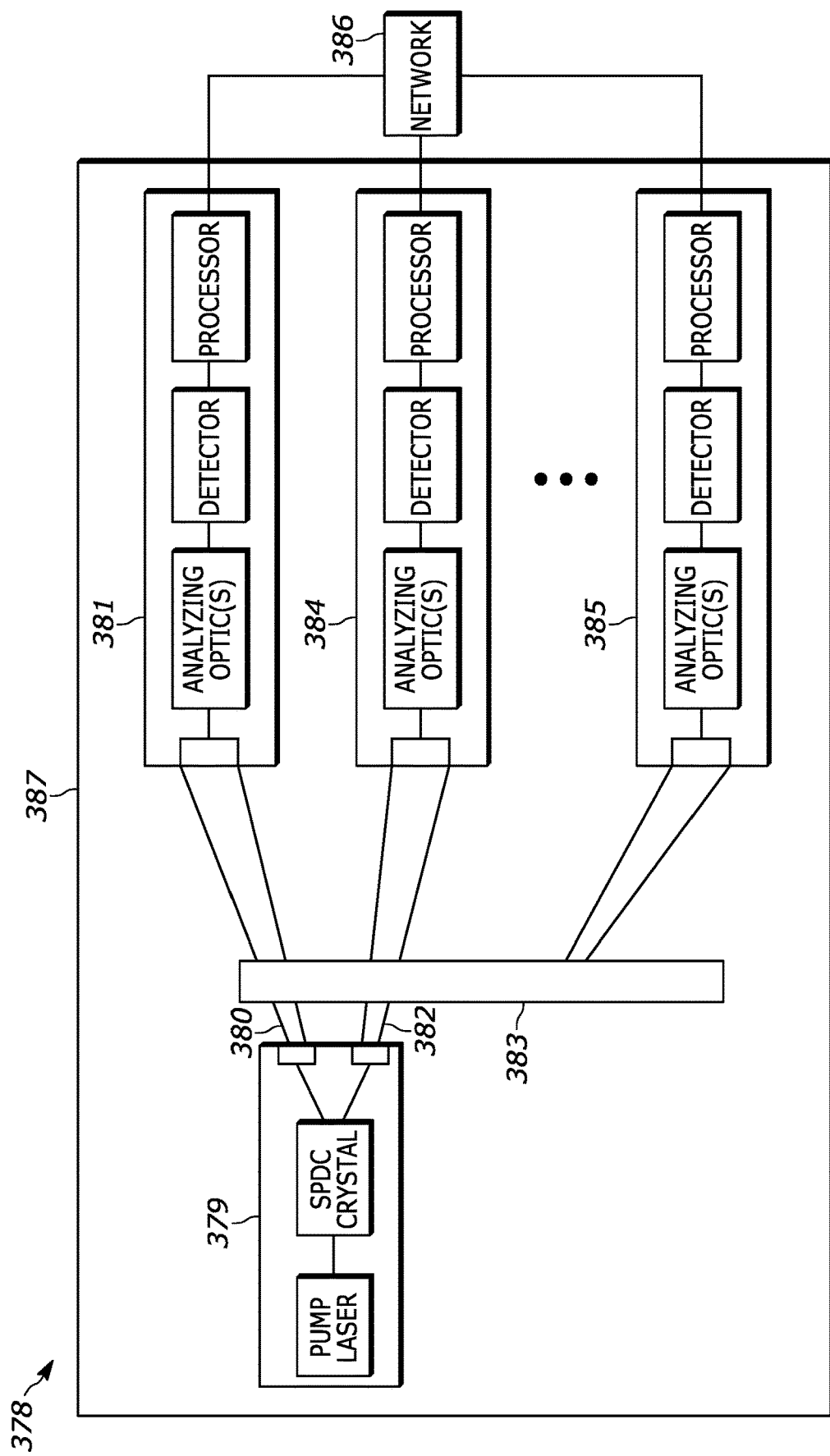
FIG. 3E illustrates an embodiment of a system for generating a shared state comb in time and polarization using an optical switch of the present teaching.

FIG. 3E illustrates an embodiment of a system 378 for generating a shared state comb in time and polarization using an optical switch of the present teaching. The system 378 is described in a configuration that uses free space interconnection of the source 379 and receivers 381, 384, 385, but is not so limited as understood by those skilled in the art. The source 379 and receivers 381, 384, 385 contain similar elements as described, for example, in connection with FIG. 3D, and so will not be described in detail. A key feature of the system 378 that uses an optical switch 383 is that it allows different time segments of the entangled pairs to be directed to different receivers 381, 384, 385. Though only three are illustrated, the switch 383 allows a large number of receivers 381, 384, 385 to share entangled pairs. Based on the switch configuration, for example, for a first time-segment the switch directs optical beams at receiver 381 and receiver 384. During that time-segment these receivers 381, 384 can generate, share and use combs as described herein. For a second time-segment, the switch can be configured to direct the optical beams at receiver 381, 385. During that time-segment these receivers 381, 385 can generate, share and use combs as described herein. The connection pattern and pattern of time segments is general being characterized by directing the two output beams from the source 379 to two receivers 381, 384, 384 at a time and for a duration of a time segment, and this defines the period of comb sharing between the two receivers. For example, the time segment can be part of a repetitive cycle of different time segments. The receiver processors are connected by any of a variety of know communication means so that they can share combs.

In some embodiments, the source 379, switch 383 and receivers 381, 384, 385 are positioned on an electronic substrate 387. However, as is clear to those skilled in the art, numerous configurations are possible, including very large separations (100's of kms) and very small (integrated-optical-level) separations. The switch 383 in various embodiments can include for example, a moving mirror, or other free space optical switch, an integrated optical switch, a fiber optic switch, or any of a variety of spatial optical switches.

The implementations described in connection with FIGS. 3A-E are intended to illustrate the principles of the present teaching using specific examples, but, as is clear to those skilled in the art, the system and method of comb sharing can be generally applied to a wide variety of optical components and devices. In addition, the embodiments described in connection with FIGS. 3A-3E are shown with an entangled source that generates pairs of entangled photons, but could also be applied to larger numbers of entangled photons in space. For example, entanglement across three or more photons at different positions in space.

One feature of the present teaching is that the comb processing can be remotely located with little or no impact on system security e.g., the integrity of the shared secret. For example, one or all of the processor(s) in various embodiments of the systems 300, 321, 348, 362, 378 described in connection with FIGS. 3A-3E may be co-located with one or more detector, or they can be remote and connected via a classical connection. This allows the processing power to be concentrated and/or distributed in particular desirable locations. For example, processing can occur in a cloud processing system, and/or processing can occur within specialized hardware that can be shared hardware. As another example, nodes can be simple, low-power nodes with little to no processing, and measured combs are sent to a centralized processor to determine matches.

FIGS. 3A-3E provide examples of embodiments of physical systems that can be used in connection with numerous of the embodiments of the system and method of entanglement sharing provided throughout this specification, including the applications described that use entanglement sharing.

Figure 4:
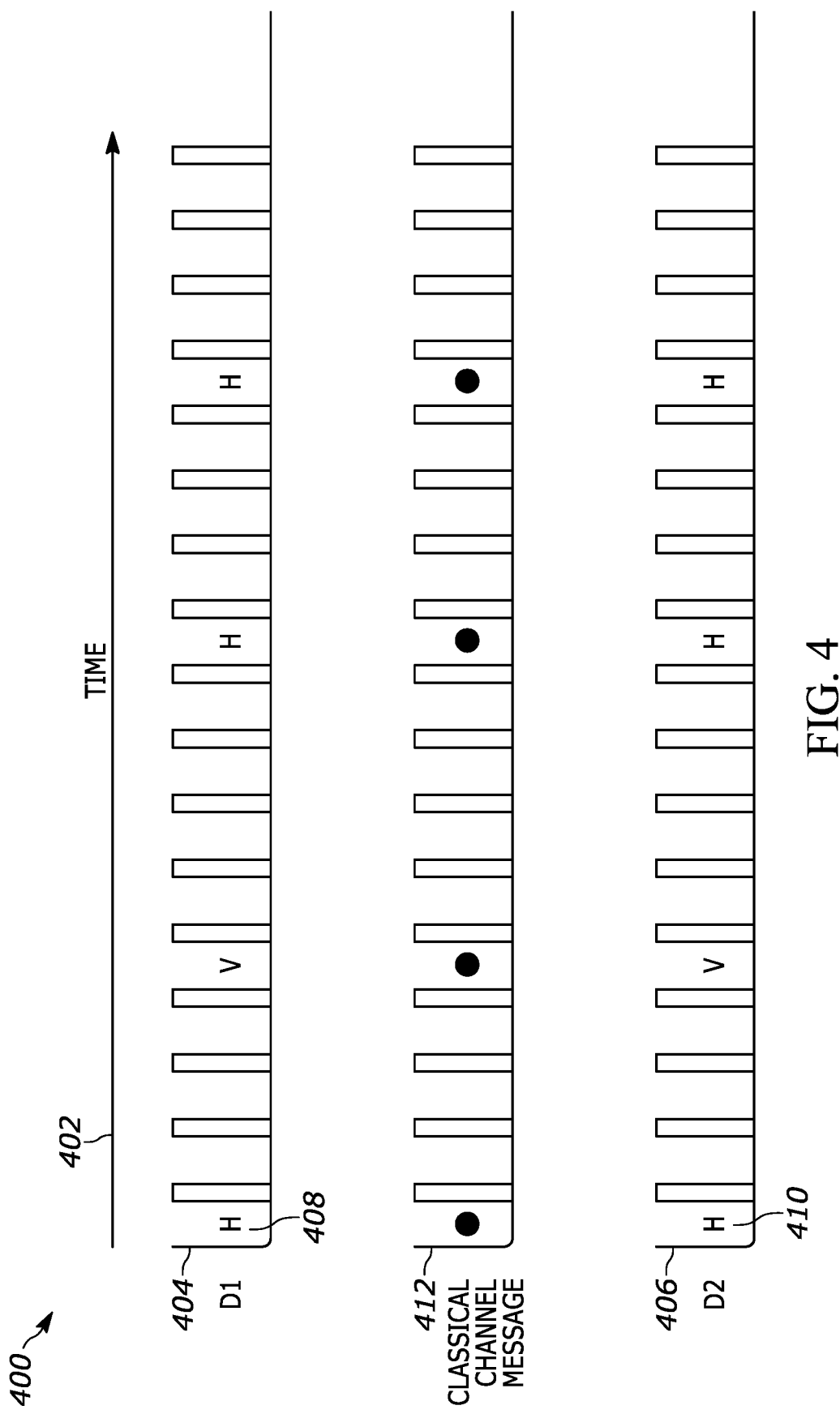
FIG. 4 illustrates generated combs for an embodiment of a shared secret application of the present teaching.

FIG. 4 illustrates generated combs 400 for an embodiment of a shared secret application of the present teaching. The combs 400 are generated with respect to a time axis 402, and the alignment shown of the different combs 404, 406, 412 in the figure is illustrates a relative position for each comb when the autocorrelation has been maximized. This alignment is more of a conceptual construct as it is determined after the data has been collected and does not reflect any sort of real-time operation. The time base 402 is illustrated to represent a common time base for receivers in two different locations to establish a common sequence of events with, for example, offset times that can be quantified relative this common time base 402. Alignment with respect to this time base 402 is performed after the fact of measurement and time base 402 can be arbitrary. In some embodiments, time-base is a local clock in one or the other nodes.

Referring to both FIGS. 3A and 4, the comb 404 generated by the first receiver 312 and the comb 406 generated by the second receiver 314 are illustrated with particular measured values of polarization 408, 410 (H or V) in each time bin. As can be seen, photons were measured in bins 1, 5, 10 and 14. Empty time bins have no measured photons. A comb 412 is generated to be sent by the classical channel by receiver D1 312. This comb only exposes the time bins (1, 5, 10 and 14) that measured photons, not the values of polarization. The sharing of this comb 412 with receiver 314 and correlation processing in D2 receiver 314 with comb 410 reveals the values of the polarization that represent the shared, secret, random number. This is just one example of how pattern matching can be used to determine the correlated quantum states, which can then be used to share a secret that comprises a set of random values.

When available, combs can also contain information from a local clock. In this example, a time comb includes a time stamp from a local clock at the detector. The indication of what time it is marking is arbitrarily chosen by the user, but in this case, let's say it's pointing at the first bin. The time stamp is the setting on the local clock at the detector when first bin detected that photon. The time stamp is appended to the comb 412. As described in more detail below, time stamps can be used as follows: 1) to measure the relative distance of two receivers from the source because the difference in time stamp values is the difference in flight time; 2) if the distance is known, a time stamp can be used to synchronize the clocks at two different receivers; 3) if the link is initially known to be clear of eavesdroppers, a change in the difference between time stamps between two receivers can be used to identify the eves dropper's presence, as the eves dropper adds latency.

Figure 5:
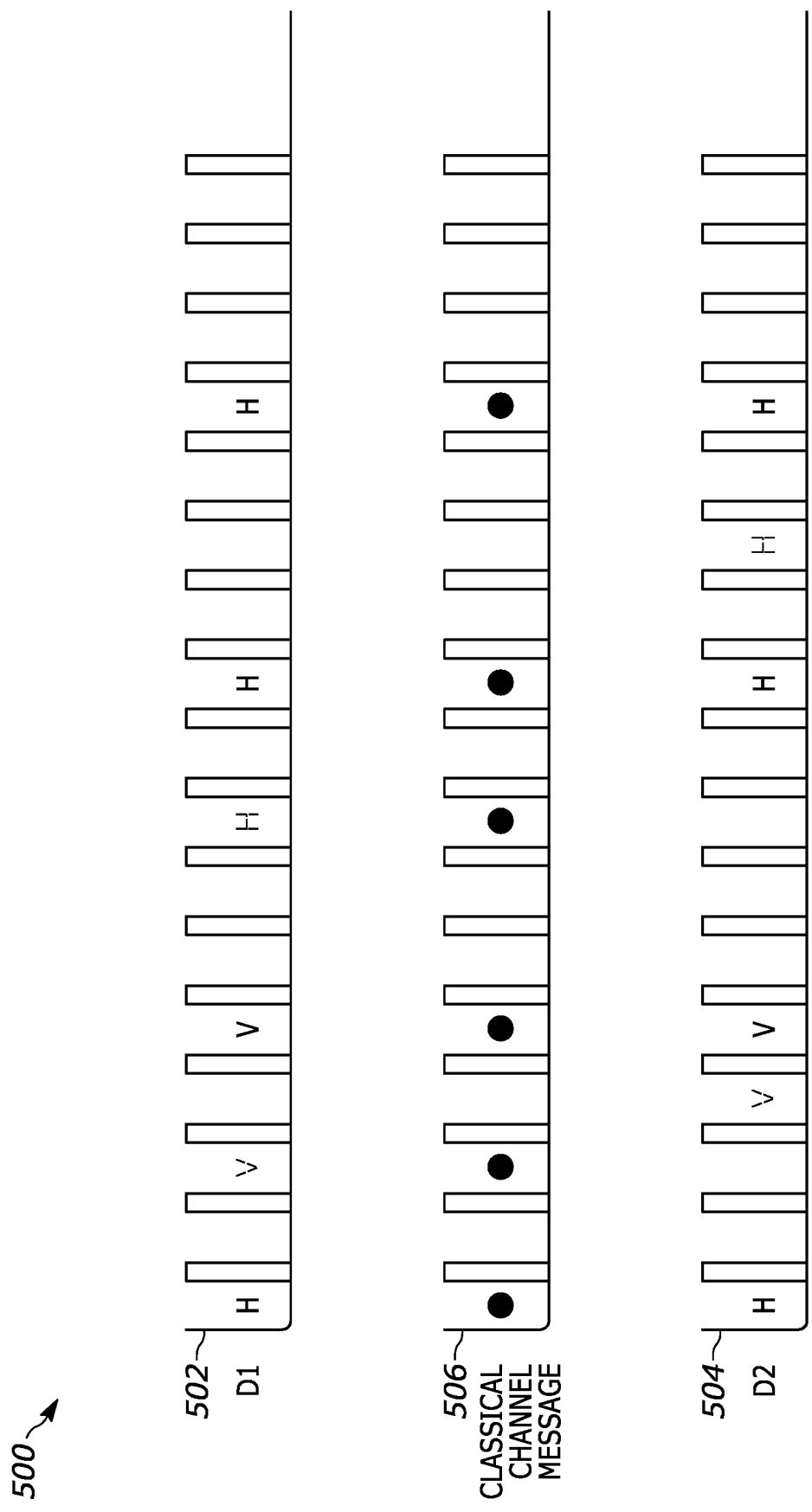
FIG. 5 illustrates embodiments of generated state combs with noise in an embodiment of a shared secret application of the present teaching.

Noise can cause detector counts in time bins that are from unwanted sources such as ambient photons and thermal detector noise. Measurement combs according to the present teaching can help to filter out these noise events. FIG. 5 illustrates embodiments of generated combs 500 with noise in an embodiment of a shared secret application of the present teaching. Referring to both FIGS. 3A and 5, a comb 502 generated by the first receiver 312 and a comb 504 generated by the second receiver 314 are illustrated with particular measured values of polarization (H or V) in each time bin. As can be seen, photons were measured in bins 1, 3, 5, 8, 10 and 14 in comb 502. Photon were measured in bins 1, 4, 5, 10, 12 and 14 in comb 504. Empty time bins have no measured photons. Noise photons are illustrated in grey and are in bins 3, and 8 in comb 502. Noise photons are in bins 4 and 12 in comb 504. A comb 506 is generated to be sent by the classical channel by receiver D1 312. This comb only exposes the time bins (1, 3, 5, 8, 10 and 14) that indicate measured photons, not the values of polarization. The sharing of this comb 506 with receiver 314 and correlation processing in D2 receiver 314 with comb 504 reveals the values of the polarization that represent the shared, secret, random number. The only noise events that will result in undetected errors, are noise events that occur in the same time bin for both D1 and D2. If the probability of a noise event in a given time bin is x, and noise events in the idler and signal paths are independent, then the probability of a simultaneous noise event is x**2. For example, if noise events occur in 1/1000 of time bins, then the undetected error probability is 1/1,000,000.

Figure 6:
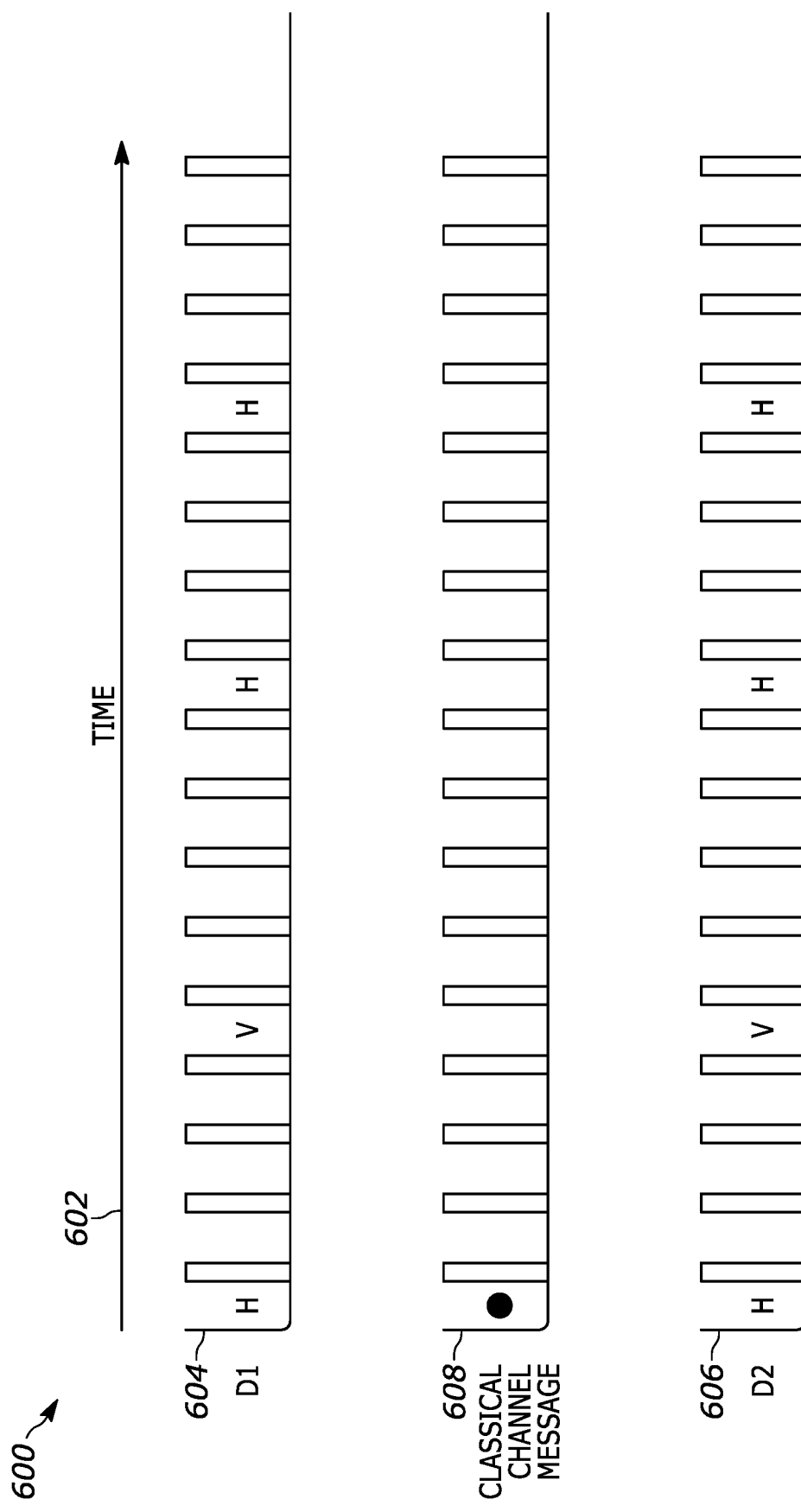
FIG. 6 illustrates generated state combs in an embodiment of a method and system for sharing measurement combs in a communication application of the present teaching.

One feature of the comb sharing system and method of present teaching is that it supports applications that communicate a deterministic bit stream. Using the same system as described in connection with FIG. 3A, it is possible to communicate a deterministic bit stream. FIG. 6 illustrates generated combs 600 in an embodiment of a method and system for sharing measurement combs in a communication application of the present teaching. The combs are referred to a time base 602. As is understood, the time base is not an absolute time base, but is rather a time base that can be derived and provide a common time base for the two receivers 312, 314 to establish a common sequence of events. A comb 604 generated by the first receiver 312 and a comb 606 generated by the second receiver 314 are illustrated with particular measured values of polarization (H or V) in each time bin. As can be seen, photons were measured in bins 1 (H), 5(V), 10 (H) and 14 (H) in measured state comb 604. Photons were measured in bins 1 (H), 5(V), 10 (H) and 14 (H) in measured state comb 606. Empty time bins have no measured photons. Noise photons are not shown in this example. A signaling state comb 608 is generated to be sent by the classical channel by receiver D1 312.

Referring to both FIGS. 3A and 6, to realize deterministic communication, the processor 330 in receiver D1 312 sends time markers over the classical channel only when the random polarization it receives matches the desired message. This is equivalent to placing a polarization filter for the desired polarization in the signal path. A significant advantage is that no synchronization problems are introduced. For example, if D1 wants to send an H (which of course could correspond to a 1 or zero) it marks only the H slot as shown in sent signaling state comb 608. The processor 332 in the receiver at D2 314 would match an H and call this the deterministic "bit" that was sent.

Figure 7:
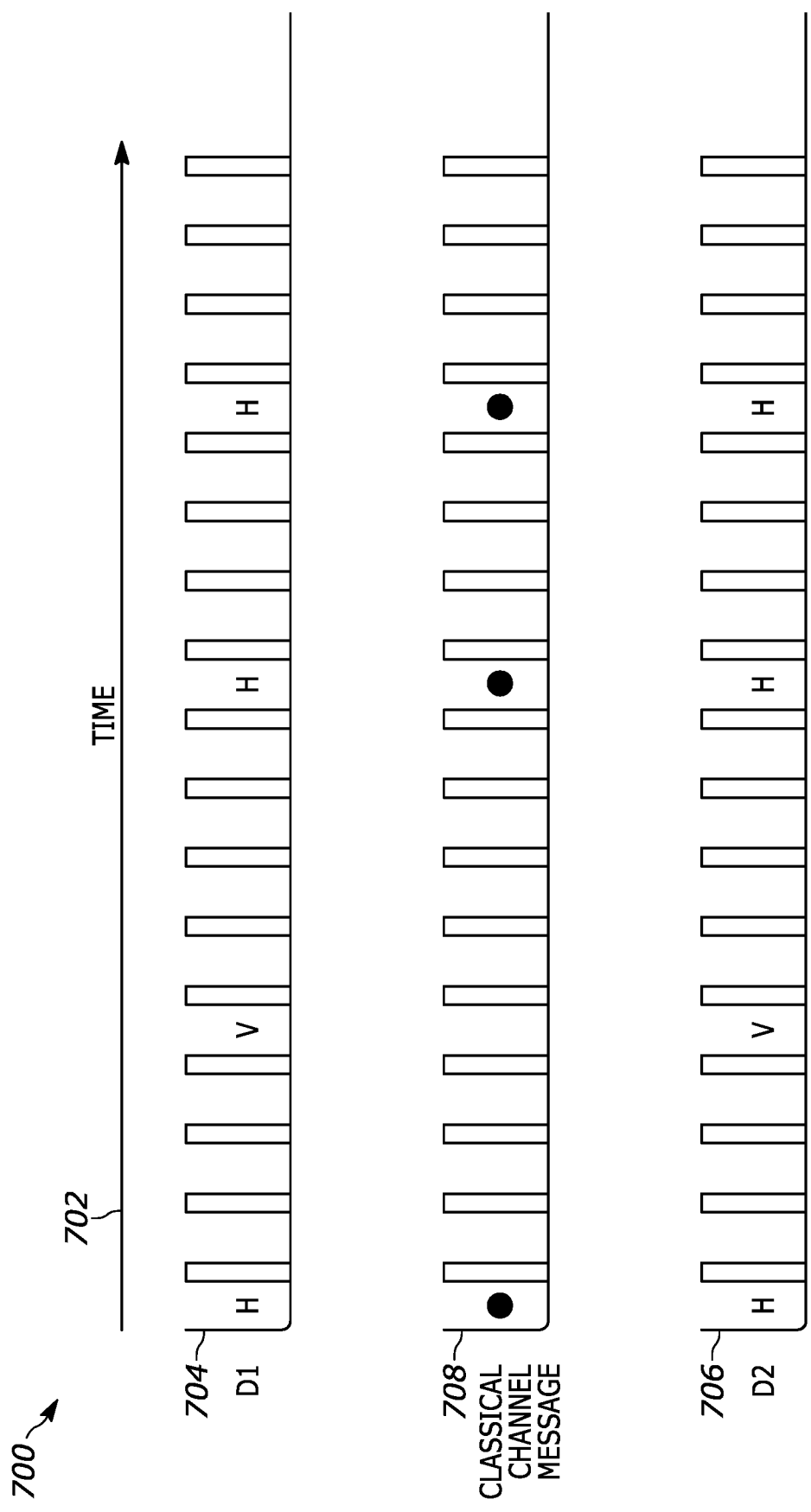
FIG. 7 illustrate embodiments of generated state combs for a method and system for sharing state combs in a communication application that includes error correction in a communication application.

Another aspect of the method and apparatus of the present teaching is that it can be used for error detection and correction. FIG. 7 illustrates an embodiment of generated combs 700 of a method and system for sharing measurement combs in a communication application that includes error correction. The error correction action is clear in comparing the system of FIG. 6 with the system of FIG. 7. Referring to both FIGS. 7 and 3A, the combs are referred to a time base 702. It is understood that the time base is not an absolute time base, but is rather a time base that can be derived and is a common time base for the two receivers 312, 314. A measured state comb 704 generated by the first receiver 312 and a measured state comb 706 generated by the second receiver 314 are illustrated with particular measured values of polarization (H or V) in each time bin. As can be seen, photons were measured in bins 1 (H), 5(V), 10 (H) and 14 (H) in measured state comb 704. Photons were measured in bins 1 (H), 5(V), 10 (H) and 14 (H) in measured state comb 706. Empty time bins have no measured photons. Noise photons are not shown in this example.

A signaling state comb 708 is generated to be sent by the classical channel by receiver D1 312. This comb marks multiple H's, for example those in bins 1, 10 and 14 to decode to a single H. This is in contrast to the embodiment of FIG. 6, where only one "H" bin is sent. In this embodiment, three symbols are sent for every deterministic bit. The 3 H's indicate a single H received. The translation to communications of ones and zeros is clear to those skilled in the art, as is the application of the communication of a single bit of FIGS. 6 and 7 to its application to a continuous bit stream.

The probability of error for a single time bin is the probability that either D1 or D2 receive a noise hit during the same time bin, as discussed above x2. The probability that two bins would be in error is (X2)2. The probability that three-time bins would be in error is ((X2)2)2=X**6.

One error correction and/or detection scheme according to the present teaching would function as follows: 1) if all three matched measured bits are H, then assume an H was sent; 2) if two of three matched measured bits are H, then assume an H was sent (this corrects one-bit error); 3) if two of three matched measured bits are V, then assume a V was sent (this corrects one-bit error); and 4) if all three matched measured bits are V, assume a V was sent. The error probability verses bit rate can be modulated by sending more symbols per bit.

One feature of the present teaching is that it supports sharing of a comb that represents entangled states in more than two dimensions. As an example, the system and method of the present teaching can share combs that represent entanglement in polarization, space, time, and frequency.

While the generated state combs shown in FIGS. 4-7 are described in connection with the system embodiment of FIG. 3A, they are not so limited, and can be used with numerous other system embodiments, including but not limited to those described in connection with FIGS. 3B-3E.

Figure 8:
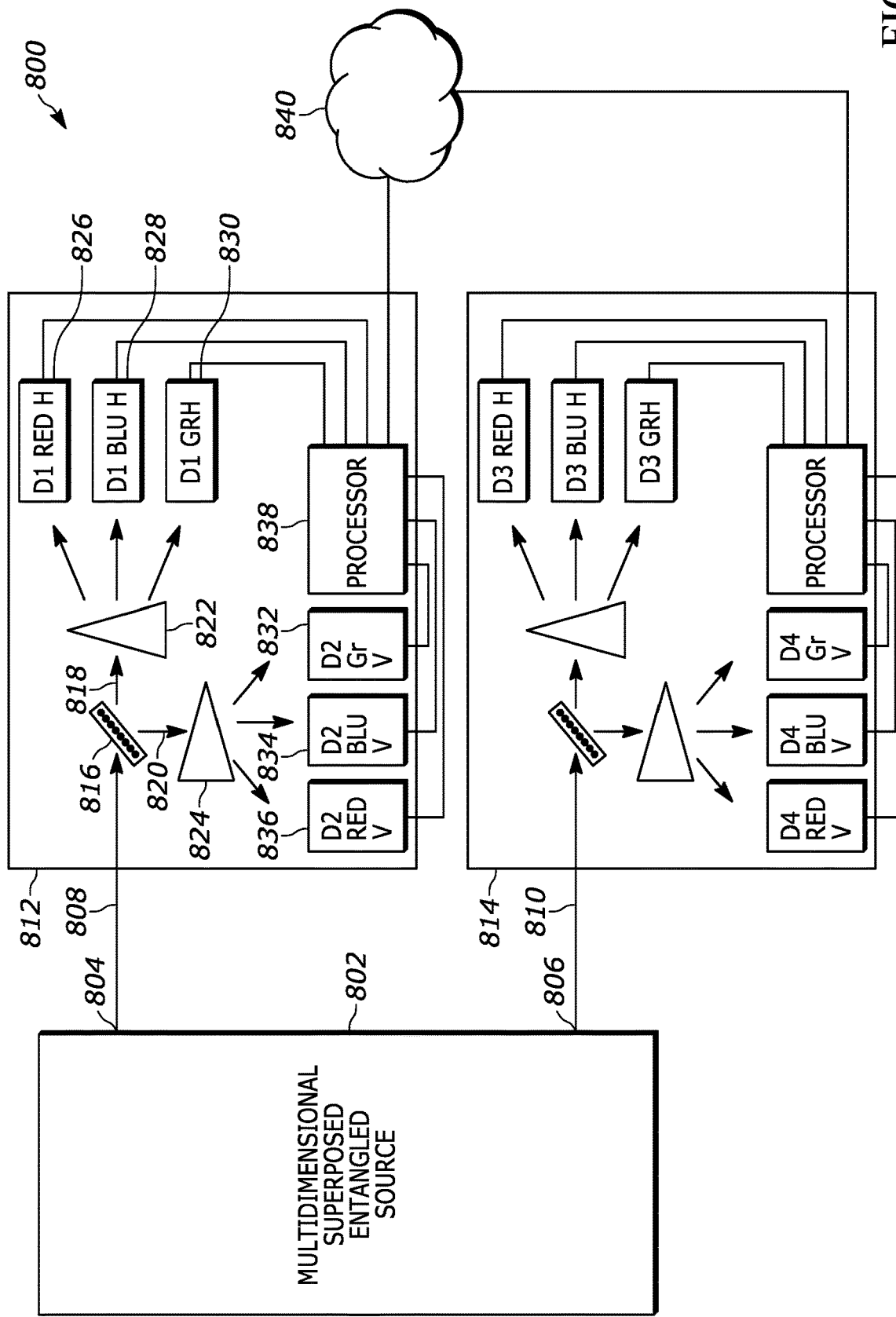
FIG. 8 illustrates an embodiment of a system for generating a shared state comb in time, polarization and frequency of the present teaching.

FIG. 8 illustrates an embodiment of a system 800 for generating a shared measurement comb in time, polarization and frequency of the present teaching. This system illustrates principles of how sharing a measurement comb extends the systems described in connection with FIGS. 3A-3E above to use multiple dimensions, or superposition bases.

We describe the frequency dimension in connection with a system that generates three values of entangled colors as an example. As is understood by those skilled in the art, entangled frequency dimensions are possible with a range of number of possible outcomes from two and up to and including a continuum of values. Reference to colors, e.g. red, green and blue, as used herein is for clarity of description and not intended to limit the present teaching to frequencies of a perceived color or any particular frequency in the visible spectrum. Rather, reference to one of multiple colors indicates a system that can distinguish a particular frequency of light (or more generally frequency along the electromagnetic spectrum) from other frequencies. In the embodiment of FIG. 8, a system 800 that uses time, three frequencies, and two polarizations is described, although the present teaching is not so limited in either number of dimensions or number of entangled states available in a dimension. In other systems space is also used as a dimension.

A multidimensional entangled source 802 provides one photon of a pair at a port 804 and the other photon of the pair at another port 806. Each photon follows a corresponding path 808, 810, that could be in fiber, free space or other medium to a respective receiver 812, 814. Receiver 812 has a polarization element that splits input photons into two outputs 818, 820. The first output 818 is for photons in an H-polarization state, and the second output 820 is for photons in a V-polarization state. Each output couples photons to a prism 822, 824 that each serve to send photons with "red", "blue" and "green" colors to separate outputs. The terms "red", "blue" and "green" are general and refer only to photons with distinct wavelengths. Outputs of the prisms 822, 824 are coupled to single photon detectors 826, 828, 830, 832, 834, 836 with electrical outputs that connect to a processor 838 that connects to a classical network 840.

Thus, photons are assigned to time bins for each combination of color and polarization available in the quantum state of a particular one of a pair of photons generate by the source 802 and received at receiver 812. Receiver 814 has the same configuration of receiver 812, and so also has data regarding time bins for each combination of color and polarization available in the quantum state generator of the source 802. Thus, photons are assigned to time bins for each combination of color and polarization available in the quantum state of a particular one of a pair of photons generate by the source 802 and received at receiver 814. The system 800 operates similarly to the system 300 described in connection with FIG. 3A, but it has more detectors 826, 828, 830, 832, 834, 836 that are configured to detect the more values available within the entangled states. It should be understood that FIG. 8 shows three different detectors to discriminate single photons having different colors to simply the description of the invention. There are many other ways of discriminating single photons having different colors that can be used with the methods and apparatus of the present teaching. As understood by those skilled in the art, the systems described in FIGS. 3A-3E, as well as other known systems for sharing entangled photons, can be extended to include the multi-dimensional aspects described in connection with FIG. 8.

Figure 9:
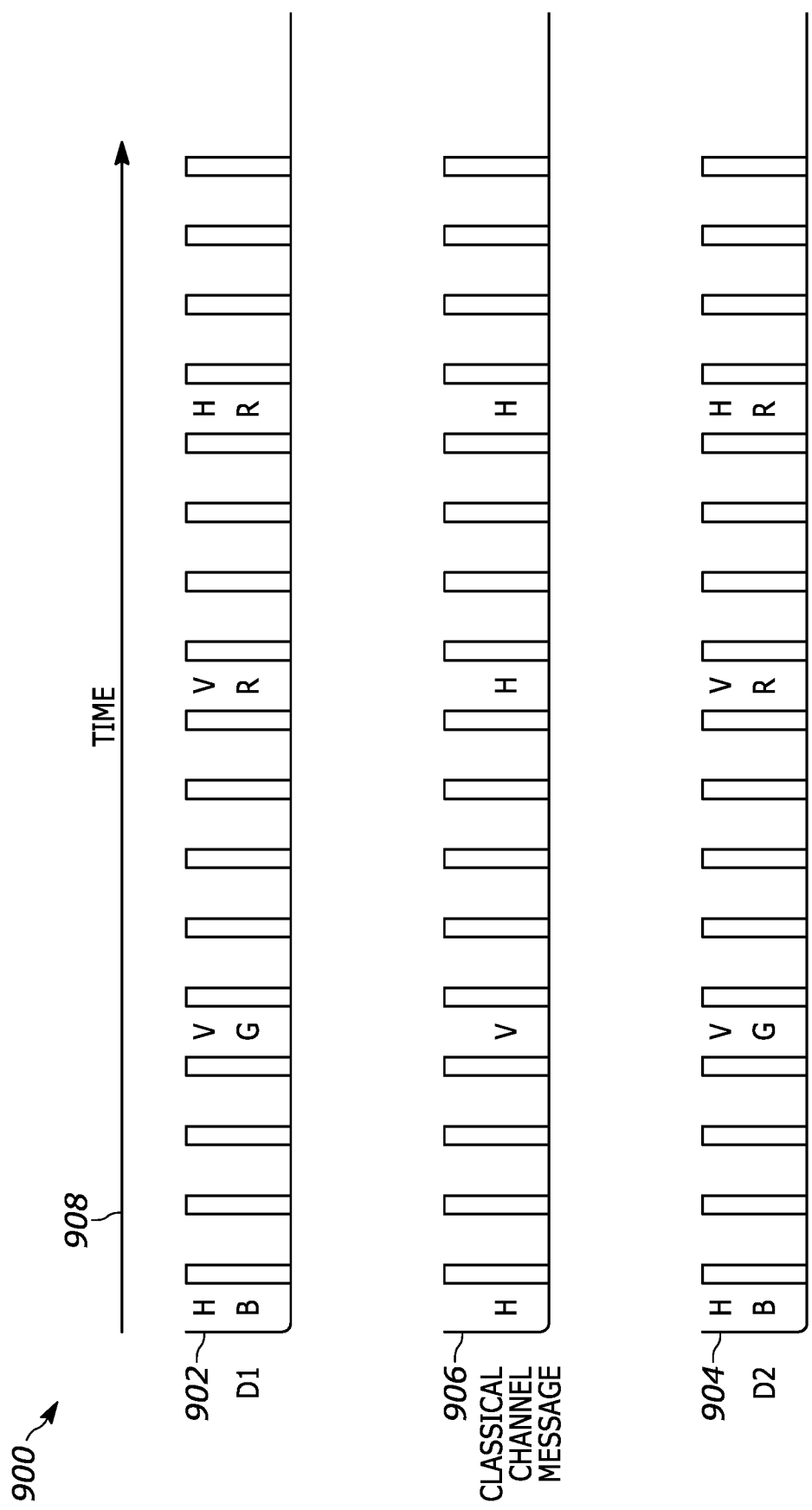
FIG. 9 illustrates an embodiment of the generated state combs for multidimensional state comb sharing of the present teaching.

FIG. 9 illustrates an embodiment of the generated state combs 900 for multidimensional comb sharing of the present teaching. Referring to both FIGS. 8 and 9, timing combs generated by processor 840 in the receivers 812, 814 can be configured to contain one of six different symbols per time bin: 1) Red Vertical; 2) Red Horizontal; 3) Blue Vertical; 4) Blue Horizontal; 5) Green Vertical; and 6) Green Horizontal. Generated combs 902, 904 and 906 are illustrated against a common time-base 908. Receiver D1 812 processor generates a measured state comb 902 with color and polarization measured in bins 1, 5, 10 and 14. Receiver D2 814 processor generates a measured state comb 904 with color and polarization measured in bins 1, 5, 10 and 14. Receiver D1 processor also generates a shared state comb 906 with only measured polarization values. This shared state comb 906 is sent to processor in receiver 814, and used to align the measured state comb 904. Processor in receiver D2 814 correlates these entries, which serves to "align" the combs 902, 904 in time against time base 908 as shown in the figure. The processor in receiver D2 814 can then derive color values in the bins to derive the correlated color stream it shares with receiver D1 812. Although the color information is never exchanged, D2 is able to decode the color information via correlation.

An important property of using entangled dimensions with more possible outcomes is a reduction in errors. The error probability of the system 800 is reduced by $(½)2$ over the single basis polarization system as discussed earlier. The probability of error is $(x2)/4$. As is clear to those skilled in the art, it is also possible to just send time markers and use the polarization and color information to up the bit rate. Based on the error rate of a given system, a designer may choose a particular bit rate vs error rate performance point that achieves a specific design goal. That is, a particular ratio of information rate-to-error rate can be achieved. For example, a larger ratio of information rate-to-error rate increases the accumulation of shared secret information as a function of time which can be desirable. However, the cost of providing the higher ratio can also be higher. Thus, particular ratios are chosen to achieve high accumulation of information but with an affordable cost. This is just one of many examples of how desired values of this performance metric is chosen according to the present teaching.

Thus, sharing different types of combs generated in processor 840 of D1 receiver 812 can result in different features and performance of the measurement comb sharing system of the present teaching. For example, as described herein, using more than one basis of a hyper entangled quantum state can reduce an error rate of finding entangled pairs and their associate entanglement information. For example, using more than one basis of a hyper entangled quantum state increases the size of a random number that is accumulated based on entanglement information as a function of the number of measured photons. That is, entanglement information can be determined at a greater rate as the number of bases is increased. There is an almost endless possible combination of different types of combs that can be used to achieve different measurements and performance metrics. In some embodiments, a plurality of basis states is available, and some are applied to reduce error rate and some are applied to increase the information accumulation rate.

The state dimension of a particular basis can also be used to achieve particular desired performance of an entanglement sharing system. As described herein, different basis types can be configured to have different size of the state dimension. For example, time and space, which can be generally thought of as continuous dimensions, can be measured with various resolutions that increase the specificity of the measurement, effectively providing a particular desired size of the state dimension. Time is a dimension that provides a relatively low-cost method of providing a high resolution. Nanosecond and even picosecond accuracies are available with relatively low-cost equipment that lead to high fidelity time measurement. Spatial dimensions can be of high state dimension, for example, by using large arrays of detectors. High-sensitivity, low background detector arrays are available with millions of pixels. As such time and/or space are attractive state dimensions to realize noise-immunity and/or high information rates. Higher resolution measurement, which have larger state dimensions, leads to lower error rates for identifying entanglement because these measurements discriminate out accidental coincidences. Higher resolution measurements with larger state dimensions, lead to higher rates of accumulation of entangled state information because there are many bits of information associated with each measurement.

Thus, one feature of the present teaching is that a size of a state dimension can be chosen to provide a desired error rate for a communication system or other type of entanglement information sharing system. Another feature of the present teaching is that a size of a state dimension can be chosen to provide a desired entangled information rate of a communication or other system.

In some embodiments, a plurality of bases, each basis having a plurality of state dimensions are used. In some embodiments one or more of the bases are applied to finding entangled pairs, and others of the bases are applied to collecting entangled state information. The bases having a particular state dimension that is used to achieve a particular error rate and/or information collection rate can be used. This selection can change over time, as it is related to how the combs, which can re-ordered lists of measurement events, are processed, such as by assembling and comparing. As one example of varying the bases applied over time, some embodiments of entanglement sharing of the present teaching use a time basis to synchronize clocks at two different receivers (e.g., receivers 812, 814 of FIG. 8), then share other basis information using the synchronized local clocks with somewhat less timing resolution than was used to synchronize, in order to determine coincidences and accumulate entangled state information based on those coincidences (e.g. generate a secret random number).

The steps of such an exemplary method are now described. First, a time comb with an additional header that includes timing information about the local clocks is shared. For example, the time comb can be any of a variety of time combs described herein, such as a time stamp comb. Second, the time combs are cross correlated or matched as described herein. Third, the two receivers adjust their local clocks so they read the same time value as derived from the header information about the local clock time and also the information from the matching process. Fourth, subsequent events are measured against the locally synced clocks and time stamped. The basis for those measured events could be one or more of wavelength, polarization, or spatial position. Finally, the time stamps for these measured events are shared. When time stamps are equal (+/−some small error value), the events are considered coincidences and then the values of the measurement are used as shared information.

Shared secret random numbers or entangled values can be used for other applications, such as sensing and measurement, communications and/or processing. In some embodiments, based on the accuracy of the clocks, the step of sharing the comb and adjusting the clocks is performed periodically to maintain a desired synchronization for time precision of the subsequent measurements. One benefit of this embodiment is that the simple comparison to determine coincidence is computationally simple, and a full comb correlation is only necessary when the two clocks have sufficiently "slipped" with respect to one another.

As another example of varying the bases applied over time, some embodiments of entanglement sharing of the present teaching use location information derived from ordered lists of measurements for authentication by position and then subsequent ordered lists of measurement events are used to share a secret. The steps of such an exemplary method are now described. First, a sender generates entangled pairs of photons. One of pair is kept and detected locally and the other is transmitted to a recipient at a different location. Second, the recipient replies via a classical channel with a time comb of event timestamps derived from measuring arrivals of the photons generated at the sender. Third, the sender compares time stamps of correlated photons to determine the flight time to the recipient. That flight time is compared to a stored value of a flight time to the recipient that is considered "correct". If there is a match, the recipient is authenticated by position. The recipient then sends to the sender a spatial measurement comb of subsequent photon arrival positions. The sender compares these positions to its locally measured positions. When the spatial positions align (correlate or match), the time of arrival of those correlated photons become a shared secret held by the recipient and sender.

Just as with the single basis system, the system 800 can be used for deterministic communication. To realize this application, D1 only marks the message it wants to send. This happens less often than with a binary polarization system; however, each symbol carries more information, and the bit rate is not changed.

For example, consider a system with four colors and two polarizations. Each symbol can communicate one of eight states, which is equivalent to three bits of information. The probability that each of these symbols will randomly occur is ⅛ of entangled pairs. On average, every eight symbols will produce a desired value. Similarly, consider a system with only two polarizations. Each symbol can communicate one of two states that corresponds to one bit of information. The probability that one of these symbols will randomly occur is ½. On average, for every two symbols received, one is the desired symbol. Although more bits are being sent, there is a proportionally longer time before they are sent and so the bit rates are the same.

One feature of the present teaching is that the generated combs do not have to include a time component, but can include a time component. While the above examples used time to determine entanglement, and then harvested some other basis to either share a random secret or communicate deterministic data, this is not the only basis for a comb. In noisy systems, where there are lots of non-coherent noise photons that must be filtered out, time is a useful way to determine entanglement. This is because the probability of a noise photon occurring in the same time bin for the idler and signal can be made arbitrary low by employing small time bins. In other words, systems with small time bins can be considered to have large state dimensions.

However, in other systems, such as systems where noise photons are rare, it is possible to use state combs and harvest the timing information. Examples of state combs are as follows: 1) polarization comb, HVVVHVHVHHHHVVVVHVHV . . . ; or 2) wavelength comb, GBRRRBBGRBG . . . ; where H/V represent measured polarizations of received single photons and G, B, and R represent measured colors of received single photons.

State combs are an ordered list of detector hits (that is, more generally, an ordered list of measurement events) that contain no timing information. But by using state combs, we preserve the quantum information in time. And the delta-t between arrivals of these states becomes either the shared secret, or the deterministic communication as described herein in connection with the timing comb examples.

Figure 10:
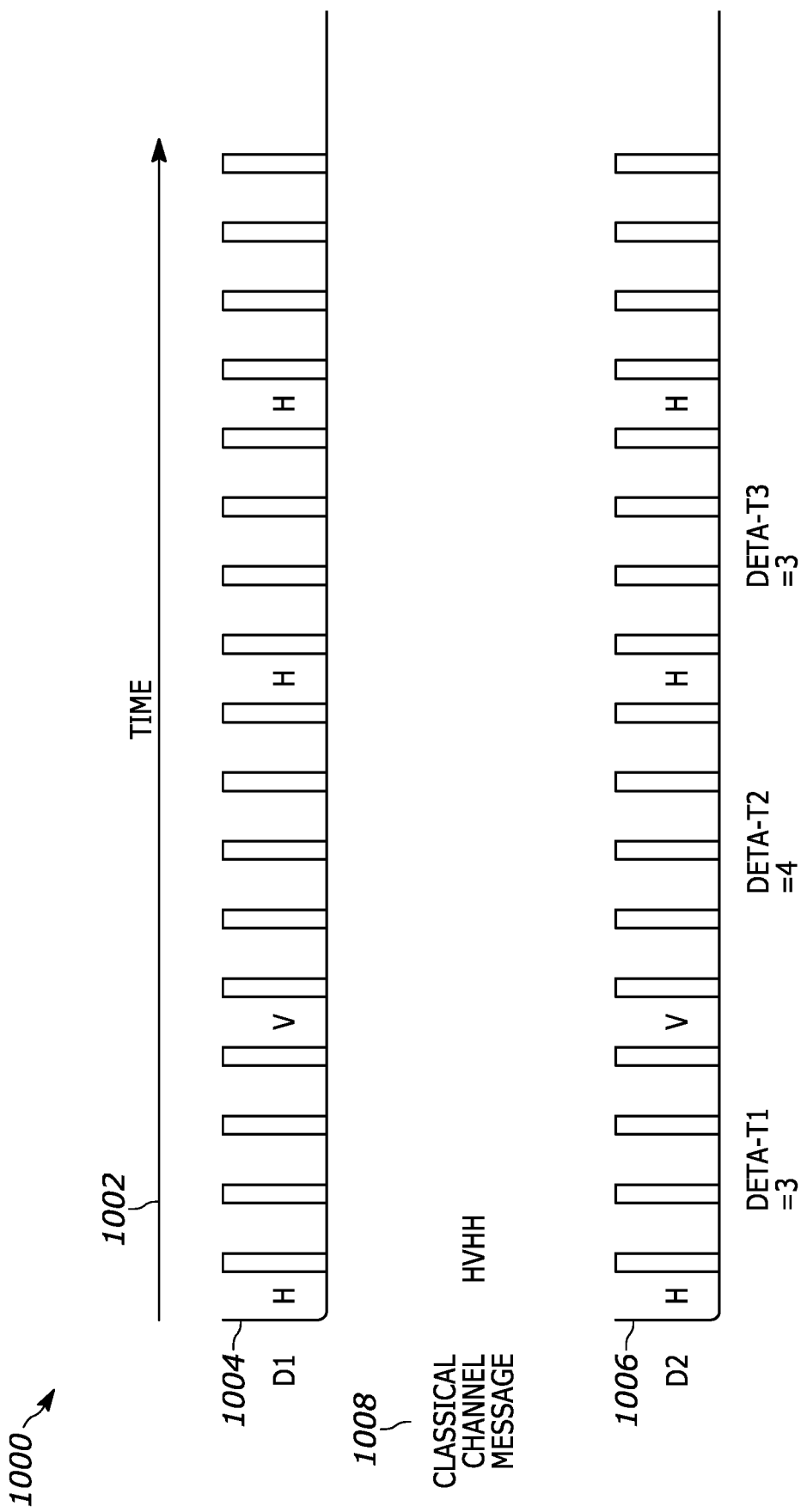
FIG. 10 illustrates an embodiment of the generated state combs for multidimensional state comb sharing that does not include time of the present teaching.

FIG. 10 illustrates an embodiment of the generated state combs 1000 for multidimensional comb sharing that does not include time of the present teaching. These combs 1000 utilize time and polarization entangled dimensions. Combs are shown against a time base 1002. Referring to both FIGS. 8 and 10, receiver 812 generates a timing comb 1004 with values of polarization, and receiver 814 generates a timing comb 1006 with values of polarization. The following description assumes no errors. Receiver D1 812 generates the timing comb 1004, but only shares an ordered list of the polarization values 1008, HVHH, over the classical channel. Receiver D2 814 is able to determine correlated Delta-T values 1010, 3, 4, 3, for polarization hit inter-arrival times. These values can be used in an application to become the shared secret, as described in connection with the description of FIG. 4, or for a deterministic communication application, as described in connection with the description of FIGS. 6 and 7.

Figure 11:
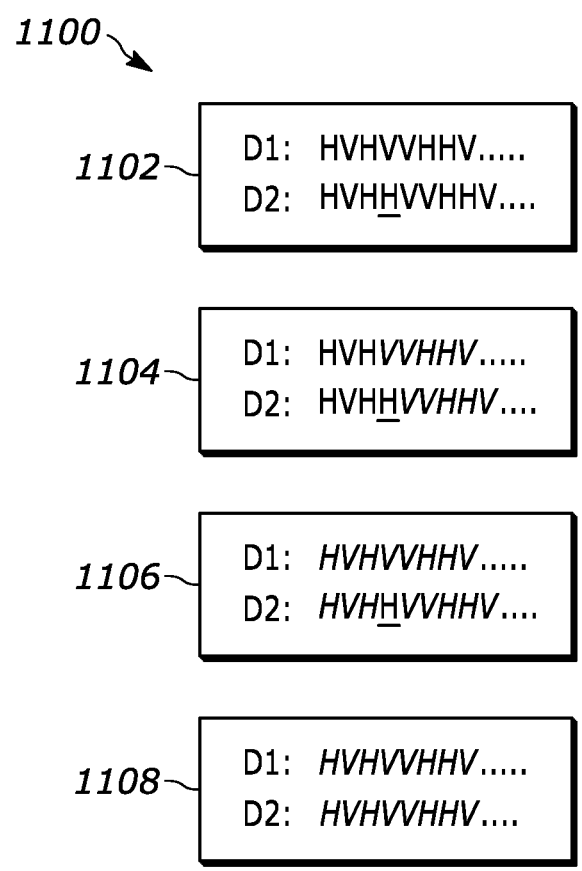
FIG. 11 illustrates alignment positions of state combs for an embodiment of a system and method of shared entanglement of the present teaching.

One feature of the present teaching is that the combs described above can be generated and shared to manage errors. FIG. 11 illustrates alignment positions of state combs 1100 for an embodiment a system and method of sharing entanglement of the present teaching. To generate and share the combs, a first receiver D1 measures a sequence of polarizations of single photon as HVHVVHHV . . . and a second receiver D2 measures a sequence of polarizations of single photons as HVHHVVHHV . . . . The majority of photons being measured by D1 and D2 are from an entangled source, but the detectors are prone to error and/or receipt of an errant photon that is not entangled. In this instance, D2 has received a noise photon in the 4th position.

D1 sends a generated state comb to D2. The sequences are shown compared in a particular alignment in the first box 1102. D2 slides the state comb generated by D1 through the state comb generated by D2 and finds the maximum number of matched detected states in sequence. In a first position 1104 the grey font states in D1 and D2 are determined to be matched. Then the processor slides to a second position 1106 and it looks for the second maximum, in this case three matches states shown in grey font. This position 1106 makes it clear to remove the H as an error, to result in a matched sequence as shown in box 1106 after the error sample is removed.

This scheme requires that the error rates are low enough that reasonably long series of matches (referred to herein as "straight flushes") of entangled photons appear on both the idler and signal paths. By way of example, certainly a 10% error rate is reasonable, as there will likely be straight flushes of 10. And certainly 50% error rates are not, as there will be no straight flushes.

Thus, event state combs consist of an ordered list of states, without time markers. For example, an ordered list of states can be a polarization comb, VHHVHVHVVVHHVHV. Two event state combs can be correlated as follows. Slide the two combs by each other until the longest sequence of matching measurements is found. Mark those measurements as matched. Then slide the two combs by each other until the second longest sequence of matching measurements is found. Similarly mark those measurements as matched. Then repeat the exercise, each time reducing the length of the matching sequence, until no other matching sequences can be found. The unmarked measurements can then be considered as noise photons.

One feature of the present teaching is that the combs can be combined with numerous types of additional information to form a message, possibly sent in the form of a packet of information, between receivers. The additional information can be useful for using the comb and entanglement sharing in various applications.

Another feature of the present teaching is that combs can present the time information in different ways. For example, time information can be presented so that it can be used for applications such as time synchronization across nodes.

Figure 12A:
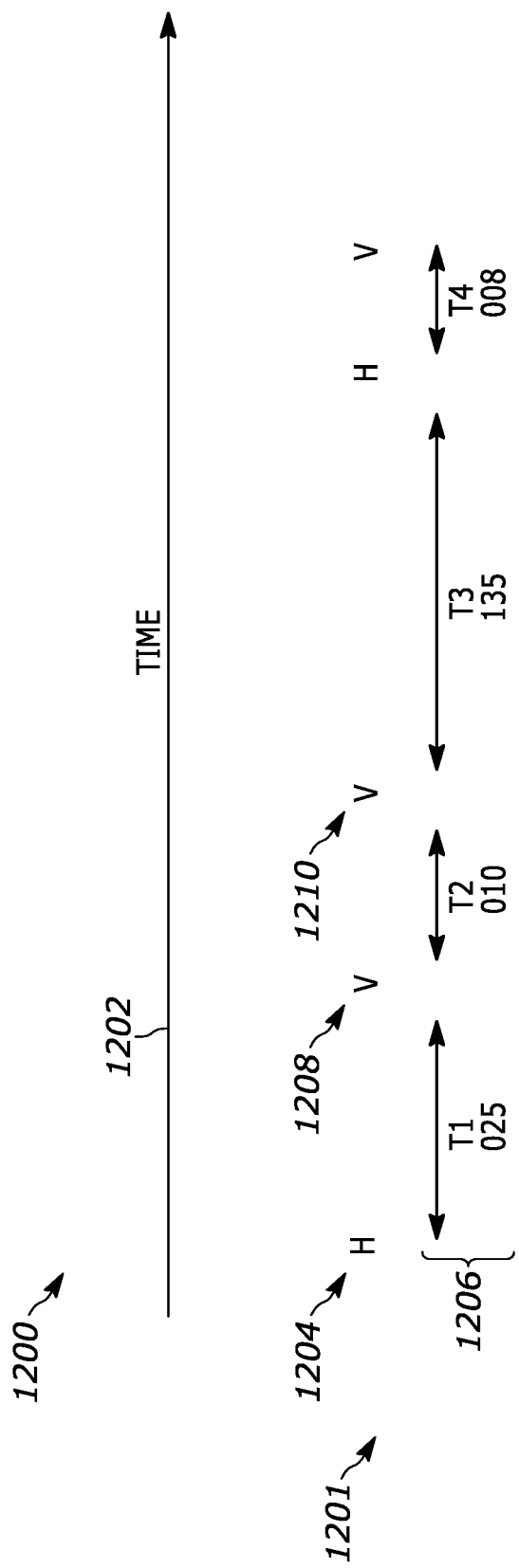
FIG. 12A illustrates a state comb for a system and method of shared entanglement using the difference between arrival times of the present teaching.

FIG. 12A illustrates state combs 1200 for an embodiment of a system and method of shared entanglement for a synchronization application of the present teaching. This application relies on event combs that comprises events and a measured time between each event. For example, an event could be a single photon arrival and the time between arrivals can be provided in the comb. As another example, an event can include determination of a polarization state of an arrived photon and the comb presents both a polarization state and a measured time between arrivals.

Referring back also to FIG. 3A, receiver 312 detects the single photons from a port 304 of the source 302 and generates electrical signals representing the time of arrival and polarization of detected photons. The processor 330 converts these electrical signals into a comb 1201 that is illustrated with respect to local measurement time base 1202. This comb presents measured polarization states, H or V, 1204, 1208, and time between arrivals 1206. In this example, the first polarization state is H 1204, a time elapses of 0.025 seconds 1206, and then a second polarization state of V 1208 is measured, followed by a time duration of 0.01 seconds to a third detection, in this case a V, and so on. The processor determines state and the time between detector hits that is recorded a number. This is in contrast, for example, to the combs 400 described in connection with FIG. 4, where detections are connected to a bin number. Comb 1201 can be thought of as a continuous-time comb, as compared, for example to combs 400. The comb 1201 can be simply represented as a message, for example, H025V010V135H008 that is sent over the classical network 328 to the second receiver 314.

One feature of comb 1201 is that potentially more precise timing information is available by sharing of the comb 1201. Assume the first receiver 312 and the second receiver 314 have or are connected to clocks that need to be synchronized. Both receivers 312, 314 are detecting and processing single photons from the source 302, the first receiver 312 as described above resulting in comb 1201. Also, the second receiver 314 detects the single photons from port 306 of the source 302 and generates electrical signals representing the time of arrival and polarization of detected photons. The processor 332 converts these electrical signals into a comb for the second receiver 314, second receiver comb (not shown) that contains at least the same string of comb 1201. The first receiver 312 sends that packet with a header that includes the local current (absolute) time in the receiver 312 when the first H 1204 was detected. The starting point in the sequence is arbitrary. The classical packet looks like "(CURRENT TIME) H25V010V135H008", or as a specific example, "9:58:191514 H25V010V135H008," and is sent from the first receiver 312 to the second receiver 314. The second receiver 314 is maintaining a local current (absolute) clock stamp per detector click. The second receiver 314 correlates second receiver comb with comb 1201 and finds the match of the sequence beginning with H 1204 in comb 1201. The second receiver retrieves the clock stamp for that first H in its second receiver comb.

A feature of the present teaching is that by comparing local current time stamp with the header, it has been determined that offsets in timing between the two receivers 312, 314 can be precisely tracked. Such information could be used for numerous applications and systems can be configured to achieve difficult or even otherwise impossible tasks. For example, if differences in optical path delays between receivers 312, 214 and source 302 are known or separately tracked, sharing the comb 1201 with timestamps can maintain extremely precise or even near or essentially perfect synchronization of the local clocks in the receivers 312, 314. Since for example, SPDC systems generate entangled photons at exactly the same instance in time, wherein the synchronization accuracy of such a system is only limited by the precision of the detectors. In some systems, the precision will essentially depend only the accurate of the relative positions, which can be determined with a high level of precision with interferometric techniques. In some particular methods according to the present teaching, regardless of the known offset in transit time, the second receiver 314 adjusts the local clock by finding the difference between the timestamps, taking account of time-of-flight offset, and adjusting the local clock based on the remaining difference that represents a synchronization error.

As another example, if precise free running clocks are available in the receivers 312, 314, sharing the comb 1201 with timestamps can be used to determine optical path differences between the nodes 312, 314 and/or source 302. The differences can be intentional differences that might be part of a signaling scheme. The difference can be unintentional differences, that might be used to correct or control other timing-based processing that is ongoing within and amongst the receivers 312, 314.

In the example embodiment of FIG. 12A, the events are V for Vertical and H for Horizontal polarization. T1, T2, T3 and T4 are the measured time between events where T1=25 time units, T2=10 time units, T3=135 time units, and T4=8 time units, which can be encoded as H025V010V135H008V. When correlating this style of comb, there may be noise events.

FIG. 12B illustrates the embodiment of state combs 1230 for the system and method of shared entanglement of FIG. 12A with noise of the present teaching. The event measurements along time axis 1232 include a pair photon H 1236, then a noise, or errant, measurement V 1234 0.025 seconds later, then a pair photon V 1240 0.10 seconds later, and so on. The other pair measurement system receives in comb 1242 a pair H 1244, then a pair photon V 1246 0.035 seconds later, and so on. The first pair comb may be represented H025V010V135H008V. The second pair comb may be represented H035V135H008V.

Figure 12C:
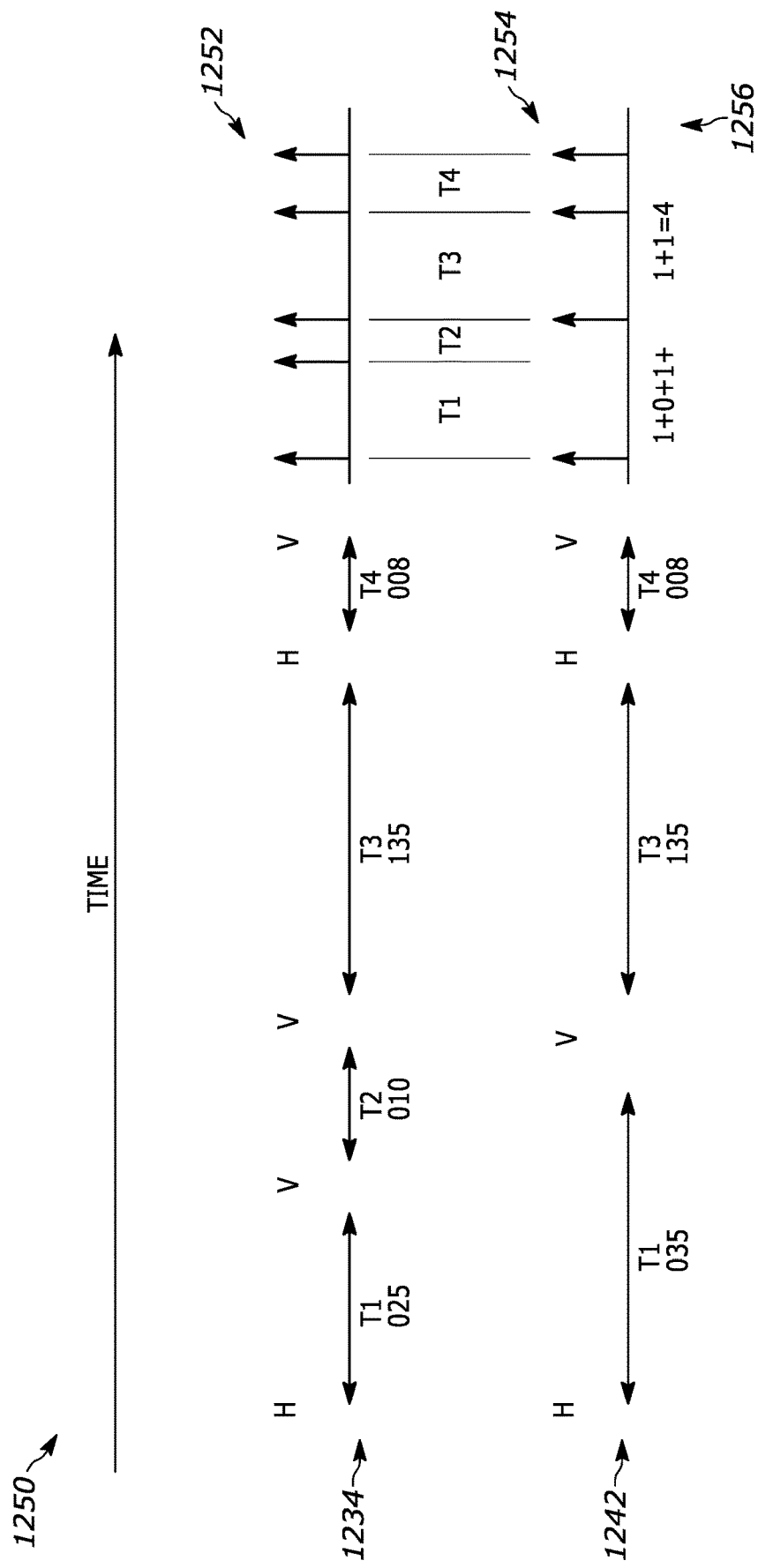
FIG. 12C illustrates an embodiment of correlating state combs for the system and method of shared entanglement of FIG. 12B of the present teaching.

It is possible to correlate these combs in various ways. For example, FIG. 12C illustrates an embodiment of correlating state combs for the system and method of shared entanglement of FIG. 12B of the present teaching. The combs 1234, 1242 may be converted into tiny time bins where the size of the bin is related to the accuracy of the clock measuring inter-tick arrivals. Thus comb 1234 is represented as time diagram 1252. Comb 1242 is represented as time diagram 1254. Then, the correlation is equivalent to the time bin method, with likely small (narrower window) time bins. The matched position in the example time diagrams 1252, 1254 yields a correlated value of four. In this case, only a few alignments with the single noise photon have a summed value of one.

Other matching methods can also be applied. The birth times of entangled photons are absolutely simultaneous, thus T1, T2, . . . Ti are very precisely defined. If an exact time interval match is found when comparing combs, and the local clock is very precise (ticks are short in duration), then it is likely that a single match of inter-photon arrival times defines the entire ensemble. If the first position doesn't work, a second random position or a third will likely yield a match. As the accuracy of your clock improves, the probability of a match of the ensemble, given a match of a single interval, improves as well.

Numerous data processing algorithms can be used to process measured data to compensate for noise. Noise can be defined for some applications as the probability of an erroneous non-entangled photon detection. When determining a match based on a single interval, it is important to define the measurement interval for the appropriate level of noise. For example, if a noise photon (such as the errant V measurement described in connection with FIG. 12B) is measured between the reception of two entangled photons, it should be ignored when processing the data. When time matching, the algorithm employed can, for example, add together adjacent intervals when single interval matches are not seen (for example, the T1+T2 described in connection with FIG. 12C).

Thus, numerous (an almost unlimited number of) comb versions are possible. Some examples have been described herein, including: 1) time bins, e.g. as described in connection with FIG. 4; 2) event sequences with no arrival time information, e.g. HVVHVHVH and as described in connection with FIG. 10; and 3) event sequences with arrival time information, for example, as described in connection with FIG. 12. Multiple additional combinations of comb information can be provided. A particularly important aspect of the present teaching is that the combs are presented in a sequence that is related in a known way to measurement events in the local node and in the non-local node such that the associated local and non-local receivers are able to determine entangled-pair measurement events by processing local combs together with non-local combs.

One feature of the present teaching is that by comparing combs in two receivers one can easily identify visually and/or by machine processing if one of the entangle pairs has been captured and/or faked by an eavesdropper. Referring, for example, to FIG. 3A, it is conceivable that an eavesdropper could insert themselves into the path from the source 302 to receiver 312. The eavesdropper could intercept a single photon, measure the state, and then insert a single photon with the same state back onto the path toward receiver 312. To ensure that there are no detectable interruptions, this action might be taken on every photon. The receivers 312, 314, could then believe they are the only nodes that know a comb, while a comb is being surreptitiously accumulated by the eavesdropper to the detriment of the sender.

Mitigation for this eavesdropping is possible using the shared entanglement method and system of the present teaching. The process of cross correlation will determine an "offset." The term "offset" as used herein is defined as the time one comb needs to be offset to achieve maximum correlation with the other comb. That is, the "offset" is a measurement of time. If the distance between the source and the detectors is known, this "offset" should be a fixed value related to the speed of light (or fraction thereof based on the index of refraction of the medium). We will define this part of the "offset" as "flight time." The "offset" will reflect the difference in path length between the idler and signal paths. Since the eavesdropper must detect the photon and generate a new photon with the same value it detected, the eavesdropper must get in the path between the source and the legitimate detector. In entering the path, and executing the process of detection and photon generation, the eavesdropper adds some delay. For simplicity we are calling this delay "eve-time." The new delay with an eavesdropper present is "flight time"+"eve time." If the offset exceeds "flight time", the detector can assume an eavesdropper is present. It is also possible to integrate a variant of the BB84 protocol into the comb exchange. See, for example, Bennett, Charles H., Brassard, Gilles, "Quantum cryptography: public key distribution and coin tossing," Theoretical Computer Science. Theoretical Aspects of Quantum Cryptography. 560, Part 1: 7-11, 2014. The BB84 protocol can be implements in the receivers 312, 314 by randomly changing the basis of measurement by, for example, choosing a horizontal/vertical polarization scheme or a +45 degree/−45-degree polarization scheme at the beam splitter.

Figure 13:
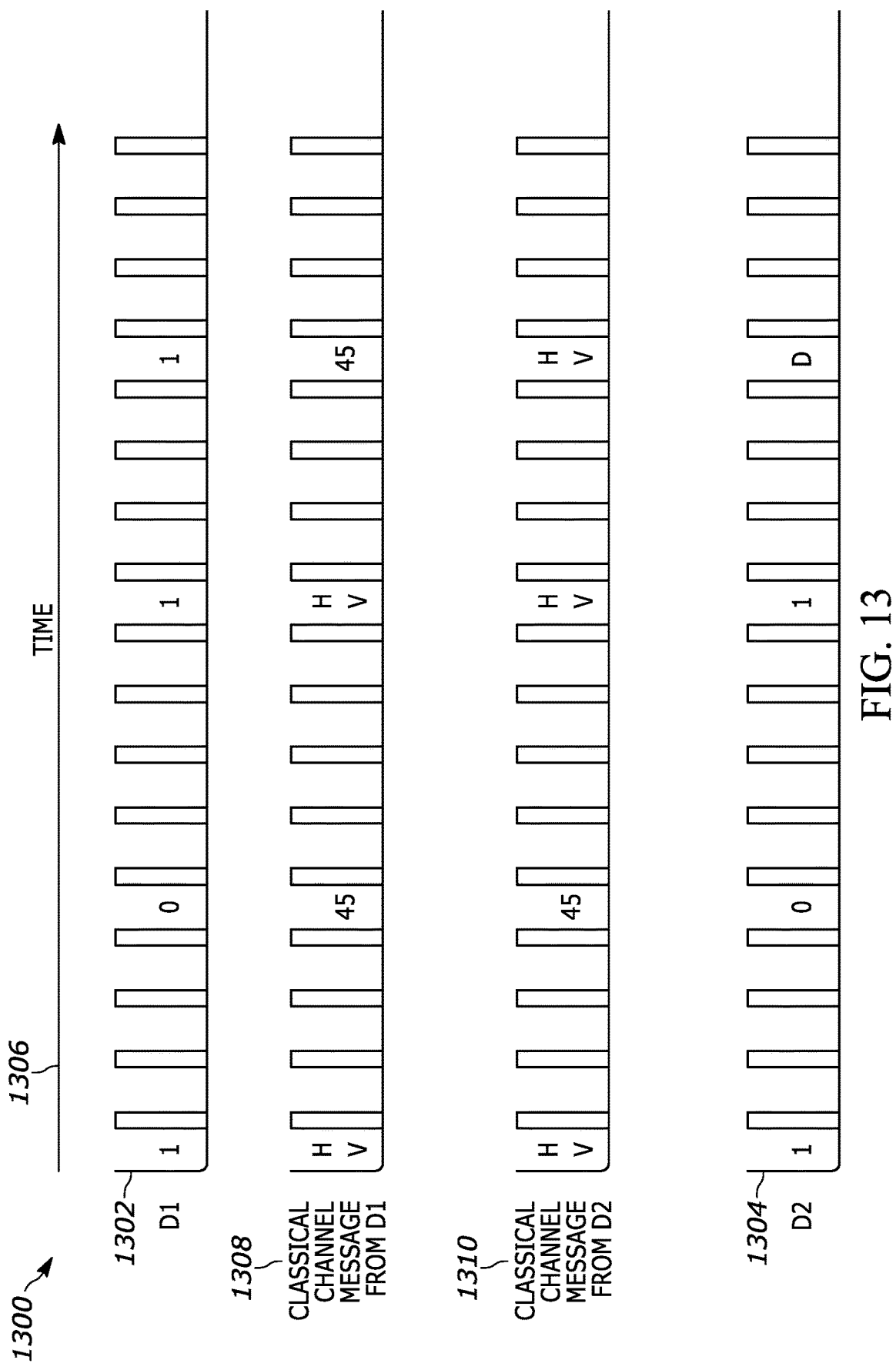
FIG. 13 illustrates an embodiment of a state combs for a system and method of shared entanglement for mitigating eavesdropping of the present teaching.

FIG. 13 illustrates state combs for a system and method of shared entanglement for mitigating eavesdropping of the present teaching. Referring back also to FIG. 3A, receiver 312 detects the single photons from a port 304 of the source 302. The receiver includes a basis adjusting element to randomly adjust the basis of the incoming photons in front of the polarizer 320 (not shown in FIG. 3). By adjusting the basis adjusting element either a horizontal/vertical polarization scheme or a +45-degree/−45-degree polarization scheme is created. The detectors 316, 318 produce an electrical signal that represents the arrival time of a photon. The processor 330 converts the electrical signal into comb 1302. The same process is implemented in receiver 314 and the processor 332 generates comb 1304. The combs 1302, 1304 are illustrated as aligned and, with respect to time base 1306, the alignment is determined by a correlation between the combs 1302, 1304 as described herein.

When measurement combs are exchanged, they not only include markers for which time bins contain detection events, but also include the random orientation of the polarization beam splitter which was used to do the measurement of that particular photon. This is illustrated in message 1308 from the first receiver 312 and message 1310 from the second receiver 314. Only those measured events in the combs that share a common basis are used as legitimate pairs. In some methods according to the present teaching, a subset of the known BB84 protocol is executed. The presence of an eavesdropper can be detected when the two receivers 312, 314 share a subset of their shared secret and check error rates. Since polarization basis is randomly chosen by the two receivers 312, 314, the expected error rate is 50%; however, if the eavesdropper intervenes the error rate increases on average to 75%.

Although we have described only two methods to determine the presences of an eavesdropper, it is will be readily apparent to one skilled in the art that numerous other methods can be used. Before the first detection event, both the idler and signal photons are entangled and in a superposition of states. Once a measurement is made, either by a legitimate receiver, or and eavesdropper, the system collapses into classical states that are correlated for both the signal and idler. Although collapse events cannot be detected directly, indirect impacts on measurements are possible and could also be used to enhance the determined eavesdropping activity. As described above combs according to the present teaching can be useful not only to reduce the impact of noise, they can also reduce the ability of an eavesdropper to obtain the shared information carried by the exchange of entangled pairs.

Figure 14:
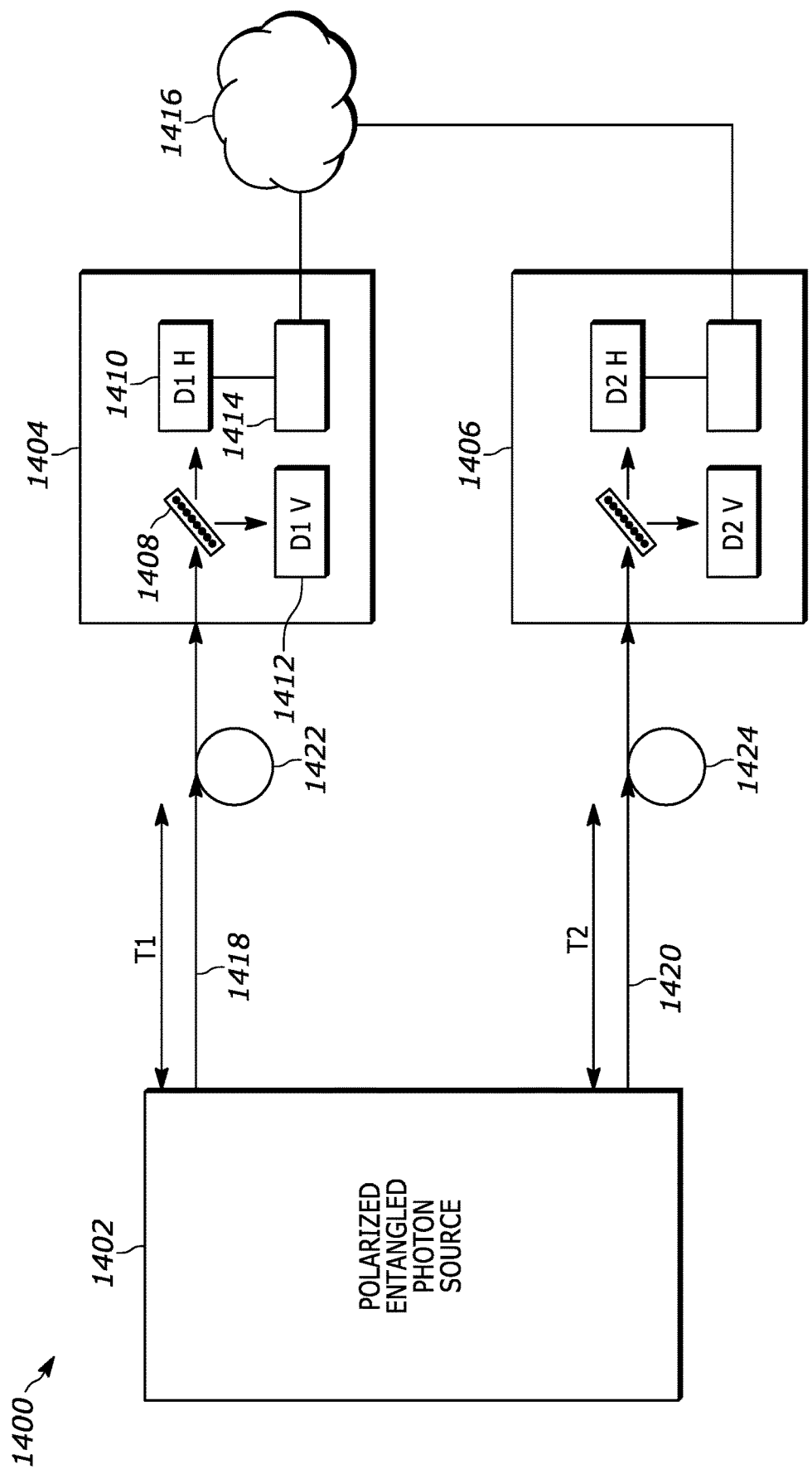
FIG. 14 illustrates an embodiment of a system for sharing state combs with storage of the present teaching.

One feature of the present teaching is that it can work with or without storage or relative delay between the receiver nodes. FIG. 14 illustrates an embodiment of a system 1400 for sharing measurement combs with storage of the present teaching. Similar to the other embodiments described herein, the system 1400 includes an entangled source 1402 that provides entangled pairs to receivers 1404, 1406. The receivers include detectors 1410, 1412, configured to detect polarization by being placed behind a polarization element 1408. A processor 1414 generates measurement combs based on the sampled photons in the detectors 1410, 1412. The processors 1414 share combs using a classical network 1416.

The system operates as described, for example, in connection with FIG. 3A. The system 1400 is similar to the system 300 described in connection with FIG. 3A. One difference, however, is that the receiver 1404 and receiver 1406 are connected to the source 1402 by paths 1418, 1420 that include storage 1422, 1424. For example, the storage 1422, 1424 can be a delay-line. Thus, arrivals at the receivers 1404, 1406 arrive at different times that are at least defined by the difference between t1 and t2. In this system, the quantum events which will eventually be sampled by the receivers are stored coherently. Also, system noise is stored. When the storage loops 1422, 1424 are eventually sampled, the combs still work as described herein.

Figure 15A:
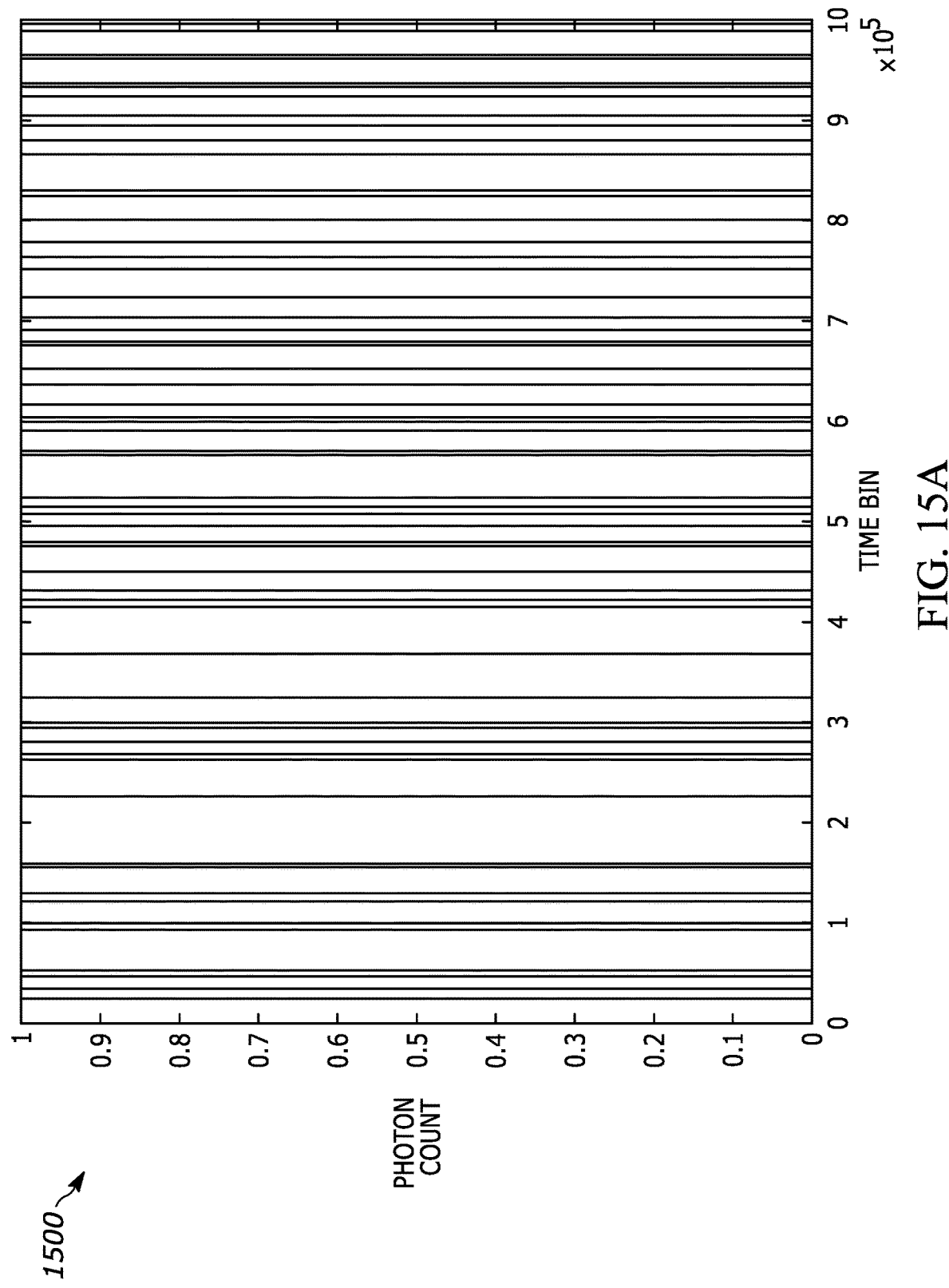
FIG. 15A illustrates a plot of experimental data of photon counts in bins of a partial comb of the present teaching.
Figure 15B:
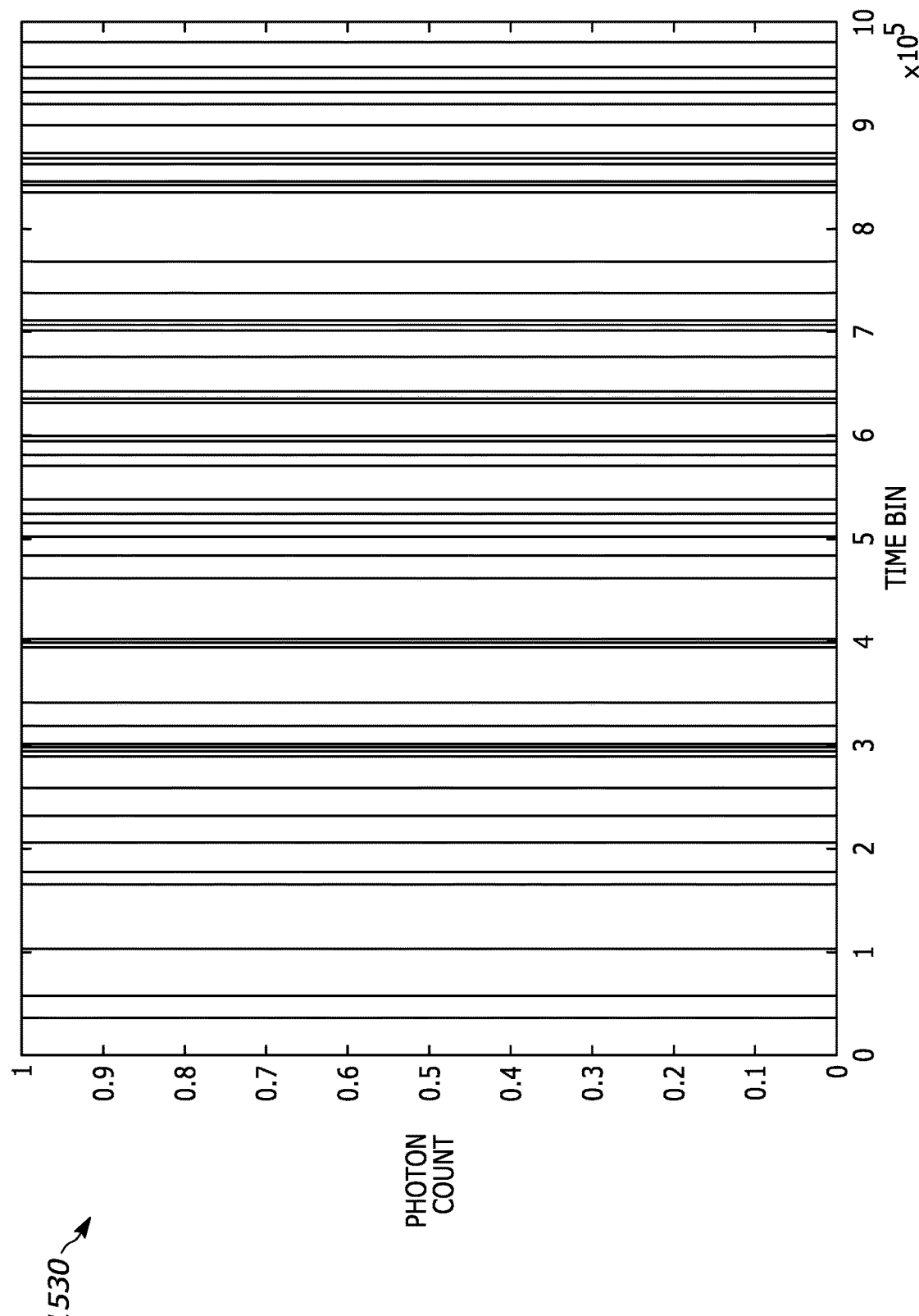
FIG. 15B illustrates a plot of experimental data of photon counts in bins of a second partial comb generated by the same system that generated the data of FIG. 15A.

One feature of the present teaching is that a cross-correlation of time bin data can be used to identify the entangled pair matches in two different combs. FIG. 15A illustrates a plot 1500 of experimental data of photon counts in bins of a partial comb of the present teaching. Referring back to FIG. 3A, for example, the data of FIG. 15A is representative of data generated by processor 330 in receiver 312 based on electrical signals generated in response to photon arrivals in single photon detector 318. FIG. 15B illustrates a plot 1530 of experimental data of photon counts in bins of a second partial comb generated by the same system that generated the data of FIG. 15A. Referring back to FIG. 3A, for example, the data of FIG. 15B is representative of data generated by processor 332 in receiver 314 based on electrical signals generated in response to photon arrivals in single photon detector 324. Each time bin in the plots 1500, 1530 is 16 ns in duration. Each full comb included one second of data, which includes ~64 million time bins. Only the first one million bins are shown in plots 1500, 1530 for clarity and to better illustrate the density of the combs. The source used for the experiment generated about fifteen entangled pairs per second. The number of single photons measured in the experiment is about four-thousand-five-hundred per second. These single photons include contribution from background photons, dark counts and/or photons generated by the source that do not have an associated entangled pair in the measurement aperture(s). This is generally referred to herein as a background rate. Thus, the background rate for this experiment is nearly three hundred times greater than the entangled pair generation/detection rate.

Figure 15C:
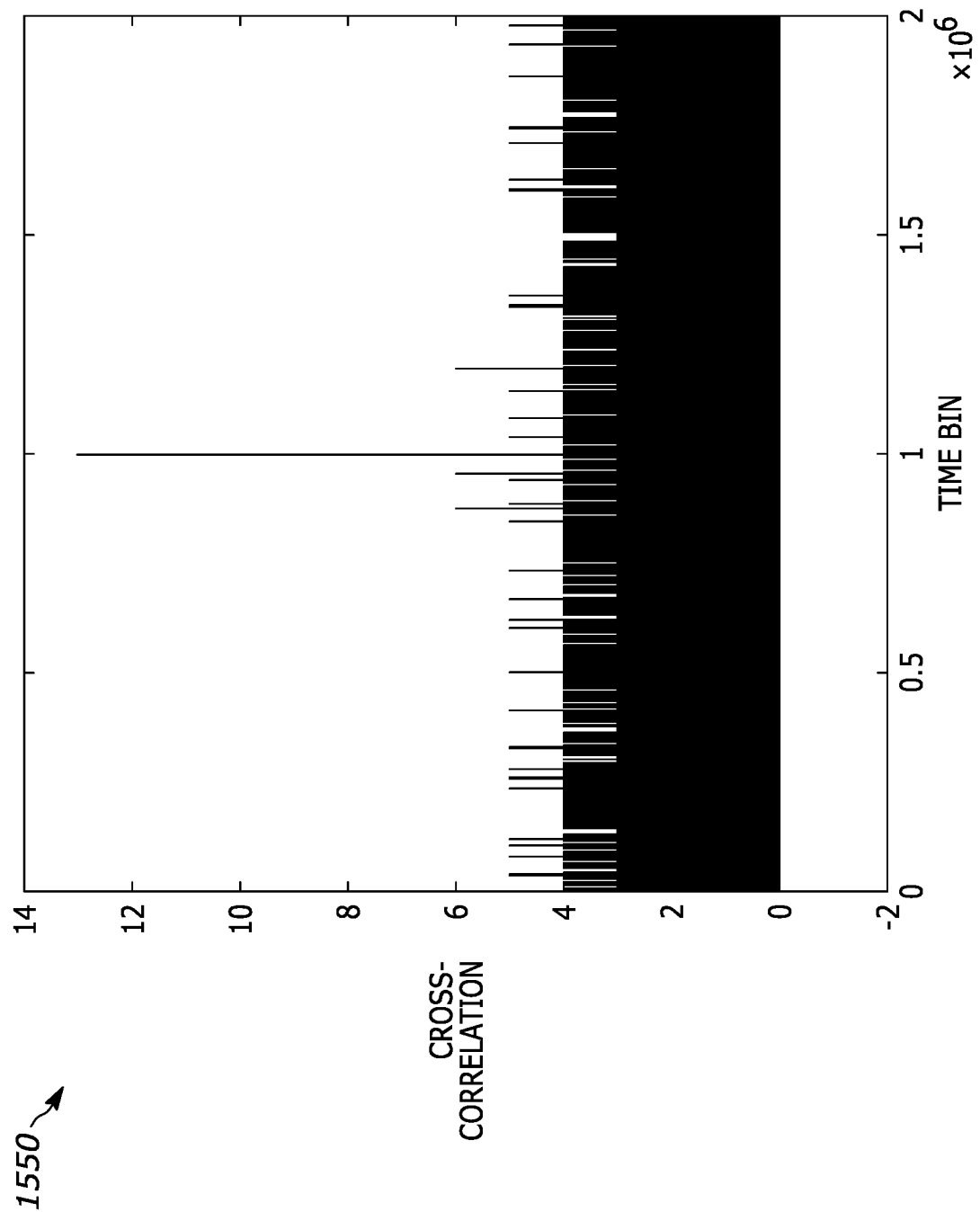
FIG. 15C illustrates a plot of part of a cross correlation of the combs illustrated in partial plots of FIGS. 15A-B.

FIG. 15C illustrates a plot 1550 of part of a cross correlation of the combs illustrated in partial plots 1500, 1530 of FIGS. 15A-B. One million data points around either side of the match position are shown in the partial plot 1550. The experimental conditions that generated the two combs had a matched path from the source to each detector. As such, the peak occurs at zero delay between the two combs. In other words, the peak is at the center of the cross correlation. That is, k=0 in the equation for C(k). As shown in the peak of the plot 1550, the one-second-duration combs included thirteen matches. With only a small error, these matches found via cross correlation at the zero-delay match point represent entangled pairs. As calculated by the equations provided herein, the probability of an accidental single match in one second of data using 16-ns bins for a background rate of 4500 photons per second is ~0.3.

The values of the matches in the correlated comb data can be used to share information as described herein. For example, the inter-arrival times (as found, for example by determining the number of bins between arrivals) between the thirteen matches identified in the peak of FIG. 15C can represent twelve shared random numbers. These are derived, for example, by performing an AND of the two combs offset by a number of bins that is determined by the location of the correlation peak. The data shown in the plots 1500, 1530, 1550 of FIGS. 15A-C are merely examples to illustrate comb sharing in a practical system. As one example, the system and method of sharing entanglement of the present teaching operates over a wide variety of pair generation rates and/or singles/background rates that are different from the 10-per-second pair generation rate and 4500-per-second background rate of this demonstration.

One feature of the present teaching is that the sharing of entanglement can be used to synchronize clocks without the need to share detailed or precision timing information between the clocks. This is because, unlike known entanglement systems and experiments, entangled photon coincidence information is derived directly and/or exclusively from state bases that are not associated with time. Some embodiments will share additional time information, for example, to improve speed or other aspects of the fidelity of the synchronization. Some embodiments share little or no time information. Sharing little or no time information advantageously allows the use of poor-quality communication channels, effectively reducing or eliminating the need to provide latency guarantees or high bandwidth on those channels.

Figure 16:
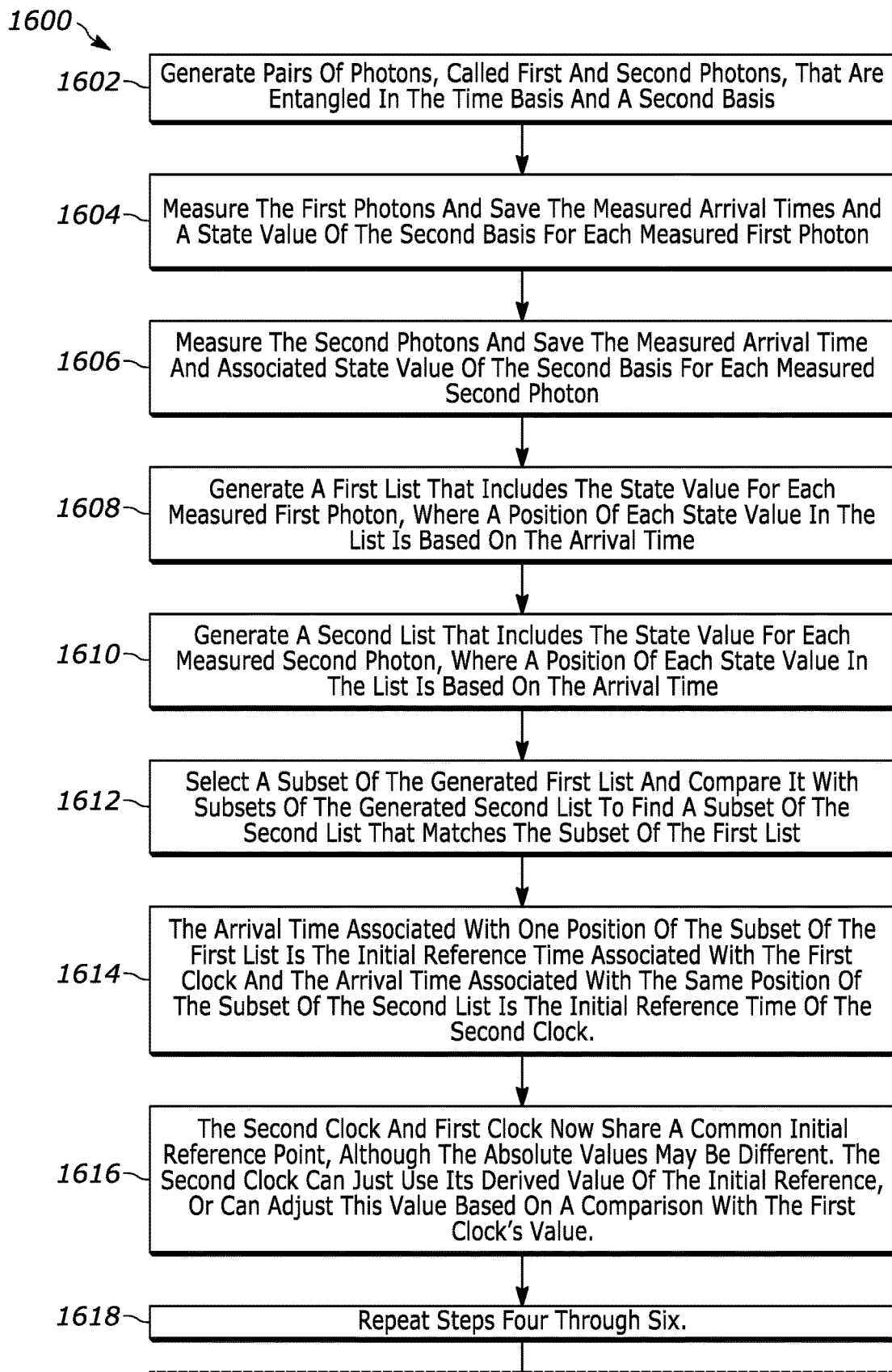
FIG. 16 illustrates a flow chart describing an embodiment of steps in a method for synchronizing two independent clocks including determining a common time and a common rate of the present teaching.
Figure 16:
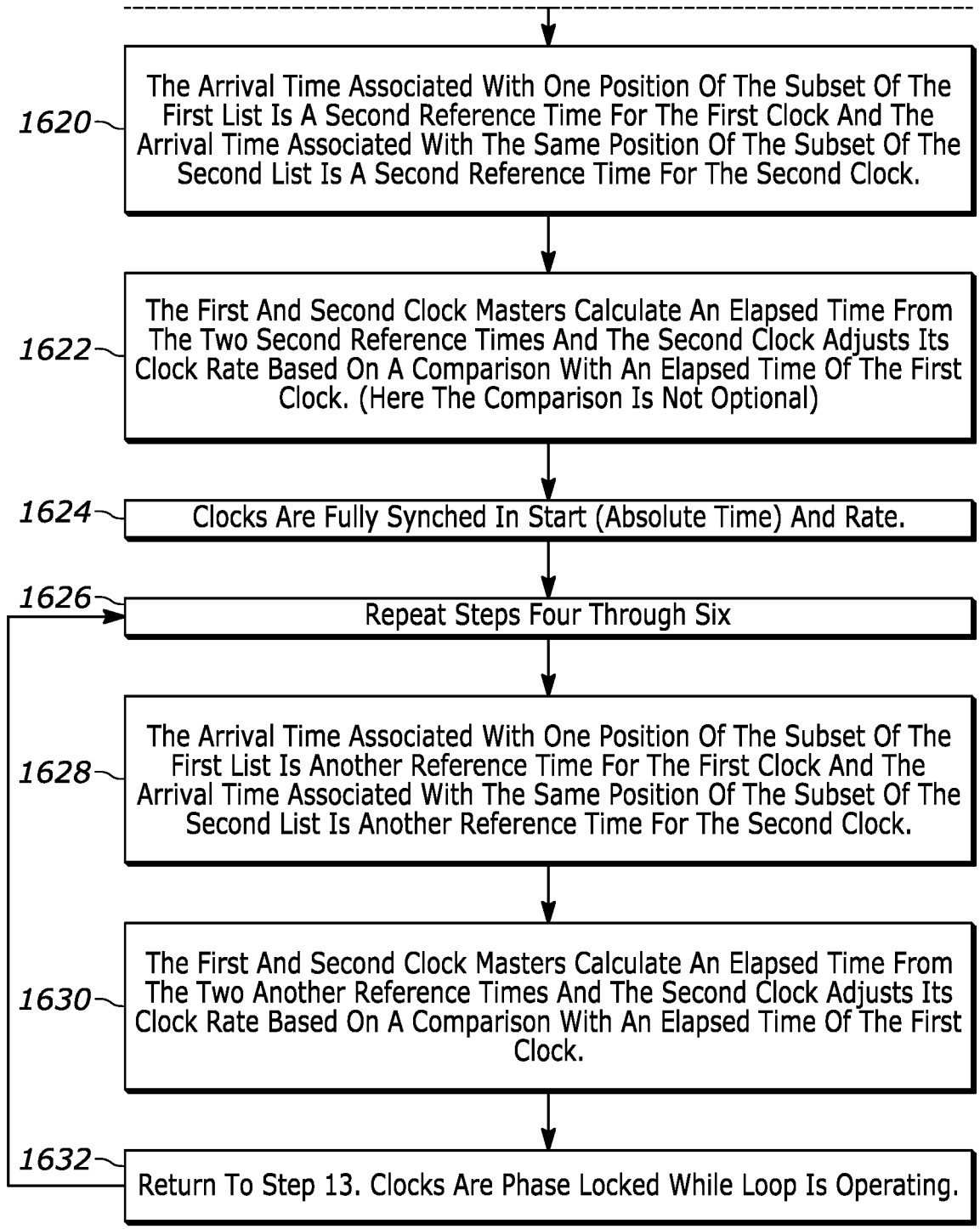

FIG. 16 illustrates a flow chart describing steps in an embodiment of a method 1600 for synchronizing two independent clocks including determining a common time and a common rate of the present teaching. The embodiment is described in connection with the generation and use of pairs of entangled photons with the entanglement including two bases, a time basis and another, non-time, basis. However, as described herein and as understood by those skilled in the art, more photons than two in an entangled group can be entangled and some of the more than two entangled photons can be sent to additional clocks for their synchronization using the same method steps. Also, more bases of entanglement than two can be used per entangled group.

In a first step 1602 entangled pairs of photons, that are entangled in a time basis and a second basis, are generated. These entangled pairs are sent to different nodes/entities, and, for convenience, the photons from the pair that go to one node are referred to as first photons and the photons representing the other of the pair that go to a second node are referred to as second photons. These entangled photons can be generated by any of a number of known entangled photon generation systems that can entangle in at least two bases. One example generation source is a SPDC source that generates photons entangled in time and also in one or more of polarization, wavelength and/or space bases. It is desirable for some embodiments that the second basis have a large state dimension. The dimension of a state can be related to the state preparation and also the measurement implementation. For example, the space dimension can be prepared and measured to have a large state dimension. The polarization basis commonly has only two states, so a dimension of two. Using bases with larger state dimensions allows more efficient sharing of synchronization information because the matching of entangled patterns of a shorter length can provide more certainty in the integrity of the match. This effect is further described below.

The generated photons are provided to at least two entities or nodes each having clocks. The nodes or entities are configured to measure the arrival times of the photons and the values of the state in the dimension other than time for the associated arrival time. The photons may be provided over numerous kinds of quantum or classical channels including free space channels, fiber channels, photonic integrated system channels or other. In some embodiments, the nodes or entities with clocks that are sent the entangled photons are located some distance apart, and in some embodiments the clocks are nominally in the same location.

In a second step 1604 the first photons are measured and the measured arrival times and a state value of the second basis for each measured first photon is saved. In a third step 1606 the second photons are measured and the measured arrival time and associated state value of the second basis for each measured second photon are saved. In various embodiments, these second and third steps 1604, 1605 can be performed together, at the same time, or at different times. It is necessary that the nodes be able to measure and save state information for at least some first and second photons that are from pairs, to ensure that entanglement correlations are available in data from the two nodes. In a single-time-basis system, the differences in arrival times between correlated pairs are perfectly correlated. Using hyper-entanglement in multiple bases, the measured state values and measured arrival time on a single measured photon are perfectly correlated with the measured state values and measured arrival time of its entangled pair. In fact, all measured state values of multiple bases of hyper-entangled photon pairs are perfectly correlated. This is a powerful property, because it means that information derived from the correlation in one of the bases can be linked to and used to find the correlated values in the other of the hyper-entangled bases.

In a fourth step 1608, the node or entity that measured the first photons generates a first list that includes the state value for each measured first photon, where a position of each state value in the list is based on the arrival time. For example, the state values can be positioned in the list in the order of increasing arrival time. Other ordering approaches can also be used. In a fifth step 1610, the node or entity that measured the second photons generates a second list that includes the state value for each measured second photon, where a position of each state value in the list is based on the arrival time. The positioning is the same for both nodes/entities in some embodiments, or has a known relationship. A key feature is that positioning in the list can be used to locate, or identify, entangled pairs of first and second photons. The identification of data from entangled pairs is sometimes referred to in the quantum physics literature as determining coincidence or finding correlated photons.

In a sixth step 1612, a subset of the generated first list is selected and compared with subsets of the generated second list to find a subset of the second list that matches the subset of the first list. A size (number of positions) of the subset can be selected to facilitate and/or provide a particular performance of error rate and/or speed of match identification. The size of the subset can also be selected based on a dimension of the state of the basis that is not time. For example, if the state dimension is small, e.g. having only one value, using a relatively large number of values in the subset helps to ensure that the match is correct. Larger state dimensions generally require smaller subsets to find a match. The number of state values (i.e. the state dimension) required to provide a comparison that identifies a match is a statistical quantity based on probability. For example, if the basis is polarization, e.g. H and V, you need a sequence of H and V's in the subset that is long enough that the probability of a "false match" is low. For a subset length n, the probability is given by (½)^n for a 2-state basis like polarization. The value of n must be large enough so that the probability of a false match is small. If it was an k-state dimensioned basis, the probability formula is (1/k)^n. If k is large, a single measured value can be used and provide an acceptable error probability. This is because k can be very large, e.g. thousands or even millions of state positions. In the case of entangled position, e.g. correlated spatial positions around a cone of entanglement in a SPDC source, this large dimension can be realized for example using a spatial array to identify spatial positions of correlated photons.

In a seventh step 1614, the arrival time associated with one position of the subset of the first list is established as the initial reference time associated with the first clock and the arrival time associated with the same position of the subset of the second list is established as the initial reference time of the second clock. The subset list position of the value that is used for the initial reference time is arbitrary, and is agreed to by both parties. This agreement can be, for example, by a pre-agreement such as the n-th position in the subset, or through a message sent with the subset that indicates the position, or by other means. What is important is that it is an agreed position in the matching subsets of the measurement lists of the measured values of the state values in the non-time basis of hyper-entanglement from pairs of entangled photons. The arrival time associated with the position in the first list subset and the arrival time associated with the position in the second list subset that matches the first subset are established as a common time.

In an eighth step 1616, the second clock and first clock now share a common initial reference point, the established common time, although the absolute values in each node can be different. In some embodiments, the second clock can just use its derived value of the initial reference time. In some embodiments, the second clock can adjust this value based on a comparison with the first clock's absolute value. In some embodiments, the clocks can agree to a particular time, e.g. T=0, that is used in both clocks for this common time. While for some embodiments, or system constructs, this common time can be considered a "simultaneous time" or "the same time", the interpretation is not so limited. In some embodiments, there is no adjustment done to align the clocks. The common time is a very useful construct, and may be used differently in a variety of different applications. For example, common time can be used as a common start time or marker time, or a common time stamp. It can be used as a common zero-time. A useful feature is that the initial reference times and the common time are only known to each of the particular local clock and entity or node using that clock. As such, various privacy schemes can be included in applications that use the initial reference times as common time of the present teaching.

For some embodiments, the establishment of a common time is sufficient, and the method stops after step eight 1616. However, more timing information can be derived through the use of other matched positions in the subset and/or in matched positions in subsequent shared subsets. In some embodiments, a ninth method step 1618 repeats all or some of steps four through six. In various embodiments, more entangled photons are measured, lists of measured states are prepared, subsets of lists are selected and shared, and times derived. Various embodiments use some, all or none of these repeated steps four through six. For example, some embodiments create new subsets of state values out of existing measurements, some embodiments use state values in other, not yet used, positions in an existing matched subset, and some embodiments use a combination of these approaches.

In a tenth step 1620, the arrival time associated with one position of the subset of the first list is established as a second reference time for the first clock and the arrival time associated with the same position of the matching subset of the second list is established as a second reference time for the second clock. In some embodiments, the one position is just a different, preferably later, position in the original subset generated in the sixth step 1612. In some embodiments, the second reference times are derived from different subsets of the lists that were generated in the repeated sixth step 1612. In some embodiments, the measurements of steps four 1608 and/or five 1610 are repeated. The second reference times are associated with a second correlated time. Although, in some embodiments, the absolute value of this time is a random time, the second reference times are perfectly correlated between the nodes, and so provide a near-perfect synchronization marker to determine a rate difference between the two clocks. Said another way, the time difference between arrivals of time-entangled photons represents a near-perfect marker of elapsed time in two nodes in a system construct in which the initial reference time is a common time. As such, all the information needed to synchronize an absolute time and a rate for two clocks is available from the initial and second reference times.

In an eleventh step 1622, the entities/nodes of the first and second clock calculate an elapsed time from the two second reference times and the second clock adjusts its clock rate based on a comparison with an elapsed time of the first clock. In the case of establishing a start time, i.e. stopping the method at step eight 1616, it is not necessary to share time information between clocks. However, to realize rate synchronization of the two clocks in the eleventh step 1622, using some form of time comparison is not optional.

After the adjustment in the eleventh step 1622, the clocks are fully synchronized with a common start time (absolute time) and a common rate and are available for use by applications in the twelfth step 1624. Many known applications that rely on synchronized clocks can be realized. For example, time stamping applications, including time stamps imposed prior to and after the clocks have been synchronized can be realized. In this case, previous time stamps are adjusted using the common start time and the common rate for correction. The ability to derive common time stamps can be used, for example, in sensing and measurement, location and tracking, cyber security, data processing, and many other systems across numerous fields of endeavor. As is well known in system synchronization, the free running precision of the two clocks as well as the demands of the application determine how long clocks synchronized by the method of the present teaching through step twelve 1624 will be effective. A feature of the present teaching is the recognition that various parameters including the state dimension of the non-time basis, the number of additional bases used, the length of the subset, and/or the resolution of the time-of-arrival measurement, can be chosen to achieve desired synchronization latency, error rate, and/or precision. In some embodiments, the precision of the synchronization, e.g. the resolution of the common time in seconds and the cycles-per-second-per-second of the synchronized rate, is independent of the bandwidth or jitter of the communication channel between the clocks. This feature is not readily available in known systems that send timing information across channels to realize synchronization including, for example, traditional microprocessor and electronic chip timing schemes, Building Integrated Timing Supply (BITS) timing and the White Rabbit project synchronization schemes. The method 1600 of the present teaching can be further extended to provide active phase locking of the clocks in subsequent steps.

In a thirteenth step 1626, all or some of steps four through six can be repeated again. As in step nine 1618, only some steps need to be repeated. In a fourteenth step 1628, the arrival time associated with one not yet used position of the subset of the first list is another reference time for the first clock and the arrival time associated with the same position of the subset of the second list is another reference time for the second clock. In a fifteenth step 1630 the nodes/entities of the first and second clock calculate an elapsed time from the two another reference times and the second clock adjusts its clock rate based on a comparison with an elapsed time of the first clock. In a sixteenth step 1632, there is a return to step thirteen 1626. These steps thirteen 1626 through sixteen 1630 operate as a loop. The clocks are phase locked while loop is operating. The speeds and/or latencies with which the various steps operate and the precision of the local clocks impact the fidelity and performance of the phase locking. As such, a wide variety of clock alignment and/or synchronization scenarios can be realized. A key feature the phase-locking using entanglement of the present teaching is that the fidelity of the time correlation of the prepared entangled photons carries the underlying timing information that is shared.

Figure 17:
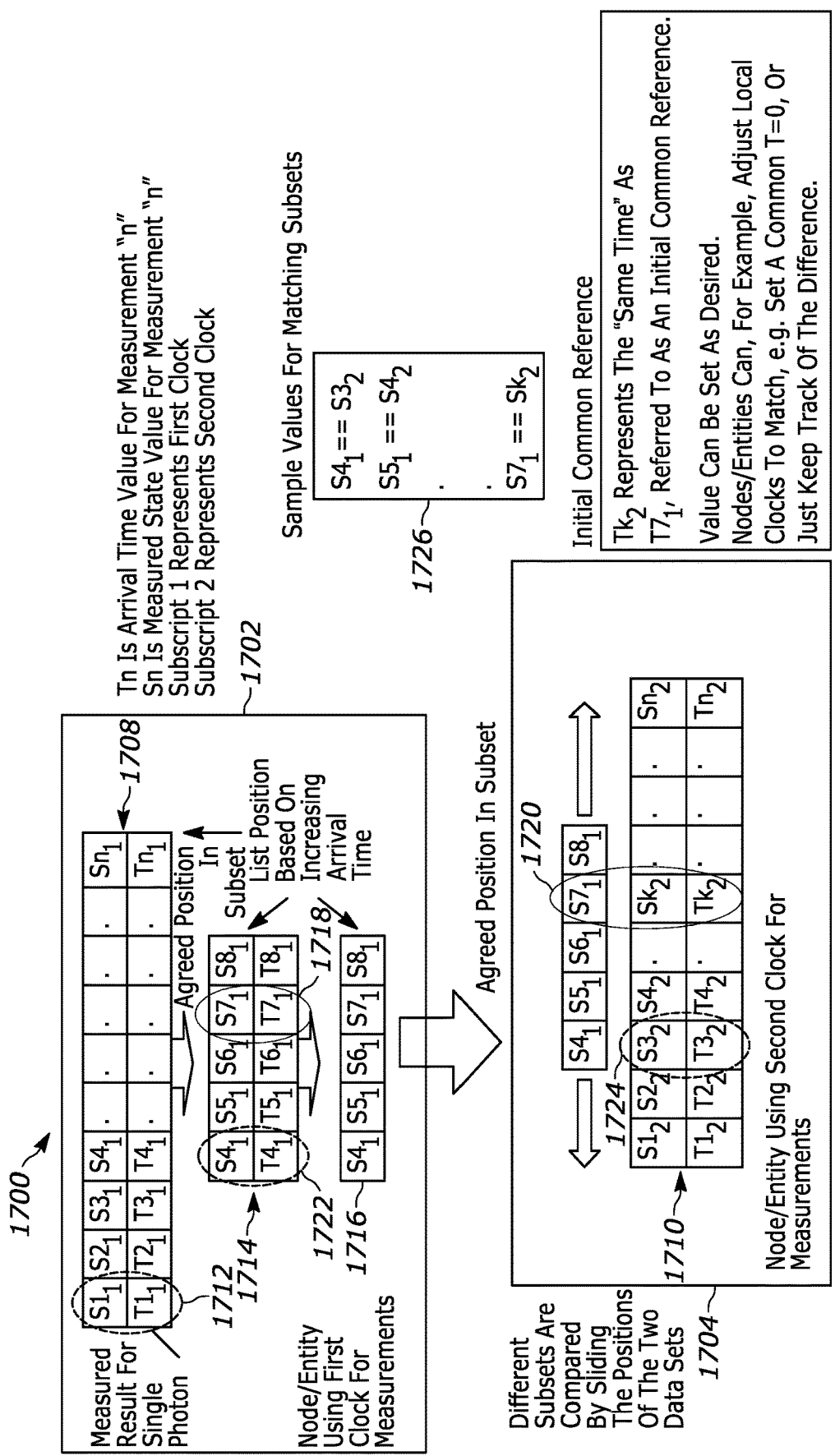
FIG. 17 illustrates a schematic of an embodiment of subset matching of the present teaching.

FIG. 17 illustrates a schematic of an embodiment of subset matching 1700 of the present teaching. A node/entity 1702 uses a first clock for measurement and a second node/entity 1704 uses a second clock for measurement. The respective lists of measurements 1708 and 1710 are illustrated as a list of sample values where a single photon measurement representation 1712 is circled. The values $Tn_i$ are time values measured by the respective local clocks. The values $Sn_i$ are state values, such as polarization (e.g. one of two different values), color (can be one of several values or continuous values) or space/position values. A subscript 1 represents a first node/entity measurement and a subscript 2 represents a second node/entity measurement. The lists 1708, 1710 are one representation of some embodiments of the combs described herein.

The positions in the list are ordered based on, as one example, increasing arrival time. So, $T1_1$ is an earlier time than $T2_1$. A subset 1714 is selected from the first node/entity list 1708. In some embodiments the length of the subset is based on the dimension of the state basis and also on a desired error probability of matches during a comparison to find entangled pairs. It is only necessary to send a subset 1716 containing the state values $Sx_1$ to the other node/entity 1704. The timing information associated with the subset 1716 can remain known only to the node/entity with the first clock 1702. A position 1718 in the subset of the first list, in this example the fourth position of the subset 1714, is agreed to or known as the position 1720 to be used by the node/entity 1704 that uses a second clock for measurement when the match is found.

Different subsets of the second list are defined by sliding the shared list 1716 along the list 1710. Each position in the sliding represents a different subset. A match is found when at least one position 1722 aligns with at least one position 1724 as do some, all, or most of the other state values in the subset. In this position, which represents the matching subset of the second node list, all or a designated number of sample values match as shown in the box listing matching values 1726.

Using the designated position 1718, 1720, $Tk_2$ represents the "same time" as $T7_1$, referred to as an initial common reference. Value(s) in either node can be set or adjusted as desired. Nodes/entities can, for example, adjust local clocks to match, e.g. set a common T=0, or just keep track of the time, as desired. As understood by those skilled in the art, the meaning of T=0 depends on the use case. There can be known and/or unknown offsets, owing to, e.g. time of flight, latencies, relative motions, etc., between events as relate to the systems using the two clocks. The derived T=0 or common time can be somehow adjusted based on known offsets and/or be used to derive these offsets as desired.

Figure 18A:
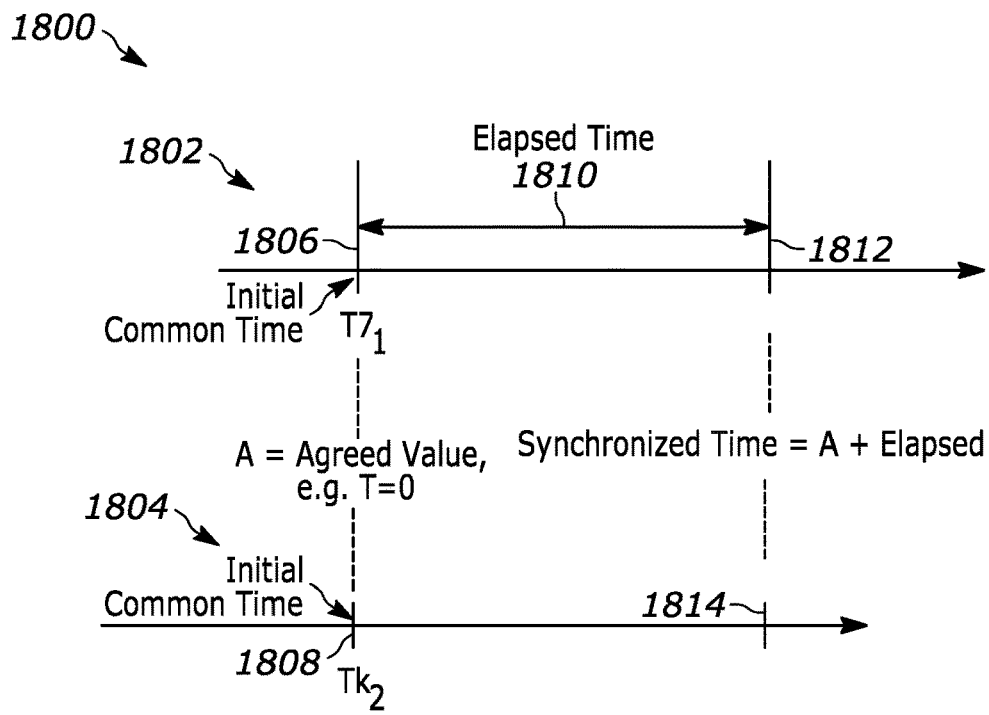
FIG. 18A illustrates time lines for an embodiment of clock synchronization using entanglement of the present teaching for a case where the clock oscillators (rates) are the same.

FIG. 18A illustrates time lines 1800 for an embodiment of clock synchronization using entanglement of the present teaching for a case where the clock oscillators (rates) are the same. A timeline 1802 for the node/entity that uses a first clock and a timeline 1804 for the node/entity that uses a second clock are shown. Referring also to FIG. 17, the initial common time based on the initial reference times for each clock, $T7_1$ 1806 and $Tk_2$ 1808 take on an agreed value T=0. These are shown as aligned in FIG. 18A, but can also include fixed offset for applications where the nodes/entities are stationary. The initial common time is established by a series of steps as described in connection with FIG. 16. These steps can include an exchange of classical data between the nodes 1702 and 1704 as illustrated in FIG. 17. That exchange, and subsequent matching as illustrated in FIG. 17 of the subset 1720 takes a period of time, defined as the elapsed time 1810 in FIG. 18A. To synchronize the clocks, this elapsed time can be added to the initial common time 1806 and 1808. These elapsed times are equal, as shown by times 1812, 1814, if the rates of the clocks are the same.

Figure 18B:
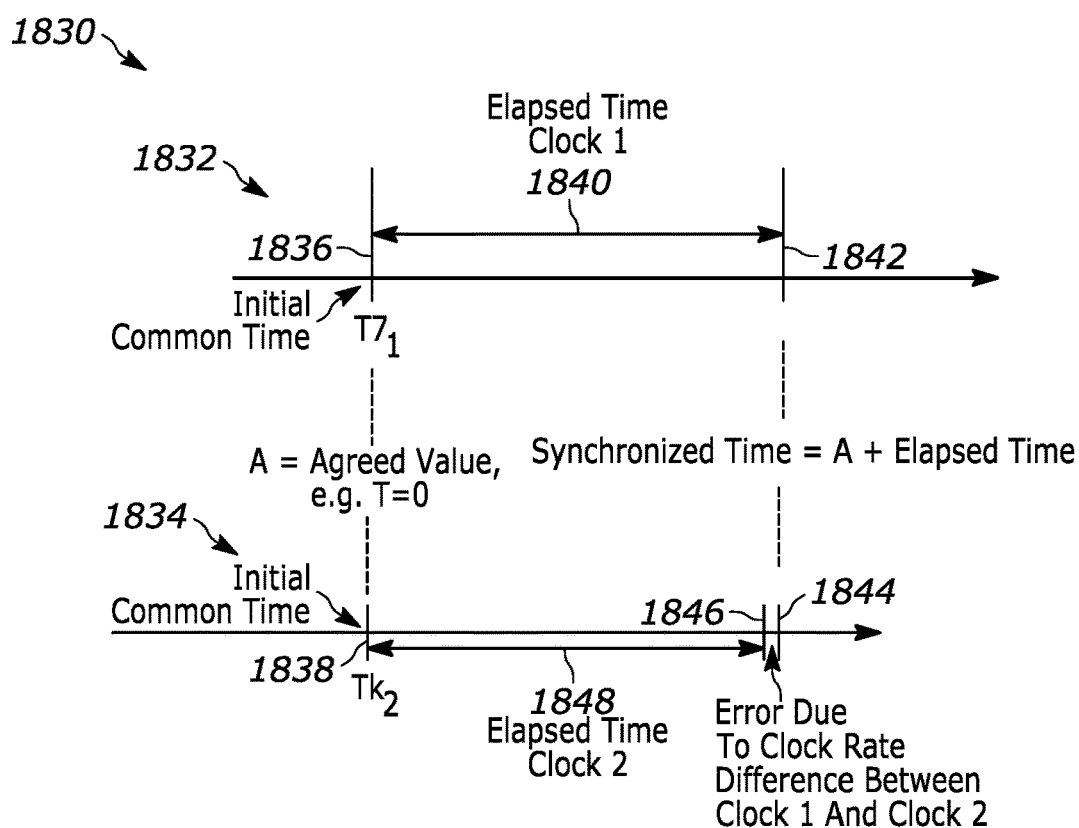
FIG. 18B illustrates time lines for an embodiment of clock synchronization using entanglement of the present teaching for a case where the clock oscillators (rates) are not the same.

FIG. 18B illustrates time lines 1830 for an embodiment of clock synchronization using entanglement of the present teaching for a case where the clock oscillators (rates) are not the same. Like the timelines 1800 described in connection with FIG. 18A, shown are timelines 1832, 1834 for the node/entity that use the first and second clocks, and initial common times 1836, 1838 based on the initial reference times for each clock, e.g. $T7_1$ and $Tk_2$ described in connection with FIG. 17. In this embodiment, the first and second clocks register different elapsed times 1842, 1846 due to the fact that their rates are not synchronized. This results in a clock error. In this case, the first clock runs faster than the second clock, so a projection of the elapsed time 1840 on the second node timeline occurs later at a time 1844 than the measured event arrival time 1846. The difference between these times 1844, 1846 can be taken as the error due to the clock rate difference between the first and second clock.

Figure 18C:
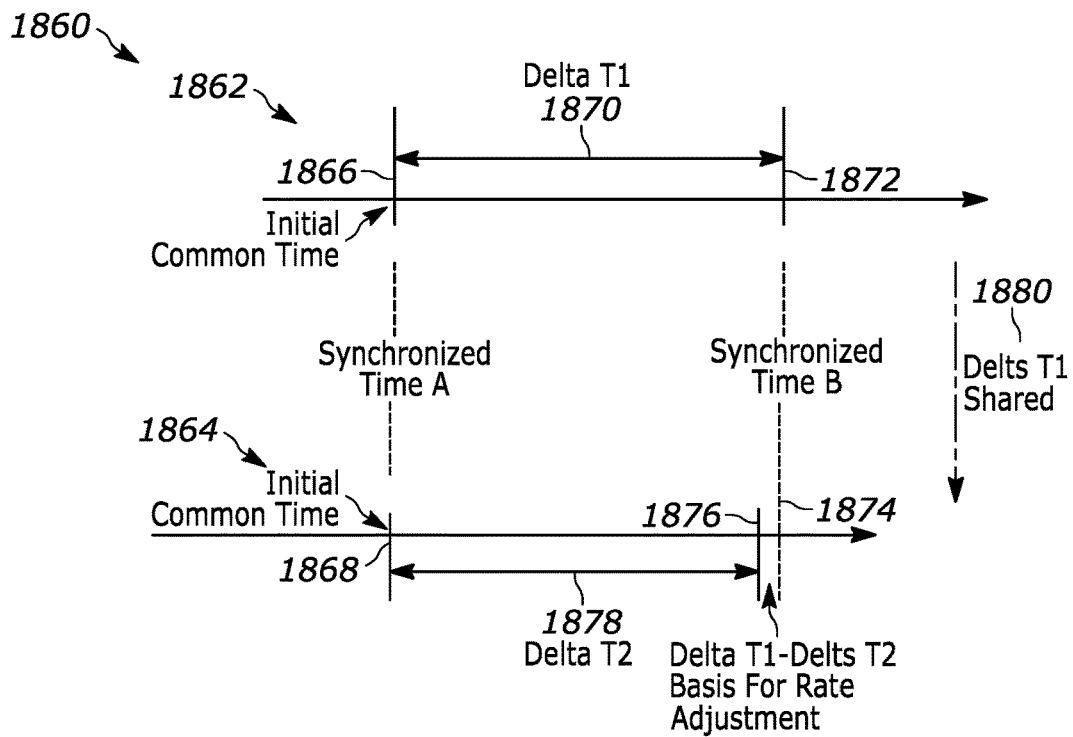
FIG. 18C illustrates time lines for an embodiment of clock synchronization using entanglement of the present teaching for a case where the clock oscillators (rates) are adjusted using shared elapsed time.

FIG. 18C illustrates time lines 1860 for an embodiment of clock synchronization using entanglement of the present teaching for a case where the clock oscillators (rates) are adjusted using shared elapsed time. Like the timelines 1830 described in connection with FIG. 18B, shown are timelines 1862, 1864 for the node/entity that use the first and second clocks, and initial common times 1866, 1868 based on the initial reference times for each clock, $T7_1$ and $Tk_2$. In this embodiment, the second entangled pair results in a measurement of one of the pairs after an elapsed time 1870 as measured by the first clock positioned at a time 1872. A measurement of the other of the pairs as measured by the second clock after an elapsed time 1878 as measured by the second clock is positioned at a time 1876. The first elapsed time (delta T1) 1880 is shared, and so the entity/node with the second clock can calculate the difference between the first elapsed time 1870 and the second elapsed time 1878, and adjust the second clock rate accordingly.

Figure 19:
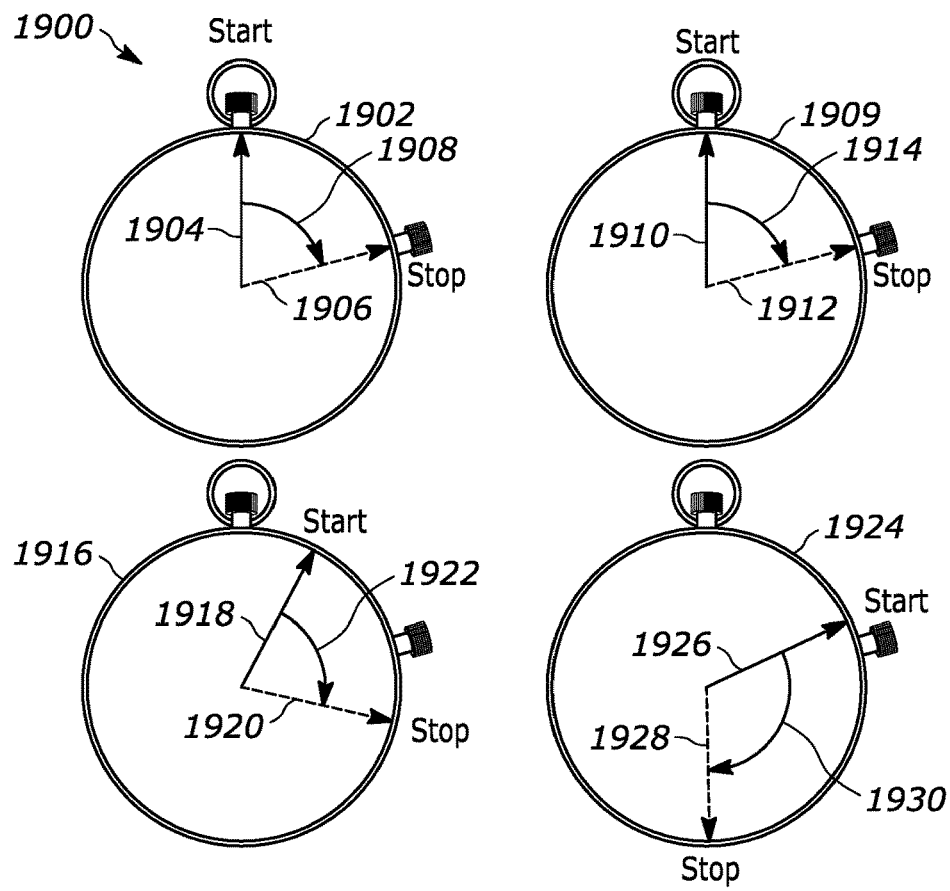
FIG. 19 illustrates time evolution on faces of first and second clocks for measurements of two pairs of simultaneous events for synchronous and asynchronous clocks.

FIG. 19 illustrates time evolution on faces of first and second clocks 1900 for measurements of two pairs of simultaneous events for synchronous and asynchronous clocks. The two pairs of simultaneous events can be an arrival of one of a first entangled photon pair at one clock and an arrival of the other one of a first entangled photon pair at a second clock and a later arrival of one of a second entangled photon pair at one clock and an arrival of the other one of the second entangled photon pair at the second clock. For purposes of this description, we ignore, or assume accounted for, the difference of time of flight or other latencies from an entangled pair generator to the measurement systems associated with the two clocks. We can refer to the arrival of the first pair a start event and the arrival of the second pair a stop event. On the first clock face 1902, the start arrow 1904 points to a start time and the stop arrow 1906 points to a stop time. An elapsed time is represented by the angle of evolution 1908 of the arrow around the clock face 1902. A second clock that is synchronous with the first clock in absolute time and rate registers on the second clock face 1909, the start arrow 1910 points to a start time and the stop arrow 1912 points to a stop time. An elapsed time is represented by the angle of evolution 1914 of the arrow around the clock face 1909. These clock faces 1902, 1909 look the same and the elapsed times 1908, 1914 have the same angle. Thus, two pairs of simultaneous events measured by two clocks, for example, two start events and two stop events, will register a common start time and a common stop time when the clocks are synchronous in absolute time and rate.

The same two pairs of simultaneous events measured by two clocks that are not synchronous can register different start times and different stop times based only on not having a common absolute, or initial, time. For the example illustrated by the two clock faces 1916, 1924, both the absolute time and the rate are not the same. On the first clock face 1916, the start arrow 1918 points to a start time and the stop arrow 1920 points to a stop time. An elapsed time is represented by the angle of evolution 1922 of the arrow around the clock face 1916. A second clock that is not synchronous with the first clock in absolute time and rate registers on the second clock face 1924, the start arrow 1926 points to a start time that shows as later than the start time 1918 on the first clock and the stop arrow 1928 points to a stop time that is later than the first clock stop time 1920. In this case, the elapsed time 1922, 1930 is also different for the first and second clocks. Specifically, the elapsed time 1930 is larger for the second clock that is running at a higher rate (e.g. faster oscillator cycles).

The synchronization method of the present teaching provides a way to synchronize the two asynchronous clocks, for example those asynchronous clocks portrayed by clock faces 1916, 1924 described in connection with FIG. 19. This synchronization method can use a channel with no latency or bandwidth guarantees to exchange data between the clocks. In some embodiments, the nodes/entities with the two clocks need to share only non-time-based state information and certain time values that cannot be used to reconstruct either clock. Some embodiments do share and/or use additional timing information to augment and/or improve the synchronization. In some embodiments, the clocks can be synchronized with a one-way exchange of information.

Figure 20:
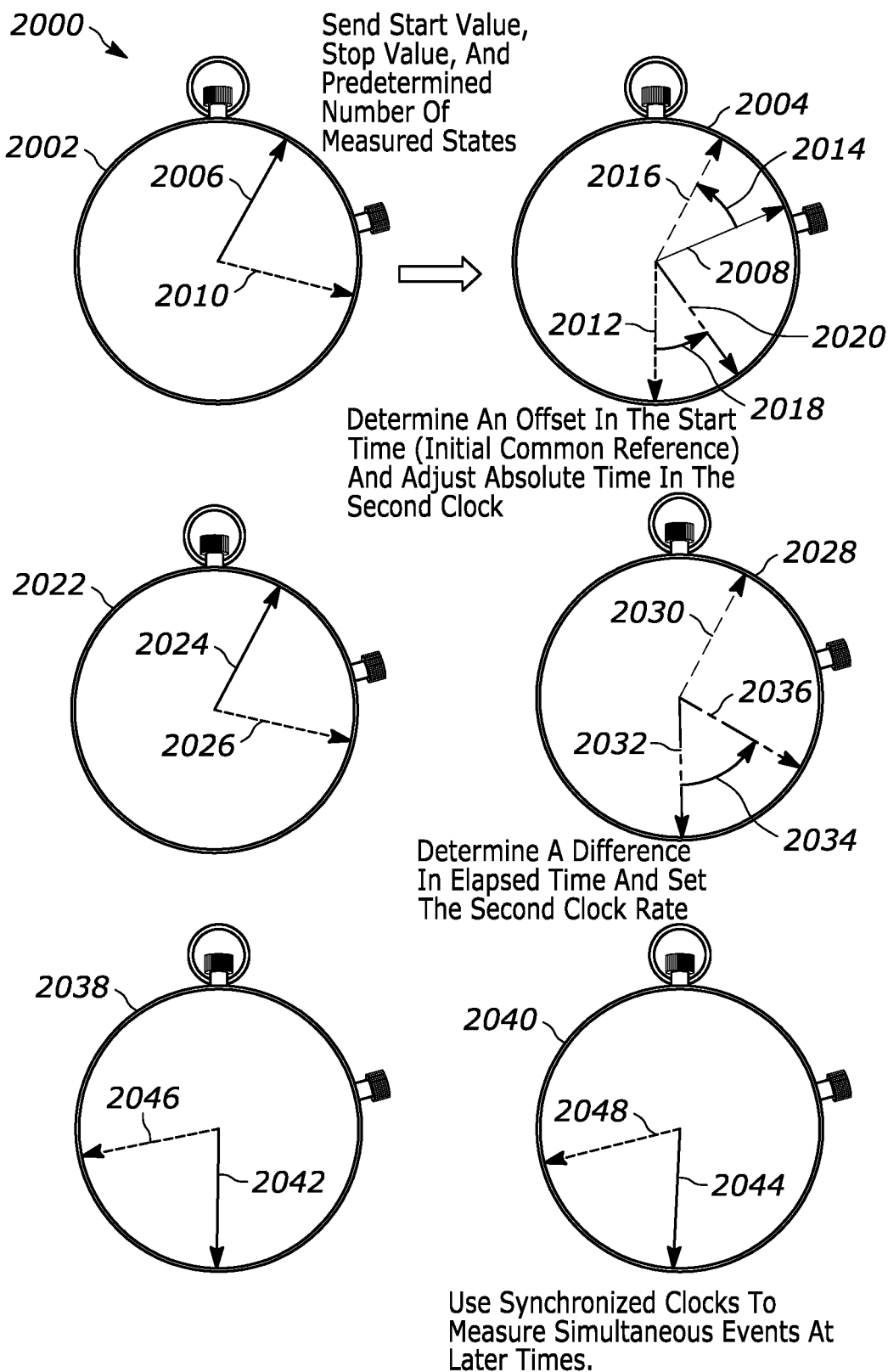
FIG. 20 illustrates time evolution on faces of first and second clocks for an embodiment of synchronizing clocks using entangled pairs of the present teaching.

FIG. 20 illustrates time evolution on faces of first and second clocks for an embodiment of synchronizing clocks using entangled pairs 2000 of the present teaching. The first clock is represented by the first column of clock faces 2002, 2022, 2038 and the second clock is represented by the second column of clock faces 2004, 2028, 2040. The two clocks are being synchronized using two pairs of measured simultaneous events, such as described in connection with FIG. 19. In some embodiments, the method of measuring arrival times and state values of entangled photons, generating lists, subsets of lists and matching of lists uses at least some of the steps and techniques described in connection with FIGS. 16-18. The description of the example that follows assumes both the start and stop events are contained in a single subset list generated by the entity/node with the first clock, but the present teaching is not so limited.

The entity/node with the first clock sends a predetermined number of quantum state values occupying specific positions in a list as well as an agreed position for a start value in the list and a position for a stop value in the list, a value of the start time and a value of the stop time of the first clock to the entity/node with the second clock. The start time and stop time measured values for the first clock are shown on clock face 2002 as start arrow 2006 and stop arrow 2010. The entity/node with the second clock measures the first and second paired photons to find start time from arrow 2008 on clock face 2004 and stop arrow 2012. Upon comparing the quantum state values with locally generated values, the entity/node with the second clock can determine an offset 2014 for the start time (difference between start arrow 2008 and 2006) and adjust subsequent clock values to start time 2016 and stop time 2018 accordingly. The entity/node with the second clock now has a common start time with the first clock, arrows 2006, 2016. The entity/node with the second clock can adjust all subsequent arrival times with this same offset 2014, e.g. it can adjust stop arrow 2012 to new stop time 2018.

Then, by comparing with the first clock's start and stop as represented in clock face 2022 by start arrow 2024 and stop arrow 2026, the party with the second clock can also determine a difference in elapsed time and use it to align its second clock rate. As shown on clock face 2028 the start time 2030 remains the same from the adjustment shown in clock face 2004. The adjusted stop time of adjusted stop arrow 2020 is shown as arrow 2032 and finding the delta 2034 from the stop arrow 2026, can adjust the second clock's cycle time to match a second clock stop time of 2036.

The adjusted rate and absolute time of the second clock can now be used for subsequent measurements. For example, clock face 2038 shows a subsequent measurement of two pairs of simultaneous events for the first clock, with start time 2042 and stop time 2046. Clock face 2040 shows a subsequent measurement of two pairs of simultaneous events from the entangle pairs for the second clock with start time 2044 and stop time 2048. The event times align for the two clocks because the start time and rate of both clocks are common. One feature of the information exchange used for the synchronization is that the start and stop values that are shared between the entities with the two clocks have no meaning in a timing sense to any other party than the two parties engaged in the method to synchronize their clocks. That is, all information shared between the two clocks cannot be used by any other party to derive any aspect of a common, or synchronous clock.

While the description of the method and system of FIG. 20 indicates the start and stop event positions are located in a single subset of state value data, as described herein, these measured event values can be located in different subsets as well. Also, for simplicity, just one start and stop time is described, but the extension to using more values, for example to achieve higher precision and/or reducing error probabilities is possible.

Figure 21:
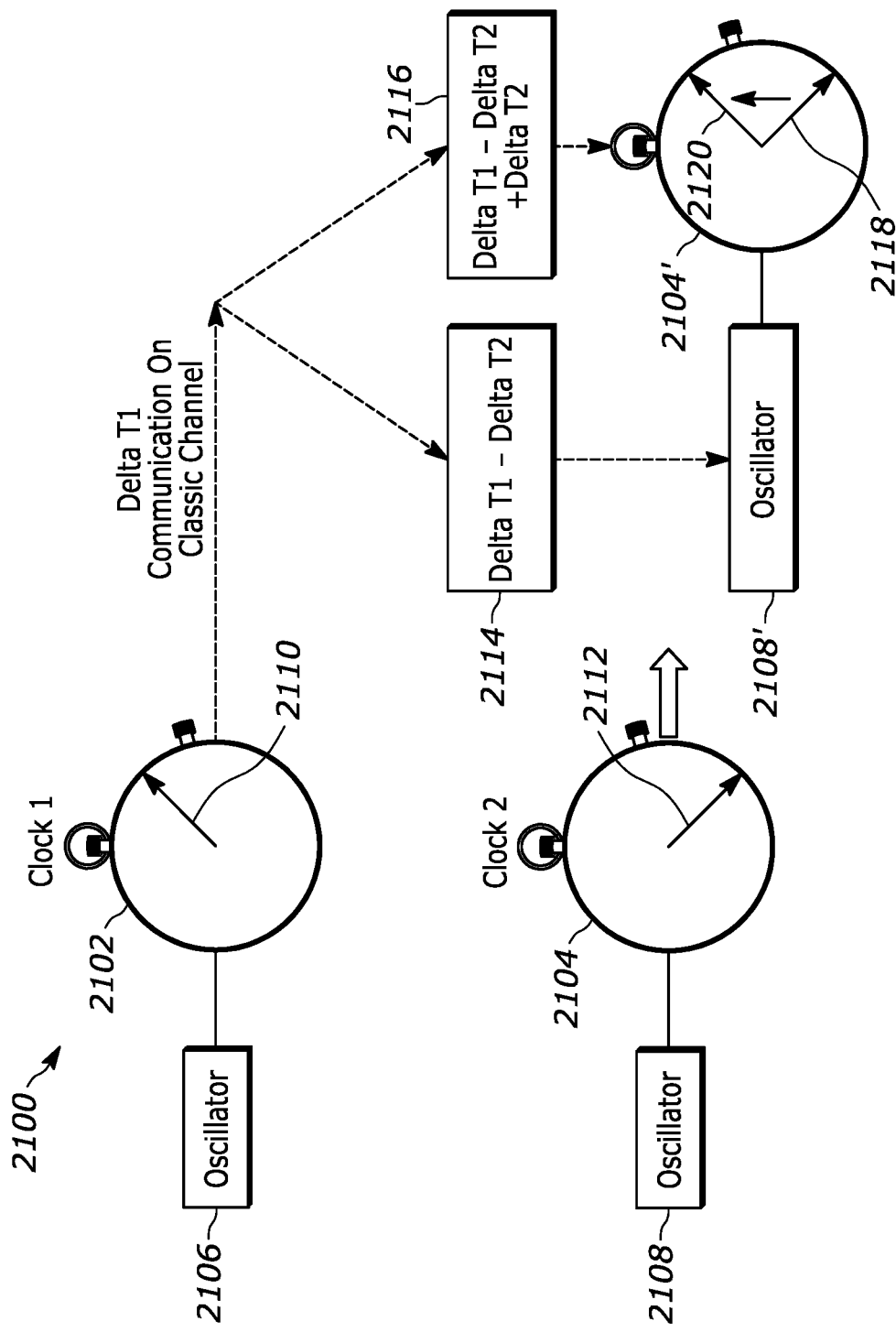
FIG. 21 illustrates a schematic of an embodiment of a system using oscillators that synchronizes two clocks using entanglement of the present teaching.

FIG. 21 illustrates a schematic of an embodiment of a system 2100 using oscillators that synchronizes two clocks using entanglement of the present teaching. A first clock face 2012 and second clock face 2104 are connected to respective oscillators 2106, 2108. Oscillator 2106 of the first clock face 2102 runs slower and so an entangled pair event registers at an earlier start time than the correlated entangled pair event registers as later arrow 2112 on second clock face 2104. A subsequent entangled pair are measured at both clocks and an elapsed time (delta T1) is shared with the second clock that also measures an elapsed time (delta T2). The difference 2114 is used to adjust the oscillator to a new rate 2108' based on the difference. Also, the determined value 2116 delta T1−delta T2+delta T2 is used to move the start arrow from the original 2118 position to a new common start time 2120.

One feature of the present teaching is that the combs can be processed using a variety of methods to find matches between combs. As described herein, for example, a cross-correlation of time-binned data produces a peak at a match position, and the elements of either comb that occupy that match position are nominally all correlated states. The regular time bins provide a basis for the time comparison between the data in the two combs. For example, time bins provide the basis for k in the equation C(k) described earlier.

One feature of the present teaching is that certain information about timing at different nodes and/or different detectors that are sharing combs can be used to improve the efficiency of the matching process and/or algorithm. For example, having knowledge of an absolute time at D1 and D2 (that is, detector(s), D1 that receive one of a pair of entangled photons and D2 that receive the other one of the pair) can reduce the range over which two vectors need to look for a match. Various known methods and systems can be used to provide this absolute time information. For example, GPS can provide accurate absolute time at multiple locations with an accuracy on the order of forty nanoseconds. Various classical network clock synchronization schemes, for example, Building Integrated Timing Supply (BITS), where timing information is sent along a standard telecommunication connection, can also be used to obtain absolute time. Using an internet connection, for example, Network Time Protocol (NTP) is generally accurate to about 0.01 seconds. Other customized options can also be used. For example, a one nanosecond accuracy scheme known as White Rabbit is used in some time-sensitive physics infrastructure. A physical "wire" or other connection with known or trackable latency between D1 and D2 can be used. A common clock can be used when D1 and D2 are co-located, but this is not necessary.

For separated nodes, having some knowledge about the relative time of flight to D1 and D2 from the pair-generation point can be useful. If the locations are fixed, location offset can be normalized out to zero. If the locations are moving, a location offset can be set to maximum movement allowed in the system. For example, a ranging system (RADAR) that detects within 20 miles, would have a maximum ten millisecond offset. It is possible to use delta encoding for this time of flight. For example, if an object is moving, it doesn't displace from location X1 to location X2 instantly, it has a velocity, so time between measurements can be accordingly constrained by velocity of the object.

In some embodiments, timestamps can be converted into time-binned vectors and then cross-correlated to find the match offset. In some embodiments, the binned timestamps result in a very large and/or very sparse vector if the stamp time resolution is very high. As such, in some embodiments, steps are taken to reduce the number of bits in the time stamp. For example, a 64-bit time stamp, at 125 ps resolution, has 8 billion ticks per second. Sixty-four bits can count to 18^19 units, equivalent to 74 years. Thirty-two bits can count to 4 billion ticks, so looking at a second of timestamp data requires about 33 bits, while looking at 10 seconds of data requires about 37 bits. As such, the timestamp needs less precision based on the knowledge about clocks and time-of-flight between detectors sharing combs.

In some embodiments, the precision of the timestamp is chosen to reduce a processing time (e.g. comb vector length) while maintaining a sufficient time resolution to find entangled correlations within a given background singles level. For example, for an entanglement generation rate of about ten pairs per second, a timestamp resolution of 125 picoseconds allows detection of entangled pairs with a low (<1%) error rate in a background of between 50K-100K counts per second. A timestamp resolution of one nanosecond allows detection of entangled pairs with a low (<1%) error rate in a background of between 5K-20K counts per second. A timestamp resolution of sixteen nanoseconds allows detection of entangled pairs with a low (<1%) error rate in a background of between 1K-4K counts per second. So, moving from 125 picosecond resolution timestamps to 1 ns resolution timestamps can take one to two off the above precision requirements. These optimizations can serve to reduce implementation costs depending on specific system requirements.

One feature of the present teaching is that algorithmic methods can be used for finding matches. Rather than translating time stamps into large sparse vectors of 0 and 1's (time-binning), it is possible to work directly with the time stamps. Various known methods can be used. For example, the simple brute force comparison search method can be used to look for matches. Additionally, a divide and conquer method that uses a progressive search, starting in the middle of the data series being compared and working by dividing by two each time can be used. This approach can reduce searches to on the order of n steps rather than an order of 2^n steps.

One feature of the specialized hardware can be used to improve the speed and efficiency of methods and systems of finding matches. For example, some embodiments, rather than a traditional Turing-machine search, utilize Content Addressable Memory (CAM) can be used. Some embodiments utilize specialized hardware that increments all stamps in a comb by one tick all at once and compares a large number of stamps to count matches in one cycle can be used. Some embodiments utilize state machines that are built using application specific circuits (ASICs). Some embodiments rely on known graphics and AI chips that include multiple processors to do functions that are equivalent to the batch increment and matching. For example, NVIDIA chips can be used that take advantage of the natural parallelism of the add and compare aspects of the computation.

EQUIVALENTS

While the Applicant's teaching is described in conjunction with various embodiments, it is not intended that the applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. A system that generates a shared random number, the system comprising:
   a) a single photon detector configured to generate electrical signals in response to detected arrival times of a plurality of single photons as measured against a first clock and configured to detect polarization values of at least some of the detected plurality of single photons; and
   b) a processor having an input coupled to an output of the single photon detector, the processor configured to:
      i) process the generated electrical signal to generate a first list representing a plurality of arrival times and corresponding polarizations values of detected single photons;
      ii) compare the plurality of arrival times in the generated first list with a second list of arrival times, as measured against a second clock that does not maintain a common clock time with the first clock, of single photons that include at least some of the other entangled single photons to identifying matching arrival times; and
      iii) determine a shared random number from corresponding polarization values for the identified matching arrival times.

2. The system of claim 1 wherein the first and second lists are ordered lists that are ordered in time.

3. The system of claim 1 wherein the processing the electrical signal to generate the first list representing the plurality of arrival times and corresponding polarizations values of detected single photons comprises determining a time between detections for at least one polarization state.

4. The system of claim 1 further comprising converting the first list representing the plurality of arrival times and corresponding polarizations values of detected single photons into a list comprising time bins.

5. The system of claim 1 wherein the comparing arrival times in the generated first list with the second list of arrival times to identify matching arrival times comprises comparing inter- arrival times.

6. The system of claim 1 wherein the comparing arrival times in the generated first list with the second list of arrival times to identify matching arrival times comprises performing a cross correlation.

7. The system of claim 1 wherein the comparing arrival times in the generated first list with the second list of arrival times to identify matching arrival times comprises finding matches between the generated first list and the second list at different relative positions of elements in the generated first list and the second list.

8. The system of claim 1 wherein the comparing arrival times in the generated first list with the second list of arrival times to identify matching arrival times comprises finding relationships between the generated first list and the second list at different relative positions of elements in the generated first list and the second list.

9. The system of claim 1 wherein the second list further comprises a current time.

10. The system of claim 9 further comprising comparing a local current timestamp with the current time to determine an offset in time between events in the first and second list.

11. The system of claim 10 further comprising using the determined offset in time to synchronize a local clock.

12. The system of claim 1 further comprising comparing the plurality of arrival times in the generated first list with the second list of arrival times to identify an offset.

13. The system of claim 12 further comprising comparing the identified offset with a flight time to identify an eavesdropper.

14. The system of claim 1 wherein the second list further comprises data representing a random orientation of a polarizer associated with a measurement of a single photon.

15. The system of claim 14 further comprising determining a shared common basis between identified events in the first and second list to identify legitimate pairs.

16. The system of claim 15 further comprising determining corresponding polarization values for the legitimate pairs wherein the determined corresponding polarizations values for the legitimate pairs represent a shared secret.

17. The system of claim 1 further comprising receiving from an asynchronous network the second list of arrival times.

18. A system that generates a shared random number, the system comprising:
   a) a single photon detector configured to generate electrical signals in response to detected arrival times of a plurality of single photons as measured against a first clock and configured to detect polarization values of at least some of the detected plurality of single photons; and
   b) a processor having an input coupled to an output of the single photon detector, the processor configured to:
      i) generate an electrical signal in response to detected arrival times of the plurality of single photons according to a free running local clock and detected polarizations of at least some of the detected plurality of single photons;
      ii) process the generated electrical signal to generate a first list representing a plurality of arrival times and corresponding polarizations values of detected single photons;
      iii) compare the plurality of arrival times in the generated first list with a second list of arrival times according to another free running local clock of single photons that include at least some of the other entangled single photons to identifying matching arrival times; and
      iv) determine a shared random number from corresponding polarization values for the identified matching arrival times.

19. A system that generates a shared random number, the system comprising:
   a) a single photon detector configured to generate electrical signals in response to detected arrival times of a plurality of single photons as measured against a first clock and configured to detect polarization values of at least some of the detected plurality of single photons; and
   b) a processor having an input coupled to an output of the single photon detector, the processor configured to:
      i) generate an electrical signal in response to detected arrival times and detected polarizations values of at least some of the detected plurality of single photons;
      ii) process the generated electrical signal to generate a first list representing a plurality of inter-arrival times and corresponding polarizations values of detected single photons;

iii) compare the plurality of inter-arrival times in the generated first list with a second list of inter-arrival times to identifying matching inter-arrival times and to determine a common time base between the first list representing the plurality of inter-arrival times and the second list of inter-arrival times; and iv) determine a shared random number from corresponding polarization values for the identified matching arrival times.

20. The system of claim 19 further comprising receiving from an asynchronous network the second list of arrival times.

\* \* \* \* \*